United States Patent
Beshai et al.

(10) Patent No.: US 7,200,340 B2
(45) Date of Patent: Apr. 3, 2007

(54) IRREGULAR TWO-DIMENSIONAL WIDE-COVERAGE NETWORK

(75) Inventors: Maged E. Beshai, Stittsville (CA); François J. Blouin, Hull (CA)

(73) Assignee: Nortel Networks Limited (CA)

( * ) Notice: Subject to any disclaimer, the term of this patent is extended or adjusted under 35 U.S.C. 154(b) by 831 days.

(21) Appl. No.: 10/180,080

(22) Filed: Jun. 27, 2002

(65) Prior Publication Data
US 2004/0208625 A1 Oct. 21, 2004

(51) Int. Cl.
*H04B 10/00* (2006.01)
(52) U.S. Cl. ...................... 398/161; 398/140
(58) Field of Classification Search ......... 398/140–172
See application file for complete search history.

(56) References Cited

U.S. PATENT DOCUMENTS

| | | |
|---|---|---|
| 5,629,930 A | 5/1997 | Beshai et al. |
| 5,889,600 A | 3/1999 | McGuire |
| 2002/0093711 A1 * | 7/2002 | Simmons et al. ........... 359/125 |

FOREIGN PATENT DOCUMENTS

EP       1776770 A2    1/2002

OTHER PUBLICATIONS

Blouin, Francois J. et al., "Comparison of Two Optical-Core Networks", Journal of Optical Networking, Jan. 2002, vol. 1, No. 1, pp. 56-65.
U.S. Appl. No. 10/025,982.
U.S. Appl. No. 10/054,509.

* cited by examiner

*Primary Examiner*—Jason Chan
*Assistant Examiner*—David Lee
(74) *Attorney, Agent, or Firm*—McGuinness & Manaras LLP

(57) ABSTRACT

A scaleable high-capacity network comprises several non-uniform composite-star networks interconnected by a number of lateral uniform composite-star networks, thus forming an irregular two-dimensional network. Each non-uniform composite star network comprises electronic edge nodes, possibly of significantly different capacities, interconnected by optical core nodes. The optical core nodes are not connected to each other, and each may be configured differently and have a different reach index, where the reach index of a core node is the number of edge nodes to which the core node directly connects. The selection of a route through a core node within a non-uniform composite-star network is based on a composite index determined according to the reach index of the core node and the propagation delay along the route. The selection of a route in the irregular two-dimensional is based on pre-computed trail sets where each trail is a cascade of trail segments and each trail segment comprises at least one track connecting two edge nodes through a core node.

4 Claims, 40 Drawing Sheets

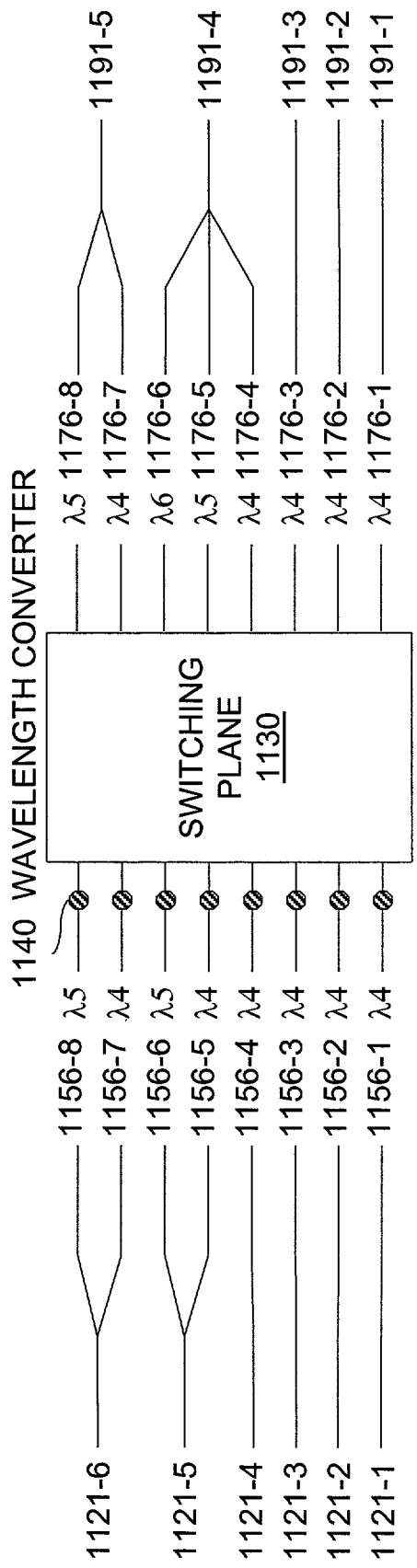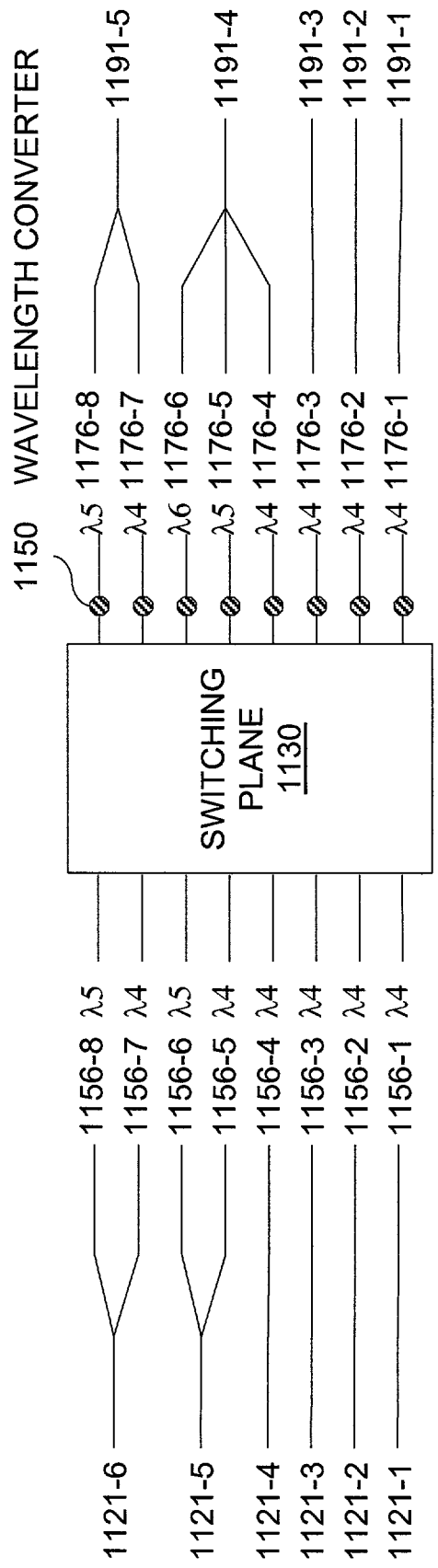
FIG. 11A
FIG. 11B

FIG. 30

| m \ link | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 7 | 0 | 1 |   |   |   |   |   |   |   |   |    |    |    |    |    |    |
| 6 | 0 | 1 | 2 | 3 |   |   |   |   |   |   |    |    |    |    |    |    |
| 5 | 0 | 1 | 2 | 3 | 4 | 5 | 6 | 7 |   |   |    |    |    |    |    |    |
| 4 | 0 | 1 | 2 | 3 | 4 | 5 | 6 | 7 | 8 | 9 | 10 | 11 |    |    |    |    |
| 3 | 0 | 1 | 2 | 3 | 4 | 5 | 6 | 7 | 8 | 9 | 10 | 11 | 12 | 13 | 14 | 15 |
| 2 | 0 | 1 | 2 | 3 | 4 | 5 | 6 | 7 | 8 | 9 | 10 | 11 | 12 | 13 | 14 | 15 |
| 1 | 0 | 1 | 2 | 3 | 4 | 5 | 6 | 7 | 8 | 9 | 10 | 11 |    |    |    |    |
| 0 | 0 | 1 | 2 | 3 | 4 | 5 | 6 | 7 |   |   |    |    |    |    |    |    |

SWITCHING PLANE INDEX, m ← ; INPUT PORTS →; INPUT LINK INDEX 3020

| 3810 SEGMENT | 3820 CORE NODE | 3830 REACH INDEX $\rho$ | 3840 PROPAGATION DELAY (ms) $\delta$ | 3850 ROUTE MERIT INDEX $\rho \times \delta$ | 3860 VACANCY: TIME SLOTS |
|---|---|---|---|---|---|
| A-B | p | 6 | 8 | 48 | 90 |
| | q | 7 | 6 | 42 | 8 |
| | r | 16 | 4 | 64 | 140 |
| | s | 16 | 5 | 80 | 81 |
| B-C | t | 32 | 2 | 64 | 88 |
| | u | 32 | 3 | 96 | 12 |
| C-D | v | 8 | 2 | 16 | 34 |
| | w | 9 | 3 | 27 | 24 |
| | x | 16 | 1 | 16 | 28 |

3800

| TRACK | MERIT INDEX | TRACK | MERIT INDEX | TRACK | MERIT INDEX |
|---|---|---|---|---|---|
| A-p-B-t-C-v-D | 48 + 64 + 16 = 128 | A-p-B-t-C-w-D | 48 + 64 + 27 = 139 | A-p-B-t-C-x-D | 48 + 64 + 16 = 128 |
| A-q-B-t-C-v-D | 42 + 64 + 16 = 122 | A-q-B-t-C-w-D | 42 + 64 + 27 = 133 | A-q-B-t-C-x-D | 42 + 64 + 16 = 122 |
| A-r-B-t-C-v-D | 64 + 64 + 16 = 144 | A-r-B-t-C-w-D | 64 + 64 + 27 = 155 | A-r-B-t-C-x-D | 64 + 64 + 16 = 144 |
| A-s-B-t-C-v-D | 80 + 64 + 16 = 160 | A-s-B-t-C-w-D | 80 + 64 + 27 = 171 | A-s-B-t-C-x-D | 80 + 64 + 16 = 160 |
| A-p-B-u-C-v-D | 48 + 96 + 16 = 160 | A-p-B-u-C-w-D | 48 + 96 + 27 = 171 | A-p-B-u-C-x-D | 48 + 96 + 16 = 160 |
| A-q-B-u-C-v-D | 42 + 96 + 16 = 154 | A-q-B-u-C-w-D | 42 + 96 + 27 = 165 | A-q-B-u-C-x-D | 42 + 96 + 16 = 154 |
| A-r-B-u-C-v-D | 64 + 96 + 16 = 176 | A-r-B-u-C-w-D | 64 + 96 + 27 = 187 | A-r-B-u-C-x-D | 64 + 96 + 16 = 176 |
| A-s-B-u-C-v-D | 80 + 96 + 16 = 192 | A-s-B-u-C-w-D | 80 + 96 + 27 = 203 | A-s-B-u-C-x-D | 80 + 96 + 16 = 192 |

| TRACK | MERIT INDEX | VACANCY | TRACK | MERIT INDEX | VACANCY | TRACK | MERIT INDEX | VACANCY |
|---|---|---|---|---|---|---|---|---|
| A-q-B-t-C-v-D | 122 | 8 | A-q-B-u-C-v-D | 154 | 8 | A-s-B-t-C-w-D | 171 | 24 |
| A-q-B-t-C-x-D | 122 | 8 | A-q-B-u-C-x-D | 154 | 8 | A-p-B-u-C-w-D | 171 | 12 |
| A-p-B-t-C-v-D | 128 | 34 | A-r-B-t-C-w-D | 155 | 24 | A-r-B-u-C-v-D | 176 | 12 |
| A-p-B-t-C-x-D | 128 | 28 | A-s-B-t-C-v-D | 160 | 34 | A-r-B-u-C-x-D | 176 | 12 |
| A-q-B-t-C-w-D | 133 | 8 | A-s-B-t-C-x-D | 160 | 28 | A-r-B-u-C-w-D | 187 | 12 |
| A-p-B-t-C-w-D | 139 | 24 | A-p-B-u-C-v-D | 160 | 12 | A-s-B-u-C-v-D | 192 | 12 |
| A-r-B-t-C-v-D | 144 | 34 | A-p-B-u-C-x-D | 160 | 12 | A-s-B-u-C-x-D | 192 | 12 |
| A-r-B-t-C-x-D | 144 | 28 | A-q-B-u-C-w-D | 165 | 8 | A-s-B-u-C-w-D | 203 | 12 |

4000

IRREGULAR TWO-DIMENSIONAL WIDE-COVERAGE NETWORK

FIELD OF THE INVENTION

The present invention relates to data networks and, in particular, to an irregular two-dimensional wide-coverage network and methods used to route connections through such a network.

BACKGROUND

The envisaged future telecommunications network includes electronic edge nodes and an optical core that comprises a plurality of optical cross connectors. Currently, an optical cross connector has no practical means for storing optical signals. This severe limitation has implications regarding the structure and operation of an optical-core network.

Wavelength-division-multiplexed (WDM) fiber links, each carrying several wavelength channels, connect the edge nodes to the optical cross connectors. The optical cross connectors may also be interconnected by WDM fiber links. In multi-hop routing, individual wavelength channels routed through the network may traverse several optical cross connectors. Such multi-hop routing within the optical core precludes the use of time sharing scheme, such as TDM (time-division multiplexing) switching or burst switching, due to the difficulty of coordinating the switching times among the bufferless optical core nodes.

In a switching node having a plurality of input ports and output ports, where signals arriving at the input ports are generally uncoordinated in the time domain, being generated by independent sources, and have arbitrary destinations, contention resolution is required because input signals arriving at two or more input ports may require connection to a single output port. Contention resolution can be based on a primitive method where one of the signals competing for an output port is accepted while the remaining signals are blocked, i.e., denied a path through the switching node. The blocked signals would be discarded if the respective input ports have no storage facility. Otherwise, the blocked signals can be buffered until given permission to proceed at subsequent intervals of time. Alternatively, contention is avoided by scheduling the transfer of data from input to output.

An edge node that establishes a path through a core node is said to subtend to the core node. An edge node may subtend to some or all of the core nodes of a network. When an edge node subtends to two or more core nodes, it selects a core node to establish a path to a given destination edge node according to some merit criterion. The edge nodes sending data traffic through a core node are said to be subtending edge nodes of the core node.

The path availability for signals arriving at a given input port and destined to several output ports of a switching node do not necessarily occur according to the same order in which the signals arrive to the switching node. Thus, a simple sequential storage facility is not useful to deploy, and, currently, there are no practical means for buffering incoming optical signals and selectively retrieving any signal for switching to a respective output port when a path across the switching node becomes available.

The use of interconnected optical cross connectors in the core of the network leads to an inefficient rigid network. Traversing two or more optical nodes is problematic for the following reasons:

(1) As described above, the absence of buffers makes time sharing of wavelength channels virtually impossible.
(2) The required paths for edge-node pairs must be established, through the core, one at a time. Resources must then be reserved during the path setup phase, which may take a considerable amount of time, several-hundred milliseconds for example. During the path setup phase, the reserved channels are kept idle.
(3) Paths can be blocked due to mismatch of links of sufficient vacancies. For example, there may be several candidate routes, each having two or more hops, from a source edge node to a sink edge node through a plurality of interconnected optical cross connectors. If each candidate route has one link that is fully reserved, a free end-to-end path can not be found even when all other links in the set of candidate routes are lightly loaded. This is conventionally called mismatch blocking. To reduce the mismatch probability, the occupancy of the optical core must be kept at a relatively low level, which can be realized by known internal-expansion techniques but may be considered costly.
(4) Wavelength conversion is often needed in multi-hop optical paths.

To circumvent these difficulties, an obvious solution is to disallow the use of consecutive optical nodes in any path. With this approach, complemented with time coordination between each core node and each of its subtending edge nodes, the buffers at each edge node can be exploited for contention resolution. A time-locking technique is detailed in Applicant's copending U.S. patent application Ser. No. 10/054,509, filed on Nov. 13, 2001 and titled "Time-Coordination in a Burst-Switching Network". With time locking, all edge nodes subtending to a core node can time their transmission to arrive at the optical core node at any desired instant of time. Time locking is feasible when a path between two electronic edge nodes traverses only a single optical core node. This enables adaptive channel switching at the optical core nodes without the need to allow large idle periods between successive path changes. Time locking also enables the use of time-sharing schemes; TDM or burst switching. It also allows the network core to operate at a high mean occupancy, 0.95 for example. Without time locking, time sharing of network transport resources is not possible, and channel switching would require that the core be operated at a lower mean occupancy, of 0.7 for example.

A complete network is defined herein to be a network that can allocate paths of a total capacity of C (bits per second) from any set of channels collectively having a capacity of C (bits per second) and emanating from any group of source nodes to any set of egress channels, collectively having a capacity that equals or exceeds C, and belonging to any group of sink nodes. For example, a source node can transfer its entire traffic to a sink node of at least equal capacity. Therefore, any spatial variation of traffic loads can be accommodated and the need for traffic engineering is virtually eliminated.

The capacity of a node is defined herein as the total data rate that can be switched from the input ports to the output ports of the node. The degree of a node refers to the number of ports in the node. In an asymmetrical node, where the number of output ports differs from the number of input ports, an input-side degree of the node refers to the number of input ports and an output-side degree refers to the number of output ports.

An efficient wide-coverage high capacity complete network that does not allow traversing two consecutive optical nodes would take the form of a composite-star network, or a plurality of composite-star networks as described in Applicant's U.S. patent application Ser. No. 09/624,079 filed on Jul. 24, 2000, and titled "Multi-dimensional Lattice Network".

To be complete, the composite star network must be uniform, having identical optical-core nodes and identical edge nodes. To enable wide coverage, each edge node must have a high degree, having several links to the optical core, and each core node must be able to accommodate a large number of subtending edge nodes.

To enable a high capacity, each edge node must have a large number of input ports and a large number of output ports, with each input or output port supporting a channel of a high bit rate, 10 Gb/s for example. The edge node should also be provided with a high-speed controller to enable fast scheduling that can follow traffic-intensity variation. A versatile high capacity edge node is described in Applicant's copending U.S. patent application Ser. No. 10/025,982, filed Dec. 26, 2001, and titled "Universal Edge Node".

A complete network, as defined above, responds gracefully to wild spatial traffic variation. However, this may be realized at the expense of some added optical-link mileage, as explained in a paper titled "Comparison of two optical-core networks", authored by Blouin et al., Journal of Optical Networking, Vol. 1, No. 1, January 2002.

If the spatial traffic distribution can be determined with a reasonable level of confidence, then it would be possible to relax the strict requirement of network completeness and employ, instead, an incomplete network that is still tolerant to considerable spatial traffic variation.

It is desirable, therefore, to find a structure of an incomplete network that employs edge nodes of different capacities and degrees, and core nodes of different capacities and degrees, while still realizing a high capacity wide-coverage network that also provides high performance under diverse traffic conditions. An optimum incomplete network may include edge nodes of widely varying capacities and degrees and core nodes of different capacities and degrees to reduce fiber-link mileage. There is a need to realize such a network without significantly affecting network performance and agility.

Thus, a non-uniform incomplete composite-star network structure that can realize network economy and control simplicity is required and methods of route selection in such a structure are needed.

SUMMARY

A scaleable high-capacity network comprises several non-uniform composite-star networks interconnected by a number of lateral uniform composite-star networks, thus forming an irregular two-dimensional network. Each non-uniform composite star network comprises electronic edge nodes, possibly of significantly different capacities, interconnected by optical core nodes. The optical core nodes are not connected to each other, and each may be configured differently and have a different reach index, where the reach index of a core node is the number of edge nodes to which the core node connects.

The selection of an optimum route in a non-uniform composite-star network can involve selecting a particular core node in an optical core or selecting a given switching plane within a particular core node. Route selection may be enhanced through the association of metrics with available routes based on such factors as propagation delay, reach of switching unit and availability. Some routes through the non-uniform, incomplete composite-star network may be multi-hop routes, where multi-hop routes require the use of tandem edge nodes where two edge nodes do not connect through at least one core node. Advantageously, route selection at a tandem node may be reflected in a dynamic metric at a source node of such multi-hop routes.

The architecture of the non-uniform, incomplete composite-star network may introduce a need for some traffic engineering, but a careful design such as the one described herein will reduce the dependence on an accurate traffic forecast.

In accordance with an aspect of the present invention there is provided a non-uniform composite-star network. The non-uniform composite-star network includes an optical core including at least two optical core nodes, where the at least two optical core nodes are not connected to each other, at least three edge nodes with at least two of the at least three edge nodes having a different reach index, where a reach index of a given edge node is a metric based on the number of the at least two optical core nodes that can be reached directly by the edge node, a plurality of input links that originate from at least one of the at least three edge nodes and terminate on at least one of the at least two optical core nodes and a plurality of output links Be that originate from the at least two optical core nodes and terminating on at least one of the at least three edge nodes.

In accordance with a further aspect of the present invention there is provided a non-uniform composite-star network. The non-uniform composite-star network includes at least three edge nodes and an optical core including at least two optical core nodes, where the at least two optical core nodes are not connected to each other, each of the at least two optical core nodes terminating input links originating from at least one of the at least three edge nodes and each of the at least two optical core nodes originating output links terminating on at least one of the at least three edge nodes, wherein at least two of the optical core nodes have a different reach index, where a reach index of a given optical core node is a metric based on a number of edge nodes to which said given optical core node directly connects. In accordance with a still further aspect of the present invention there is provided a method of creating a route set in a non-uniform composite-star network, where the route set is a list of at least one route from a source edge node to a sink edge node traversing an optical core node, where an optical core node traversed in a given route is associated with said given route, the route set including preferred parallel routes. The method includes determining a reach index for each of the associated optical core nodes, where a reach index of a given optical core node is a metric based on a number of edge nodes to which said given optical core node directly connects, acquiring a table of propagation delays along each route from the source edge node to the sink edge node traversing each of the optical core nodes, creating a first list, where components of the first list are identities of optical core nodes on which input links originating at the source edge nodes terminate, creating a second list, where components of the second list are identities of optical core nodes at which output links terminating on the sink node originate and creating the route set, where each of the at least one route in the route set is associated with an optical core node identity common to the first list and the second list.

In accordance with another further aspect of the present invention there is provided a network including a plurality of non-uniform composite-star networks, where each non-uniform composite-star networks includes at least three edge nodes and a non-uniform optical core interconnecting the at least three edge nodes, where at least two of the at least three edge nodes have a different degree, where a degree of a given edge node is a metric based on a number of input ports for receiving from the non-uniform optical core and a number of output ports for transmitting to the non-uniform optical core. The network further includes a plurality of uniform optical cores, each of the plurality of uniform optical cores connecting to a selected one of the at least three edge nodes in each of the plurality of non-uniform composite star networks to form a plurality of lateral uniform composite star networks.

In accordance with an even further aspect of the present invention there is provided a method of creating a track set, where the track set is a list of at least one track from a source edge node to a sink edge node, the source edge node belonging to a first network and the sink edge node belonging to a second network, where a lateral network connects to the first network at a first cross-point edge node and connects to the second network at a second cross-point edge node. The method includes creating a first route set of routes through the first network from the source edge node to the first cross-point edge node, creating a second route set of routes through the second network from the second cross-point edge node to the sink edge node, creating a lateral route set of routes through the lateral network from the first cross-point edge node to the second cross-point edge node and creating the track set of tracks from the source edge node to the sink edge node, where each track in the track set includes a selected route in the first route set, a selected route in the second route set and a selected route in the lateral route set.

In accordance with an even further aspect of the present invention there is provided a method for selecting, at a source edge node, a route to satisfy a connection request that specifies a sink edge node and a requested capacity, given a plurality of routes between the source edge node and the sink edge node, where each of the plurality of routes is associated with an optical core node. The method includes among routes in the plurality of routes having available capacity at least equal to the requested capacity, selecting a candidate route associated with an optical core node having minimum reach index, where a reach index of a given optical core node is a metric based on a number of edge nodes to which the given optical core node directly connects.

In accordance with an even further aspect of the present invention there is provided a method of sorting a route set, where the route set is a list of at least one route from a source edge node in an optical network to a sink edge node in the optical network. The method includes determining a composite metric for each route in the route set, where a composite metric for a given route is based on a reach index of an optical core node associated with the given route and a propagation delay along the given route traversing the associated optical core node, where a reach index of a given optical core node is a metric based on a number of edge nodes to which the given optical core node directly connects and sorting the route set based on the composite metric.

In accordance with an even further aspect of the present invention there is provided an edge node in a non-uniform composite-star network, the edge node provided with a route set, the route set including a plurality of routes from the edge node to a sink node, and a requested capacity. The edge node is operable to determine a composite metric for each of the plurality of routes in the route set, where a composite metric for a given route is based on a reach index of an optical core node associated with the given route and a propagation delay along the given route traversing the associated optical core node, where a reach index of a given optical core node is a metric based on a number of edge nodes to which the given optical core node directly connects, sort the route set based on the composite metric to give a sorted route set and select the first route in the sorted route set whose available capacity equals or exceeds the requested capacity.

In accordance with an even further aspect of the present invention there is provided a method of selecting a track from a source edge node in a first network to a sink edge node in a second network responsive to receiving a connection request specifying the sink edge node and a requested capacity, given a track set of tracks from the source edge node to the sink edge node, where the track set includes a merit index associated with each track and where each track is defined by a route through the first network from the source edge node to a first cross-point edge node, a route through the second network from a second cross-point edge node to the sink edge node and a route through a lateral network from the first cross-point edge node to the second cross-point edge node. The method includes selecting a candidate track from the track set, where the candidate track is associated with the optimum merit index in the track set, determining a vacancy for the candidate track and where the vacancy equals or exceeds the required capacity, transmitting an acceptance indication indicating an acceptance of the connection request.

In accordance with an even further aspect of the present invention there is provided a method of selecting a track from a source edge node in a first network to a sink edge node in a second network responsive to receiving a connection request specifying the sink edge node and a requested capacity, given a trail set of trails from the source edge node to the sink edge node, where the trail set includes a trail merit index associated with each trail in the trail set and where each trail in the trail set is defined by a first cross-point edge node in the first network and each trail in the trail set is associated with a plurality of tracks, where each of the plurality of tracks associated with a trail specifies a route through the first network from the source edge node to the first cross-point edge node, a route through the second network from a second cross-point edge node to the sink edge node and a route through a lateral network from the first cross-point edge node to the second cross-point edge node. The method includes selecting a candidate trail from the master route set, where the candidate trail is associated with the optimum trail merit index in the trail set, where a track merit index is associated with each of the plurality of tracks and a trail merit index for a given trail is based on the track merit indices of the plurality of tracks associated with the given trail, selecting a candidate track from the candidate trail, where the candidate track is associated with the optimum track merit index of the plurality of tracks in the candidate trail, determining a vacancy for the candidate track and, where the vacancy equals or exceeds the required capacity, transmitting an acceptance indication indicating an acceptance of the connection request.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 11A illustrates the addition of wavelength converters at the input side of an optical switching plane, according to an embodiment of the present invention;

FIG. 11B illustrates the addition of wavelength converters at the output side of an optical switching plane, according to an embodiment of the present invention;

FIG. 30 illustrates an input-side connectivity matrix for an exemplary parallel-plane core node according to an embodiment of the present invention;

FIG. 38 illustrates the computation of track merit indices for alternate tracks of the trail of FIG. 37 according to an embodiment of the present invention;

FIG. 39 tabulates the tracks in the trail illustrated in FIG. 37; and

FIG. 40 is a track set within a single trail indicating the merit index and vacancy of selected routes according to an embodiment of the present invention.

DETAILED DESCRIPTION

A network has outer ports and inner ports. The outer ports comprise input ports and output ports. Similarly, the inner ports comprise input ports and output ports. The outer ports are connected to traffic sources and traffic sinks, and inner ports are connected to each other. The ports are typically grouped into sets, each of which comprising an edge node or a core node. An edge node includes outer ports and inner ports while a core node includes only inner ports. Within an edge node, outer input ports may communicate directly with outer output ports. Outer ports of different edge nodes communicate with each other through inner ports. The term "outer capacity" relates to the total capacity of the outer ports of a network and the term "inner capacity" relates to the total capacity of the inner ports of a network. The outer capacity is the capacity available to network users. In an ideal network, the ratio of inner capacity to outer capacity is close to one. A high ratio is generally indicative of an inefficient network.

An edge node connected to traffic sources is called a source edge node, or, for brevity, a source node. An edge node connected to traffic sinks is called a sink edge node, or, for brevity, a sink node. A link from a source edge node to a core node is called an uplink and a link from a core node to a sink edge node is called a downlink. A channel in an uplink is called an upstream channel and a channel in a downlink is called a downstream channel.

The network may have a large number, possibly several thousands, of edge nodes, with each edge node comprising a source node, that receives traffic from data sources, and a sink node, that delivers traffic to data sinks. The source node and the sink node of an edge node share memory and control. Where a distinction between the source-node part and the sink-node part of an edge node is not necessary, either may be referenced simply as an edge node.

Figure 1:
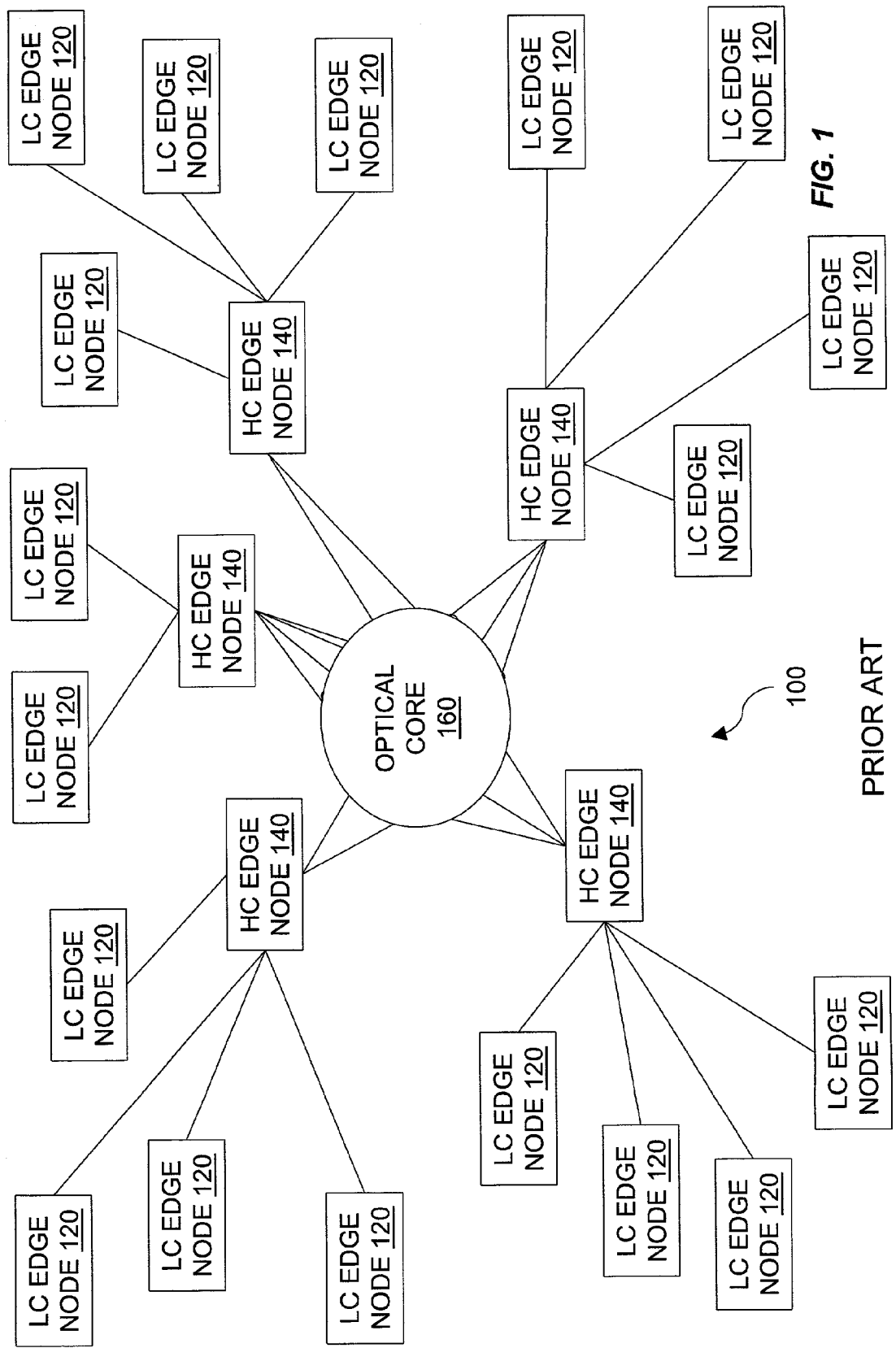
FIG. 1 illustrates a prior-art hierarchical network.

FIG. 1 illustrates a prior-art hierarchical network 100. In the hierarchical network 100, an optical core 160, comprising several optical core nodes (not shown), is used to interconnect high capacity electronic edge nodes 140. Each high capacity (HC) electronic edge node 140 is shown to serve a group of subtending low capacity (LC) electronic edge nodes 120. High-capacity electronic edge nodes also support directly connected traffic sources and traffic sinks. Data exchanged between two low capacity electronic edge nodes 120 in a group of LC edge nodes 120 served by the same high capacity electronic edge node 140 is switched through the high capacity electronic edge node 140 serving that group. Data exchanged between two low capacity electronic edge nodes 120 belonging to different groups (i.e., connecting to different high capacity electronic edge nodes 140) is switched at a first high capacity electronic edge node 140 to an optical core node (not shown) in the optical core 160 and is switched at the optical core to a second high capacity electronic edge node 140 for sending to the destination low capacity electronic edge node 120. The number of links connecting a node to other nodes is likely to increase with increased node capacity.

The arrangement of the hierarchical network 100 allows the aggregation of traffic from low capacity electronic edge nodes into high capacity electronic edge nodes. A network such as the hierarchical network 100 is typically engineered according to spatial traffic distribution, which may be predicted or estimated from measurements. Specifically, the links between the optical core nodes (not shown) and the high capacity electronic edge nodes 140 are typically sized to meet the demands of the traffic transiting through the optical core 160. If the traffic for a group of low capacity electronic edge nodes 120 remains local to the group, a link from the corresponding high capacity electronic edge node 140 to the optical core 160 may have a relatively small capacity, with corresponding cost savings. Hierarchical structures may result in unnecessary increase of the number of hops per connections.

Figure 2:
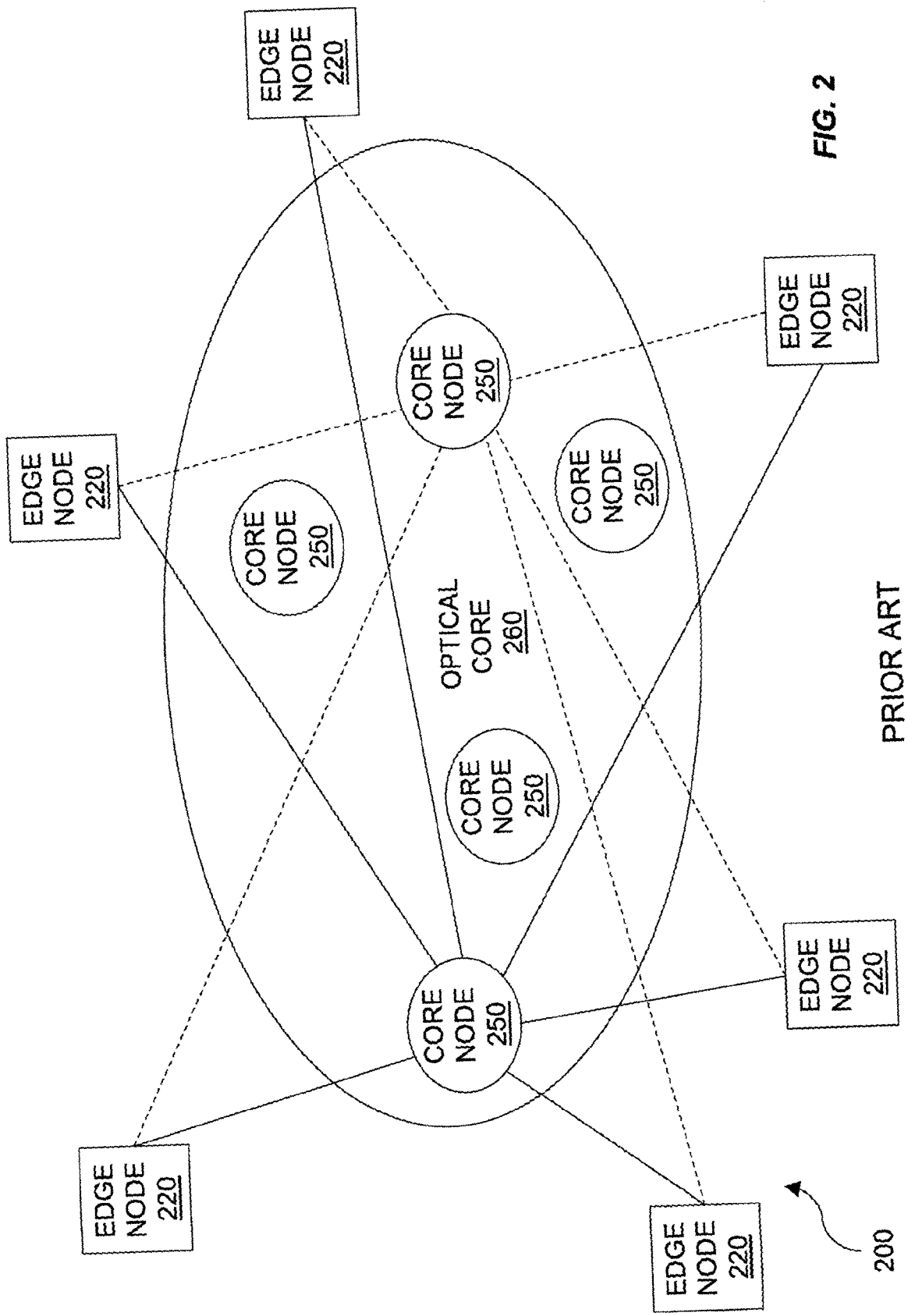
FIG. 2 illustrates a prior-art uniform composite-star network including an optical core populated by optical core nodes.

FIG. 2 illustrates a prior-art uniform composite-star network 200 where electronic edge nodes 220 of equal capacity are connected by an optical core 260 comprising several optical core nodes 250 of equal degree. The degree of a given optical core node 250, having an equal number of input and output ports, is the number of dual ports at the given optical core node 250, which determines the maximum number of electronic edge nodes 220 that can be directly connected to the given optical core node 250. A dual port comprises an input port and an output port. Though not all connections are shown, each of the electronic edge nodes 220 in FIG. 2 is connected to all of the optical core nodes 250. Consequently, each of the optical core nodes 250 is connected to all of the electronic edge nodes 220 in FIG. 2. The optical core nodes 250 are not connected to each other, this lack of connection between the optical core nodes 250 facilitates agility and capacity time-sharing.

Data exchanged between two electronic edge nodes 220 in FIG. 2 traverses one optical core node 250, in what may be called a single hop. In the uniform network 200 of FIG. 2, the capacities of the links connecting electronic edge nodes 220 to a given optical core node 250 are equal. The capacity of an electronic edge node 220 is defined as the sum of the capacities of its links. Since each electronic edge node 220 has the same number of links to the same optical core nodes 250, and since all links to a particular optical core node 250 are of equal capacity, it follows that all of the electronic edge nodes 220 have the same capacity. The arrangement of the uniform network 200 of FIG. 2 forms a complete network, that is, a network where an electronic edge node 220 can send all its traffic to another electronic edge node 220, of the same or higher capacity. In contrast to the hierarchical network 100, prior knowledge of traffic distribution is not required to engineer the uniform network 200 of FIG. 2.

In an incomplete network, the use of a tandem edge node may be required when data from a first edge node is destined for a second edge node that is not connected to any of the optical core nodes to which the first edge node is connected or when the first and second edge nodes connect to the same optical core nodes but the available-paths' capacity through the optical core nodes is insufficient to handle the traffic load from the first edge node to the second edge node. Instead of a single hop to the second edge node, data is sent from the first edge node to a tandem edge node that is connected to both an optical core node to which the first edge node is connected and an optical core node to which the second edge node is connected. Once having reached the tandem edge node, the data may then be sent on a single hop to the second edge node.

Figure 3:
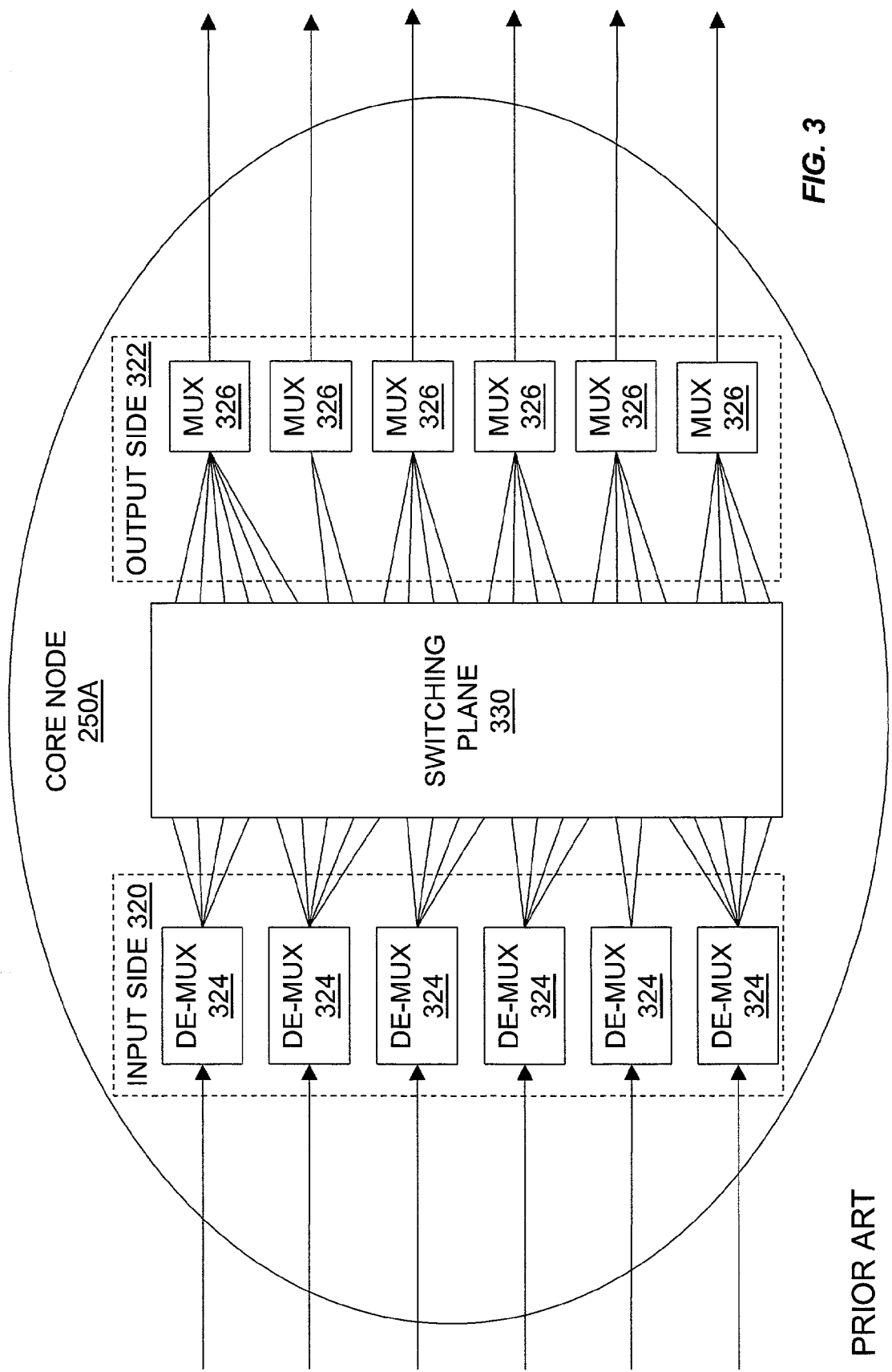
FIG. 3 illustrates an exemplary one of the optical core nodes FIG. 2 using a single switching plane.

FIG. 3 illustrates an exemplary optical core node 250A of the optical core nodes 250 of FIG. 2. The exemplary optical core node 250A has a single switching plane 330 that connects an input side 320 of the exemplary optical core node 250A to an output side 322 of the exemplary optical core node 250A. The input side 320 connects to input links, each input link carrying optical signals on multiple wavelength channels. The numbers of wavelength channels in the input links need not be equal. The optical signal of the multi-channel input link is separated by demultiplexer (DE- MUX) 324 into its constituent wavelength channels and each wavelength channel is sent to an input port of the switching plane 330. The switching plane 330 may switch wavelength channels or bands wavelength channels. At the output side 322, multiplexers (MUX) 326 receive the wavelength channels output from output ports of the switching plane 330 and combine the received wavelength channels, or wavelength channel bands, onto output links destined for the electronic edge nodes 220. The output links need not be of equal capacity, each having an arbitrary number of wavelength channels. Naturally, the combined number of wavelength channels in the input links cannot exceed the number, P1, of input ports, and the combined number of wavelength channels in the output links cannot exceed the number, P2, of output ports of the switching plane 330. The advantage of the configuration of FIG. 3 is the ability to accommodate input links and output links of arbitrary capacities. Wavelength converters, placed at the input ports or the output ports of switch 330 enable any channel in an input link to be multiplexed with other wavelength channels in any output link. The main disadvantage of the configuration of FIG. 3 is the limited scalability, with the capacity of the entire optical node 250A determined by the capacity of the single switching plane 330. This limitation can be overcome using the conventional configuration of FIG. 4

Figure 4:
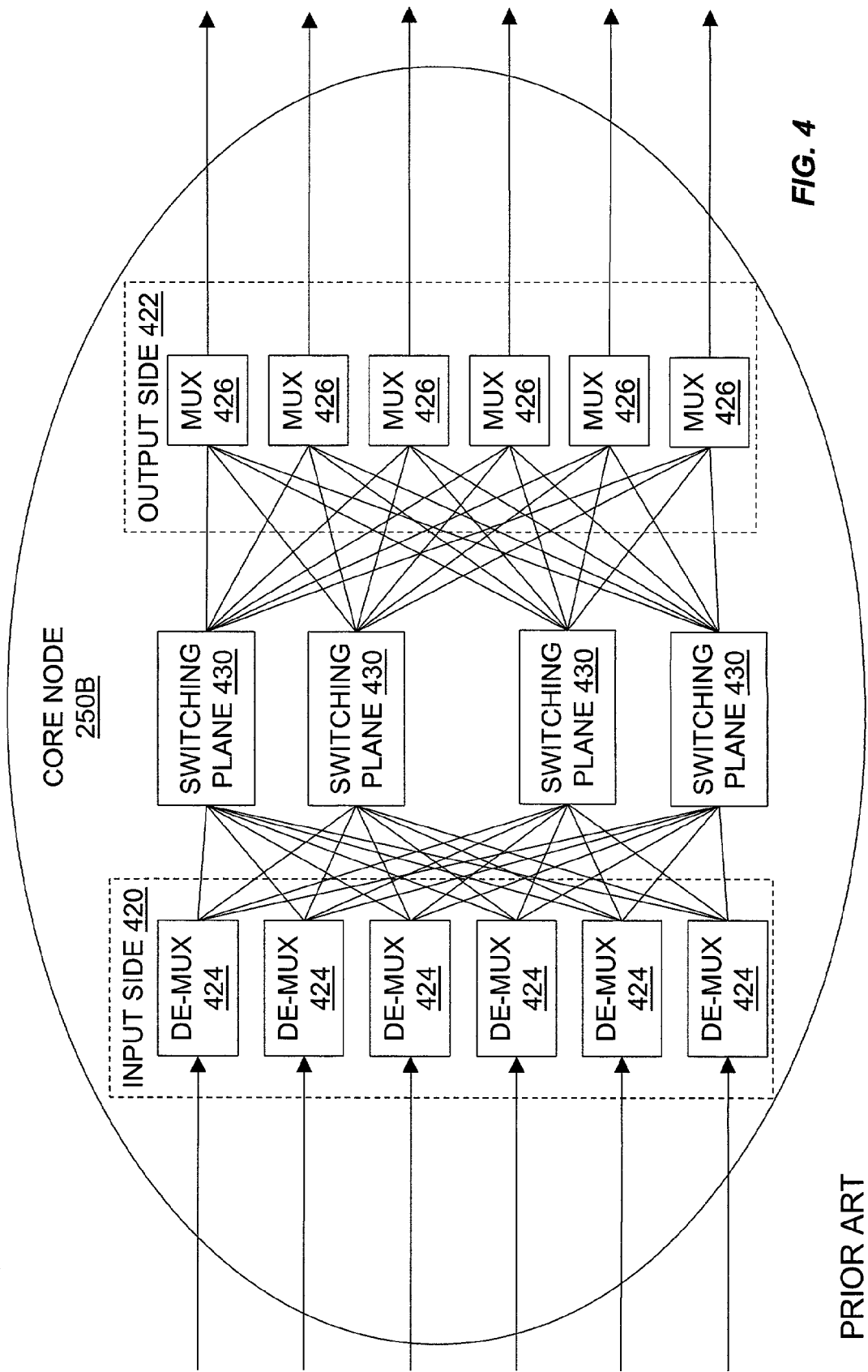
FIG. 4 illustrates an exemplary one of the optical core nodes FIG. 2 using parallel switching planes.

FIG. 4 illustrates an exemplary optical core node 250B of the optical core nodes 250 of FIG. 2. The exemplary optical core node 250B has a set of parallel switching planes 430 that connect an input side 420 to an output side 422 of the exemplary optical core node 250B. The input side 420 connects to input links of equal capacity, each input link carrying optical signals on multiple wavelength channels. Specifically, each optical signal on a multi-channel input link is received by a demultiplexer (DE-MUX) 424, which divides the optical signal into its constituent wavelength channels and sends each wavelength channel to a corresponding one of the switching planes 430. The switching planes 430 are of equal degree, where the degree of a given switching plane 430 is the number of ports of the given switching plane 430, hence the maximum number of electronic edge nodes 220 that may be connected to the given switching plane 430. In the exemplary optical core node 250B, each of the switching planes 430 is an optical device for switching wavelength channels of fixed capacity. A switching plane 430 is a space switch switching wavelength channels or bands of wavelength channels. At the output side 422, multiplexers (MUX) 426 receive the wavelength channels output from the switching planes 430 and combine the received wavelength channels, or wavelength channel bands, onto optical signals sent on output links of equal capacity destined for the electronic edge nodes 220.

The text-book structure of a parallel-plane core node of FIG. 4 can be implemented in at least two forms.

In a first form, each optical space switch 430 switches input optical signals of a respective wavelength band. Recall that a modulated wavelength spreads into a wavelength band which constitutes a wavelength channel. For brevity, a wavelength band defining a channel (a wavelength channel) may often be referenced as a channel or a wavelength. The advantage of restricting each switching plane to a wavelength band is that the combining of switched wavelength channels at an output multiplexer requires no wavelength conversion, because the wavelength bands assigned to the different switching planes 430 are non-overlapping, and generally well spaced.

In a second form, optical space switching is realized using couplers. U.S. Pat. No. 5,889,600, issued Mar. 30, 1999 to McGuire discloses an alternative form of an optical cross-connector configured for use at a node in a WDM hierarchical telecommunication system that includes an optical layer overlying various electronic layers. The optical cross-connector comprises (1) a plurality of input means, to which input optical fibers are connected, each for receiving a respective group of input signals and deriving, in response to each input signal of the group, an individual optical signal of a respective given wavelength, (2) a plurality of output means, to which output optical fibers are connected, each including a plurality of receptors selectively responsive to respective ones of the wavelengths of said optical signals to provide an output signal for the output means, and (3) a plurality of coupling means each for coupling a respective one of said optical signals, each of a different wavelength, from each of the input means, to a respective receptor of each of the output means. The plurality of coupling means may comprise a plurality of star couplers, or a plurality of optical bus lines to which the input and output means may be selectively added and removed as modules. Tunable filters are deployed at output to enable selecting input signals and wavelength converters are included at output to enable sharing a WDM output link. With a suitable selection of the pass frequencies of a filter, selection of individual signals can be achieved for each output fiber so that a selective cross-connection can be achieved between the input fibers and output fibers.

Before describing the embodiments of the present invention, definitions of nodal and network connectivity parameters are provided.

The degree of an optical switching plane is determined by its number of ports. An optical switching plane having P input ports and P output ports has a degree, D, equal to P. An asymmetrical switching plane having P1 input ports and P2 output ports, where P2 is not equal to P1, can be defined as the lesser of P1 and P2. Alternatively, the degree of an asymmetrical switching plane can be defined as the arithmetic mean of P1 and P2, i.e., $D=(P1+P2)/2$, or the geometric mean of P1 and P2, i.e., $D=\sqrt{(P1 \times P2)}$. Accordingly, the degree can be a non-integer number.

The maximum number of simultaneous connections from the input ports to the output ports is the lesser of P1 and P2 in unicast communications, or P2 in multi-cast communications. Thus, in a TDM switching plane, the maximum number of unicast switched data units is S times the lesser of P1 and P2, where S is the number of time slots per TDM frame.

The coverage of an optical switching plane is determined according to the number of links that can be accommodated. A coverage index of a given optical switching plane is defined herein as the number of links supported by the given optical switching plane. In an asymmetrical switching plane, the coverage index of the input side can differ from that of the output side. A "full-coverage" switching plane is realized when each input port connects to a single channel of an input link and each output port connects to a single channel of an output link. Minimum coverage results when all the channels of an input link connect to the same switching plane and all the channels of an out put link connect to the same switching plane.

A switching plane having P input ports and P output ports and connecting to input links and output links each having W wavelength channels can accommodate $\lfloor P/W \rfloor$ input links and an equal number of output links where $\lfloor r \rfloor$ denotes the integer part of a real number r. The coverage index, G, is then $G=\lfloor P/W \rfloor$. An optical switching plane having P1 input ports and P2 output ports can connect to a maximum of P1 input links and a maximum of P2 output links, each connection being limited to a single channel. With J and K denoting the number of input links and the number of output links, respectively, full coverage is realized when $J \leq P1$ and $K \leq P2$, and the coverage index G may then be defined as the lesser of J and K. Alternatively, the coverage index can be defined as the arithmetic mean of J and K, or the geometric mean of J and K.

In a parallel-plane optical core node supporting J multi-channel input links connecting to an input-side and K multi-channel output links connecting to an output side, where the multi-channel links may contain different numbers of channels, some of the switching planes may not connect to all upstream channels (channels on the input links) and all downstream channels (channels on the output links). Such switching planes are called partial-coverage switching planes. It is desirable, in a parallel-plane switching node, to select the input-side connectivity and output-side connectivity so that the number of switching planes providing full coverage is maximized. Full coverage allows any input link to communicate with any output link. A procedure for assigning the channels of input links to the input ports of a parallel-plane optical core node, according to an embodiment of the present invention, is described below with reference to FIGS. 29, 30, and 31. The procedure is equally valid for the assignment of channels of output links to output ports.

The definition of degree and coverage index apply to a single switching plane. For an optical core node having several switching planes, a suitable connectivity parameter is a reach index.

The reach index of a core node in a composite-star network is defined herein as the number of edge nodes that can exchange signals through the core node. The reach index of a parallel-plane optical core node equals the coverage index of the highest-coverage switching plane included within the optical core node.

The reach index of an edge node in a composite-star network is defined herein as the number of core nodes that can be reached directly by the edge node.

In overview, to accommodate varying traffic demands while attempting to minimize cost, it is desirable to allow for edge nodes of different capacities (such as those in FIG. 1) to connect to an optical core in a composite-star network configuration (such as the network configuration of FIG. 2). In a first approach proposed herein, this accommodation may be achieved by connecting some edge nodes of a first capacity to only a subset of the optical core nodes in an optical core, thereby reducing the number of links required per edge node. In a second approach, non-uniform edge node capacity is accommodated by allowing non-uniform capacity of the links between edge nodes and optical core nodes, the capacity of a link being determined by the number of wavelength channels carried. In a third approach, the first and second approaches are combined. All of these approaches are made possible through the provision of an optical core node that includes optical switching planes of differing coverage indices and the provision of an optical core including such optical core nodes, wherein the optical core nodes have differing reach indices.

Figure 5:
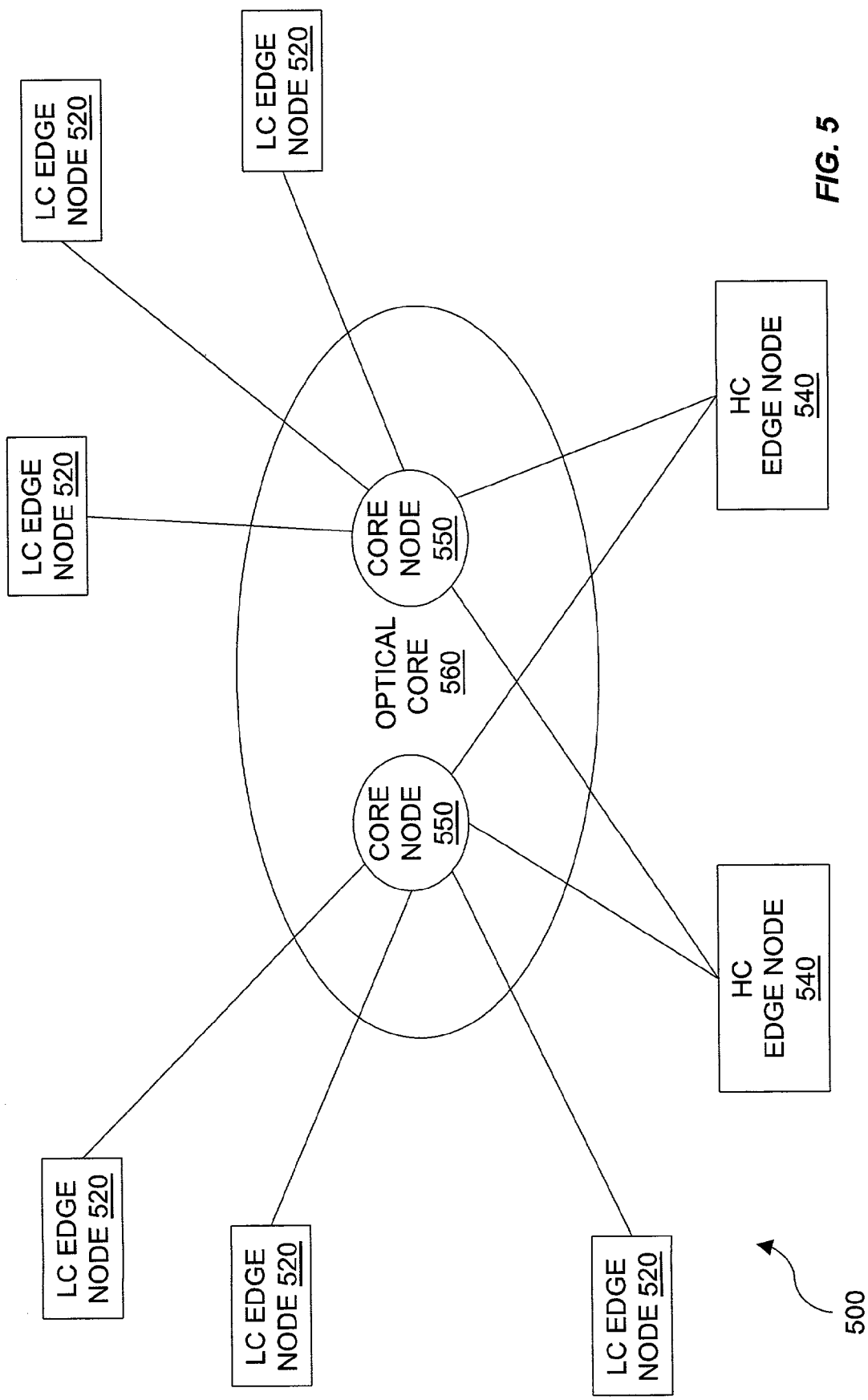
FIG. 5 illustrates a non-uniform and incomplete composite-star network according to an embodiment of the present invention.

FIG. 5 illustrates a non-uniform (and incomplete) network 500 that implements the first approach discussed hereinbefore, wherein edge nodes of two distinctly different capacities are interconnected by optical core nodes of equal reach index. An optical core 560 comprises two optical core nodes 550 of equal reach indices (reach index is five). Each of a set of low capacity (LC) electronic edge nodes 520 is connected to one (i.e., a subset) of the two optical core nodes 550. Each of a set of high capacity (HC) electronic edge nodes 540 is connected to both (i.e., all) optical core nodes 550. The high capacity electronic edge nodes 540 can exchange data with each other and with the low capacity electronic edge nodes 520 directly through any of the optical core nodes 550. The low capacity electronic edge nodes 520 that are connected to the same optical core node 550 can exchange data directly through that optical core node 550. The low capacity electronic edge nodes 520 that are not connected to the same optical core node 550 can exchange data by using one of the high capacity electronic edge nodes 540 as a tandem node. Preferably, traffic-distribution estimates are used to design such a network to realize network economy. Even a coarse traffic-distribution estimate can be useful.

In a well designed version of the non-uniform network 500, wherein tandem traffic is kept to a minimal level, a particular optical core node 550 interconnects those low capacity electronic edge nodes 520 that are part of a community of interest, that is, those low capacity electronic edge nodes 520 with a relatively large quantity of mutual traffic. The low capacity electronic edge nodes 520 that are not interconnected directly with an optical core node 550 may be expected to have only a relatively small amount of mutual traffic.

Figure 6B:
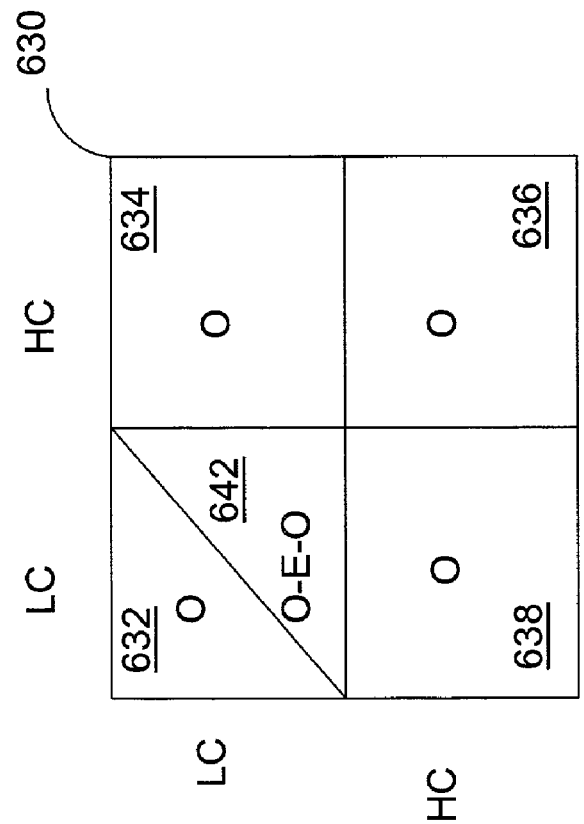
FIG. 6B illustrates, in chart form, the number and the nature of the intermediate switching points for connections in the non-uniform network of FIG. 5.
Figure 6A:
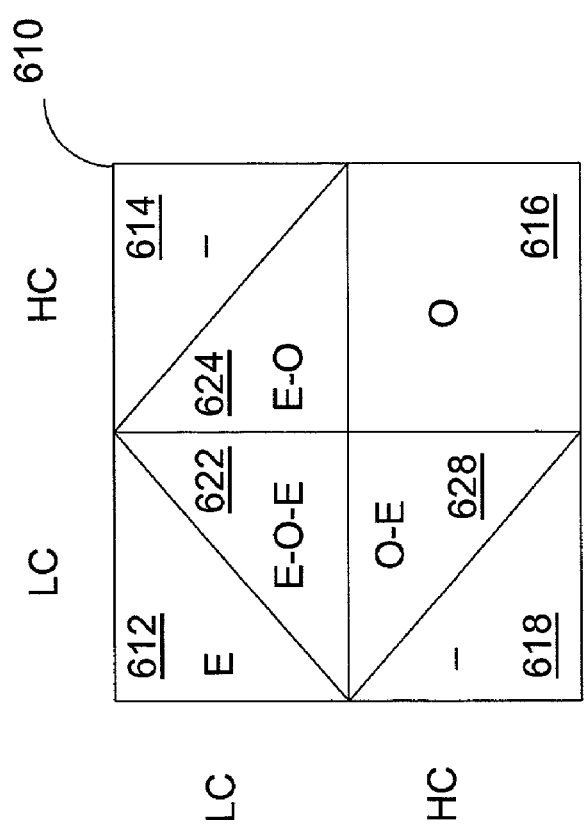
FIG. 6A illustrates, in chart form, the number and the nature of the intermediate switching points for connections in the hierarchical network of FIG. 1.

The switching stages for a connection in the optical-core hierarchical network 100 illustrated in FIG. 1 and in the non-uniform optical-core composite-star network 500 illustrated in FIG. 5 are depicted in the two charts 610 and 630 of FIG. 6A and FIG. 6B, respectively. The edge nodes are categorized in two types: a low-capacity (LC) type and a high-capacity (HC) type. Each chart is divided into four quadrants corresponding to connections from an LC edge node to another LC edge node, an LC edge node to a HC edge node, a HC edge node to an LC edge node, and a HC edge node to another HC edge node. A quadrant may also be divided into an outer cell and an inner cell, where an outer cell relates to two nodes subtending to the same node, and an inner cell relates to two nodes subtending to different nodes.

Only intermediate switching stages are indicated in FIG. 6A and FIG. 6B. The switching functions at the source and sink edge nodes are similar in the two networks of FIG. 1 and FIG. 5.

The symbols in FIG. 6A and 6B are interpreted as follows: a hyphen (-) indicates a direct connection with no intermediate switching stage, the symbol 'O' indicates an intermediate optical-switching stage, the symbol 'E' indicates an electronic intermediate-switching stage.

The notation 'O-E' indicates an intermediate optical switching stage followed by an intermediate electronic switching stage. The notation 'E-O' indicates an intermediate electronic switching stage followed by an intermediate optical switching stage. The notation 'E-O-E' indicates an electronic, optical, then electronic intermediate switching stages. The notation 'O-E-O' indicates an optical, electronic, then optical intermediate switching stages. It is noted that an intermediate electronic switching stage requires two additional steps of optical-to-electrical conversion and electrical-to-optical conversion in addition to the switching stage 'E'.

The switching stages in the hierarchical network of FIG. 1 are described below.
 (1) A connection from an LC edge node 120 to another LC edge node 120, both subtending to the same HC edge node 140, requires one electronic-switching stage as indicates in cell 612.

(2) A connection from an LC edge node 120 to a HC edge node 140 to which the LC edge node 120 subtends is a direct connection as indicated in cell 614.

(3) A connection from a source HC edge node 140 to a sink HC edge node requires only optical switching within the optical core 160, as indicated in quadrant 616.

(4) A connection from a HC edge node 140 to a subtending LC edge node 120 is a direct connection as indicated in cell 618.

(5) A connection from a source LC edge node 120 to a sink LC edge node 120 where the two edge node subtend to different HC edge nodes requires E-O-E intermediate switching, as indicated in quadrant 622, where an electronic-switching stage takes place at the HC edge node 140 to which the source edge node connects, an optical switching stage takes place within the optical core 160 (and may require more than one optical switching step), and an electronic switching stage takes place at the HC edge node 140 that connects to the sink LC edge node 120.

(6) A connection from a source LC edge node 120 to a sink HC edge node 140 where the source and sink edge nodes are not directly connected requires an electronic switching stage at a HC edge node to which the source LC edge node connects and an optical switching stage within the optical core 160, as indicated by the notation 'E-O' in cell 624.

(7) A connection from a source HC edge node 140 to a sink LC edge node 120 where the HC and LC edge nodes are not directly connected requires optical switching within the optical core 160 followed by an electronic switching stage at a HC edge node to which the sink LC edge node connects, as indicated by the notation 'O-E' in cell 628.

The switching stages in the non-uniform composite-star network of FIG. 5 are described below.

(1) A connection from a source LC edge node 520 to a sink edge node 520/540 (LC or HC), where both the source and sink edge nodes connect to the same optical core node 550, requires one optical-switching stage through the optical core node 550 as indicates in cell 632 and quadrant 634.

(2) A connection from a source HC edge node 540 to a sink edge node 520/540 (LC or HC), where both the source and sink edge nodes connect to the same optical core node 550, requires a single optical-switching stage through the optical core node 550 as indicates in quadrants 636, and 638.

(3) A connection from a source LC edge node 520 to a sink LC edge node 520, where the source and sink edge nodes do not connect to a common optical core node, requires O-E-O intermediate switching, as indicated in quadrant 642, where an optical-switching stage takes place in a first core node 550 to which the source edge node connects, an optical switching stage takes place in a second core node to which the sink edge node connects, and an electronic-switching stage takes place at a HC edge node 540 that connects to both the first and second optical core nodes.

Thus, the non-uniform optical-core composite-star network illustrated in FIG. 5 requires less switching resources, and less optical-to-electrical and electrical to optical conversions, than the optical-core hierarchical network illustrated in FIG. 1.

Figure 7:
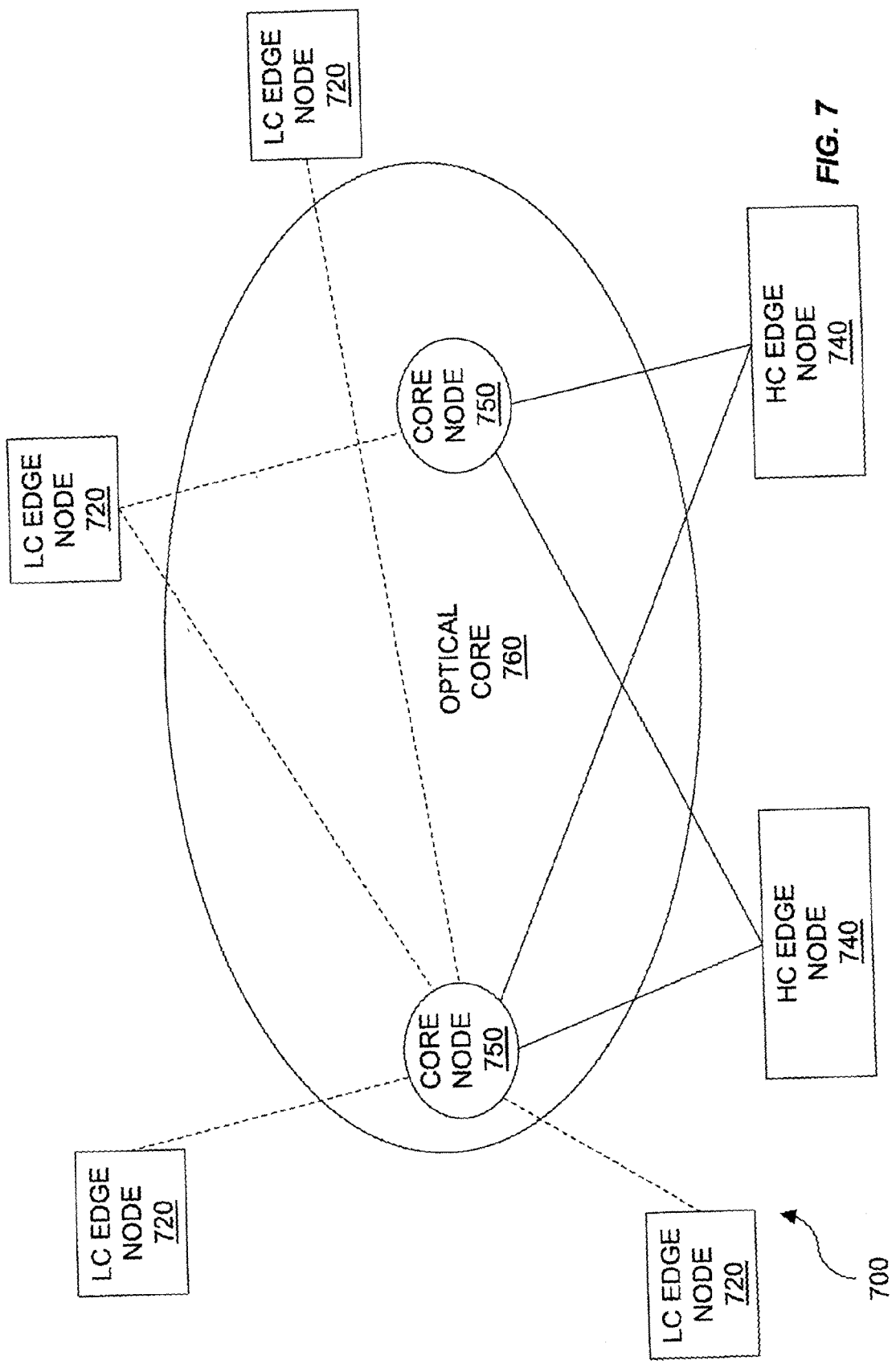
FIG. 7 illustrates a non-uniform and incomplete composite-star network according to another embodiment of the present invention.

FIG. 7 illustrates a non-uniform network 700 that implements the second approach, wherein non-uniform edge node capacity is accommodated by allowing non-uniform link capacity, i.e., number of wavelength channels in the links between edge nodes and optical core nodes. In the non-uniform network 700 of FIG. 7, high capacity (HC) electronic edge nodes 740 are connected to an optical core 760, comprising several optical core nodes 750 of unequal reach index, by high capacity links (solid lines), each carrying 32 wavelength channels for example. Additionally, low capacity electronic edge nodes 720 are connected to the optical core nodes 750 of the optical core 760 by low capacity links (dashed lines), each carrying eight wavelength channels for example. The optical core nodes 750 are adapted to be able to accommodate the links of non-uniform capacity, as will be described with reference to FIGS. 10 and 12.

As described earlier, the capacity of an optical core node is the total data rate that can be switched from the input ports to the output ports of the optical core node. The capacity of a link is the sum of the capacities of its constituent channels. For example, a link comprising 32 channels, with each channel modulated at 10 Gb/s, has a link capacity of 320 Gb/s.

Each edge node has input ports, hereinafter called source ports (outer input ports), that receive data traffic from traffic sources, output ports, hereinafter called sink ports (outer output ports), that deliver data traffic to traffic sinks, input ports, hereinafter called receiving ports (inner input ports), that receive signals from optical core nodes, and output ports, hereinafter called sending ports (inner output ports), that send signals to optical core nodes. A number of sending ports can multiplex their signals onto a WDM uplink that comprises signals of several wavelength channels. A WDM downlink may have several wavelength channels which are demultiplexed and, and after optical-to-electrical conversion, connected to receiving ports of an edge node. A symmetrical edge node has a number of receiving ports that equals the number of sending ports, and each of its uplinks has a counterpart downlink of equal capacity, with all input ports and output ports operating at the same bit rate. An uplink and its downlink counterpart in a symmetrical edge node is called a dual link.

Figure 8:
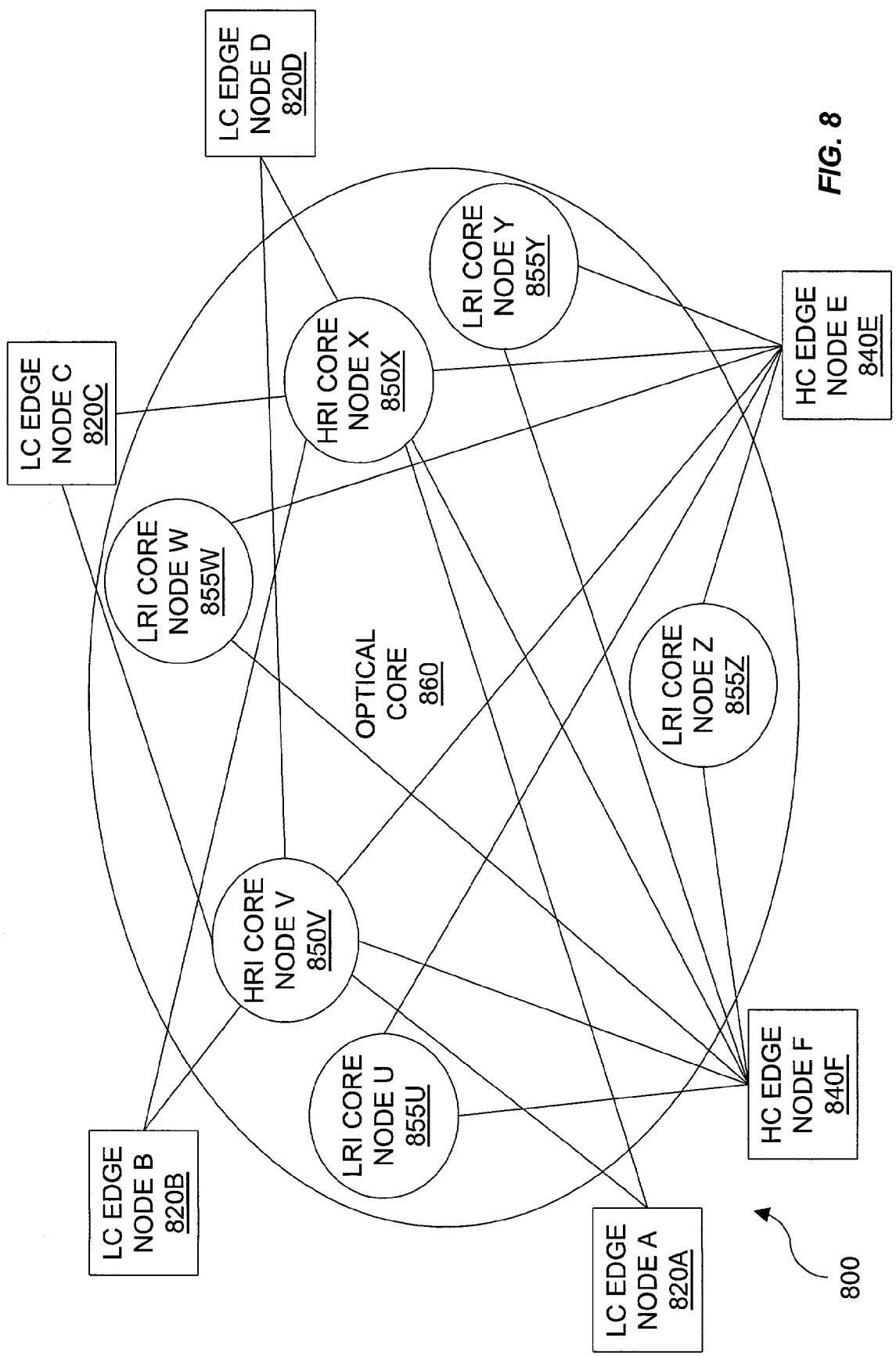
FIG. 8 illustrates a non-uniform composite-star network having edge nodes of different reach-indices and core nodes of different coverage indices according to a further embodiment of the present invention.

FIG. 8 illustrates a non-uniform, composite-star network 800 wherein electronic edge nodes of diverse capacities are connected by an optical core 860 comprising several optical core nodes of different reach indices, and generally having diverse capacities. In particular, the optical core 860 includes high reach index (HRI) optical core nodes 850V, 850X (referred to herein collectively or individually as 850) and low reach index (LRI) optical core nodes 855U, 855W, 855Y, 855Z (referred to herein collectively or individually as 855). The electronic edge nodes of diverse capacities include high capacity (HC) electronic edge nodes 840E, 840F (referenced herein collectively or individually as 840) and low capacity (LC) electronic edge nodes 820A, 820B, 820C, 820D (referenced herein collectively or individually as 820). Each of the low reach index optical core nodes 855 connects to a small number of high capacity electronic edge nodes 840. A high reach index optical core node 850 connects to a large number of electronic edge nodes 820, 840.

As in the non-uniform network 500 of FIG. 5, some electronic edge nodes 820 connect to a subset of the optical core nodes 850V, 850X in the optical core 860, while other electronic edge nodes 840 connect to all of the optical core nodes 850, 855 in the optical core 860. Additionally, as in the non-uniform network 500 of FIG. 5, those electronic edge nodes 820, 840 that are connected to the same optical core node 850, 855 can exchange data directly, while electronic edge nodes 820, 840 that are not connected to the same optical core node 850, 855 must exchange data through a tandem electronic edge node 840, twice traversing the optical core 860.

In the networks of FIGS. 2, 5, 7 and 8, a link from a source edge node to a core node is called an uplink and a link from a core node to a sink edge node is called a downlink. A channel in an uplink is called an upstream channel and a channel in a downlink is called a downstream channel as described earlier.

Figure 9:
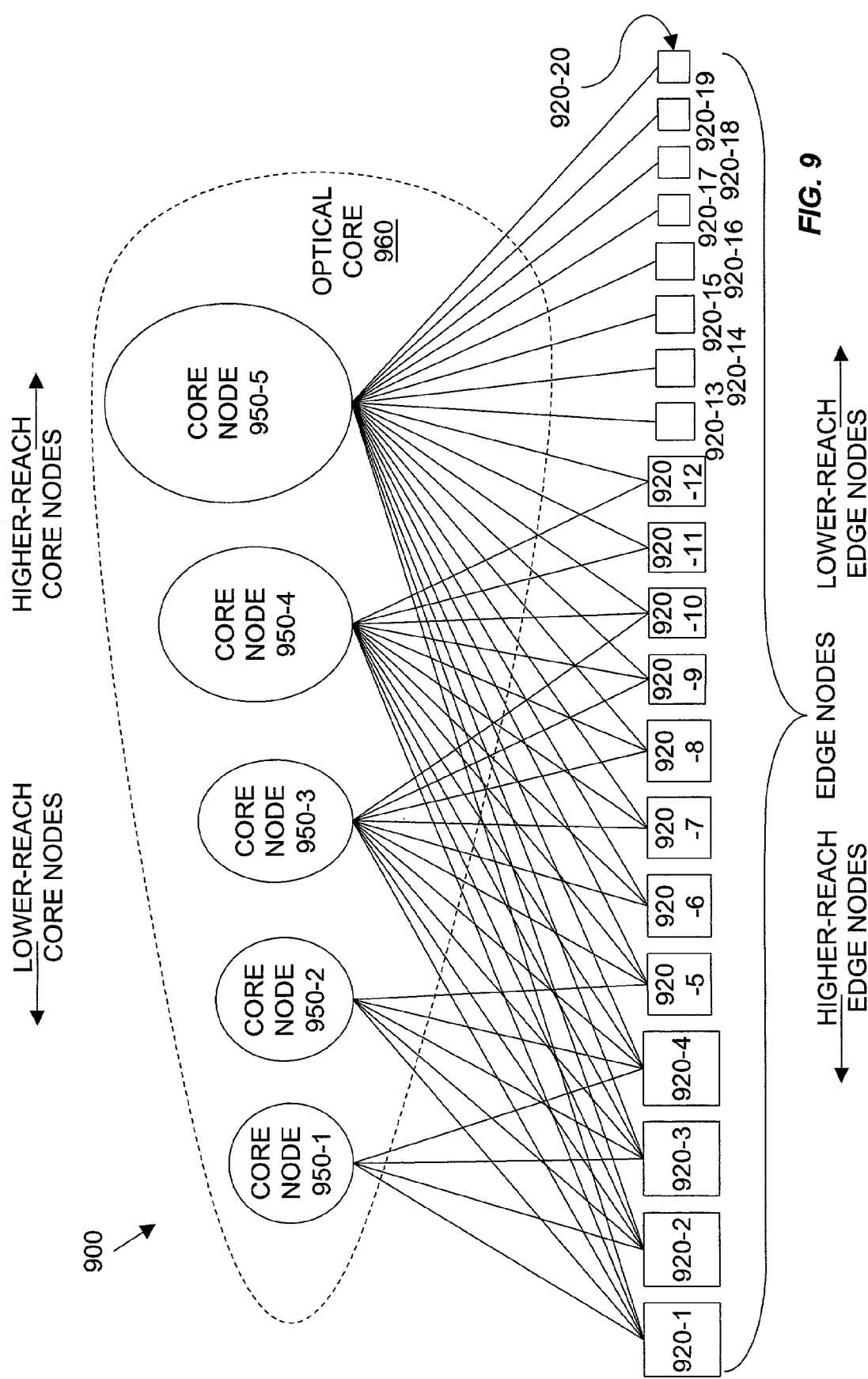
FIG. 9 provides a simplified illustration of a network of the type of the network of FIG. 8.

FIG. 9 illustrates a non-uniform network 900 of the same type as the network 800 of FIG. 8, presented in a simplified form. FIG. 9 illustrates an array of edge nodes 920-1, 920-2, 920-3, 920-4, 920-5, 920-6, 920-7, 920-8, 920-9, 920-10, 920-11, 920-12, 920-13, 920-14, 920-15, 920-16, 920-17, 920-18, 920-19, 920-20 it (referred to collectively or individually as 920) of different capacities and reach indices, and an array of optical core nodes 950-1, 950-2, 950-3, 950-4, 950-5 (referred to collectively or individually as 950) forming an optical core 960. The edge nodes 920 are arranged according to reach, with those of high reach appearing on the left side. When several edge nodes 920 are of the same reach index, they are arranged consecutively. The arrangement of FIG. 9 is a logical representation of the non-uniform composite star network 900 which clearly illustrates the connectivity of the edge nodes 920 to the optical core nodes 950. It is understood that each line connecting an edge node to a core node represents two links, an uplink and a downlink, which can be of different capacities. With each link carrying multiple wavelength channels, and with each channel having the same capacity, 10 Gb/s for example, it follows that a high capacity link carries a larger number of wavelength channels. The connectivity of network 800 of FIG. 8 ensures that at least one core node has a full-reach, i.e., its reach index equals the number of edge nodes.

This connectivity pattern, when complemented with a method of selecting an optical core node, and switching planes within a selected optical core node, for a particular connection, increases the throughput of a non-uniform optical-core network. When the optical core nodes 950 are operated in a TDM mode, the use of temporal-packing procedures, described below with reference to FIGS. 25 to 28, in assigning time slots for a connection further enhances the throughput and performance of the non-uniform network 900.

In the network of FIG. 9, preferably at least one core node is configured as a full-reach core node which receives at least one input channel from each edge node and originates at least one channel to each edge node as described above. The geographical location of a full-reach optical core node terminating J input links and originating K output links is preferably selected to minimize the aggregate product of link capacity and propagation delay, the aggregate product being defined by the objective function:

$$F = \left( \sum_{j=0}^{J-1} L_j D_j + \sum_{k=0}^{K-1} \Lambda_k \Delta_k \right)$$

where $L_j$ is the number of channels in input link j, $D_j$ is the propagation delay along input link j, $0 \leq j < J$, $\Lambda_k$ is the number of channels in output link k, $\Delta_k$ is the propagation delay along output link j, $0 \leq k < K$.

Numerical methods for minimizing the above objective function are known in the field of system optimization.

Routing

To transfer data from a source edge node (i.e., an edge node connected to a source of data traffic) to a sink edge node (i.e., an edge node connected to a sink of data traffic) in a network such as the non-uniform, composite-star network 800 of FIG. 8, it is desirable that the source node select the optical core node 850, 855 with the least reach index to which it connects. As will be appreciated by a person skilled in the art, a typical edge node includes both a source node and an associated sink node. Additionally, it will be understood that a single-line representation of a link connecting an electronic edge node to an optical core node in FIGS. 2, 5, 7, 8 and 9 may be representative of both an uplink and a downlink, which may carry multiple wavelength channels each. Through the selection, by the source edge nodes, of the least reach index optical core node 850, 855, ports on high reach index optical core nodes 850 tend to remain free for the use of those electronic edge nodes that are not connected to low reach index optical core nodes 855, and therefore have fewer candidate paths to other electronic edge nodes.

Each route from a source edge node to a sink edge node may be classified according to a composite metric that is based on two factors. The first factor is the reach index of the optical core node 850, 855 that is used to connect the source edge node to the sink edge node. The second factor is the propagation delay of the uplink from the source edge node to the optical core node 850, 855 added to the propagation delay of the downlink from the optical core node 850, 855 to the sink edge node to give a propagation delay for the route. Alternatively, the composite metric may be based on different combinations of factors, for instance, available capacity and propagation delay.

Figure 10:
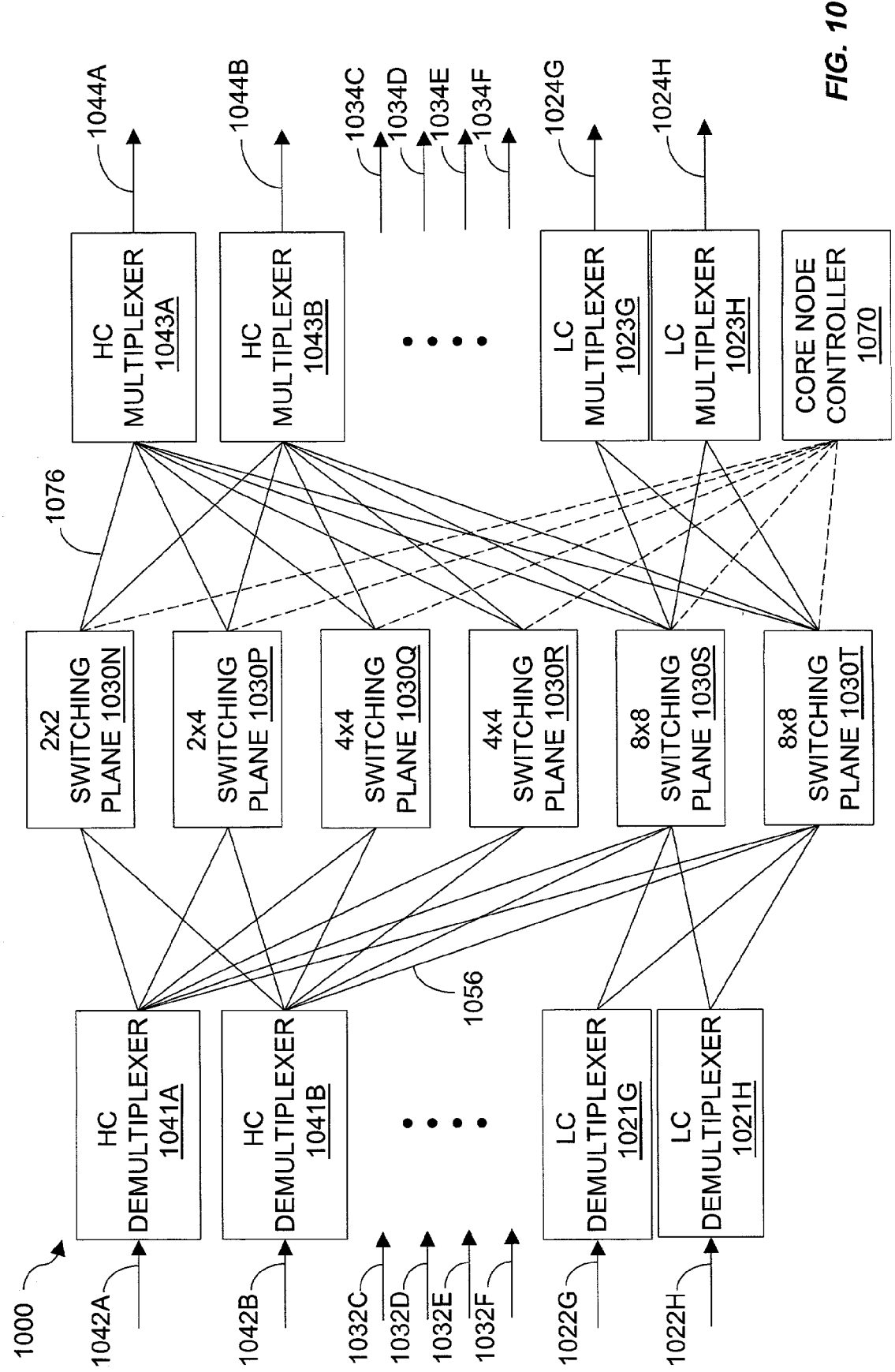
FIG. 10 illustrates a non-uniform optical core node comprising switching planes of different coverage indices, according to an embodiment of the present invention.

As mentioned hereinbefore, the second approach to allow non-uniform capacity of edge nodes implies using non-uniform capacity of the links, i.e., unequal numbers of wavelength channels, between a given optical core node and the edge nodes connected to the given optical core node. FIG. 10 represents a non-uniform optical core node 1000 having an exemplary set of switching planes 1030N, 1030P, 1030Q, 1030R, 1030S, 1030T (referred to collectively or individually as 1030) of different coverage indices connected to edge nodes of different capacities over multichannel links of different capacities. Notably, switching plane 1030P is asymmetrical, having two input ports and four output ports.

The capacity of a WDM link, whether it is an uplink or a downlink is determined according to the bit rate of the WDM wavelength channels carried. With each wavelength channel modulated at the same rate, 10 Gb/s for example, the capacity of a WDM link is simply determined by the number of wavelength channels carried.

In FIG. 10, the non-uniform optical core node 1000 receives optical signals on high capacity input links 1042A, 1042B at corresponding high capacity demultiplexers 1041A, 1041B and low capacity input links 1022G, 1022H at corresponding low capacity demultiplexers 1021G, 1021H. The non-uniform optical core node 1000 also receives optical signals on medium capacity input links 1032C, 1032D, 1032E, 1032F, at corresponding medium capacity demultiplexers (not shown). The demultiplexers 1041A, 1041B, . . . , 1021G, 1021H demultiplex optical signals received on corresponding input links 1042A, 1042B, . . . , 1022G, 1022H into constituent wavelength channels, which are subsequently transmitted to the switching planes 1030.

The exemplary set of switching planes 1030 of different coverage includes one 2×2 switching plane 1030N, one 2×4 switching plane 1030P, two 4×4 switching planes 1030Q, 1030R and two 8×8 switching planes 1030S, 1030T. The switching planes 1030 are under control of a core node controller 1070. Relatively small sizes of the switching planes 1030 are used in the example of FIG. 10 for clarity. In a typical network, the size of an optical switching plane 1030 would be of the order of 128×128.

As will be apparent to a person skilled in the art, the switching planes 1030 represented in FIG. 10 need not be symmetrical, i.e., have equal numbers of input and output ports. In any switching plane, the number of input ports may not equal the number of output ports. This asymmetry is particularly needed for handling multicast where data from a single input port may be sent to various destination edge nodes through two or more output ports of the optical switching plane. It is contemplated, for example, that there could be switching planes having five input ports and eight output ports or 12 input ports and 14 output ports.

The non-uniform optical core node 1000 transmits optical signals on high capacity output links 1044A, 1044B from corresponding high capacity multiplexers 1043A, 1043B and on low capacity output links 1024G, 1024H from corresponding low capacity multiplexers 1023G, 1023H. The non-uniform optical core node 1000 also transmits optical signals on medium capacity output links 1034C, 1034D, 1034E, 1034F from corresponding medium capacity multiplexers (not shown). The multiplexers 1043A, 1043B, . . . , 1023G, 1023H multiplex wavelength channels received from the switching planes 1030 into optical signal transmitted on corresponding output links 1044A, 1044B, . . . , 1024G, 1024H.

The input side of the non-uniform optical core node 1000 connects to the parallel switching planes 1030 through internal input links 1056, each carrying a single wavelength channel, and the parallel optical switching planes connect to the output side of the non-uniform optical core node 1000 through internal output links 1076, each carrying a single wavelength channel. According to an aspect of the present invention, at least one of the optical switching planes 1030 provides full-coverage, in that at least one wavelength channel from any input link may be switched to any output link.

Network Coverage

In an optical core node comprising a single switching plane, the wavelength channels of each input link are connected to input ports and the wavelength channels of each output link are connected to output ports of the same switching plane. In an optical core node comprising multiple switching planes, the upstream/downstream wavelength channels of each uplink/downlink are connected to input/output ports in different optical switching planes. With each fiber link having W channels, excluding a signaling channel, and with Π denoting the maximum number of input ports or output ports of a symmetrical switching plane, the maximum number, L, of links per core node is L=⌊Π/W⌋ in the single-switching-plane core node, where ⌊r⌋ denotes the integer part of a real number r. In a core node using W parallel switching planes (i.e., as many parallel switching planes as there are channels in a link), a maximum of Π links (L=Π) can be supported. Thus, with Π=128, and W=32, a single-switching-plane core node supports only four dual links (a dual link refers to an input link and a output link), while the multiple-switching-plane core node supports 128 dual links. It is noted that an input link to a core node is an uplink from an edge node to the core node and an output link from a core node is a downlink from the core node to an edge node.

The low capacity input link 1022H, originating from a low capacity source edge node, and the corresponding low capacity output link 1024H, destined to a low capacity sink edge node, connect only to the full coverage switching planes 1030S, 1030T, The high capacity input link 1042A, originating from a high capacity source edge node, and the corresponding high capacity output link 1044A, connect to the full coverage switching planes 1030S, 1030T and the partial coverage switching planes 1030N, 1030P, 1030Q, 1030R, i.e., all switching planes 1030. In FIG. 10, a single channel connects a source edge node to a switching plane 1030 and a single channel connects switching plane 1030 to a sink edge node. FIG. 10 is a logical representation and, therefore, omits aspects of the non-uniform optical core node 1000 that are understood to be present.

To establish a route through a core node in a composite star network, such as the network 200 of FIG. 2, an edge node sends a connection request to the core node. Such a connection request would identify a source edge node, a sink edge node and a required capacity for the connection between the edge nodes. The core node, in response to such a connection request, selects a route through a particular switching plane, or through a plurality of switching planes, to satisfy the request and sends an acceptance indication back to the source edge node accepting the connection request. Where the core node does not have the available capacity to satisfy the connection request, the core node sends a refusal indication to the source edge node and any resources reserved during the connection setup attempt are released.

In a non-uniform network with optical core nodes having switching planes of different coverage indices, an exemplary one of which (the non-uniform optical core node 1000) is illustrated in FIG. 10, it is desirable that the route selected to satisfy a connection request use the switching plane(s) 1030 of smallest coverage index that can provide paths for the connection.

In general, the number of channels in an uplink from a given edge node to a core node may differ from the number of channels in a downlink from the core node to the same edge node. This may occur due to traffic asymmetry. In an example of such traffic asymmetry, an edge node may receive substantially more that than it transmits, or vice versa.

The core node controller 1070 includes a processor (not illustrated) with a connection to a memory, which may be used to store data structures described herein. The processor also has interfaces to the switching planes (not illustrated) used for bi-directional communication with the switching planes 1030 (FIG. 10). Controller 1070 exchanges control data with the edge nodes through either dedicated control channels (not illustrated) when channel-switching is used or through time slots in a TDM frame when TDM switching is used. Details of control data exchange between a core node comprising parallel switching planes and electronic edge nodes are described in Applicant's copending U.S. patent application Ser. No. 10/054,509, filed on Nov. 13, 2001 and titled "Time-Coordination in a Burst-Switching Network". If each of switching planes 1030 receives one channel of the same wavelength (wavelength band) from each input link, then the non-uniform optical core node 1000 does not require wavelength conversion at any of the input or output ports of any switching plane. It may be desirable, however, to allow an input link to connect to a given switching plane through two or more wavelength channels, and/or to allow an output link to connect to the given switching plane through two or more wavelength channels. Since each input link carries channels of different wavelengths (wavelength bands), then connecting two or more channels to a switching plane results in two or more input ports receiving optical signals of different wavelengths. Each output link carries optical signals of different wavelengths. If an output link connects to any given switching plane by two or more channels, or if said output link has only one channel to the given switching plane but any two input ports of the given switching plane connect to channels of different wavelengths (wavelength bands), then wavelength conversion is required to enable any input port to communicate with any output link carrying non-overlapping wavelength channels.

FIG. 11A illustrates the use of wavelength conversion in conjunction with a switching plane 1130 having eight input ports (not shown) and eight output ports (not shown). The eight input ports receive eight wavelength channels on eight internal input links 1156-1, 1156-2,1156-3, 1156-4,1156-5, 1156-6, 1156-7,1156-8 from six input links 1121-1,1121-2, 1121-3,1121-4, 1121-5, 1121-6. The eight output ports transmit eight wavelength channels on eight internal output links 1176-1,1176-2, 1176-3, 1176-4, 1176-5, 1176-6, 1176-7, 1176-8 carried by output links 1191-1, 1191 -2, 1191-3, 1191-4, and 1191-5. The eight internal output links 1176 become the five output links 1191 at a MUX stage. Four of the input links 1121-1,1121-2, 1121-3, 1121-4 provide one wavelength channel each to the switching plane 1130. Two of the input links 1121-5, 1121-6 provide two wavelength channels each to the switching plane 1130. Three of the output links 1191-1, 1191-2, 1191-3 receive one wavelength channel each from the switching plane 1130. One of the output links 1121-4 receives three wavelength channels from the switching plane 1130 and one of the output links 1121-5 receives two wavelength channels from the switching plane 1130. It is noted that each input link 1121 and each output link 1191 may carry several wavelength channels connecting to other switching planes 1130.

To enable any wavelength channel from any input link 1121 to connect to any wavelength channel in any output link 1191, input wavelength converters 1140 can be provided, one for each in the internal input links 1156. The input wavelength converters 1140 act to convert the wavelength of the incoming wavelength channel to the required wavelength of the corresponding outgoing wavelength channel, where the required outgoing wavelength channel is determined through the switching instruction provided to the switching plane 1130. In FIG. 11A, the required wavelength for each of the links 1191-1,1191-2, and 1191 -3 is λ4, the required wavelengths for link 1191-4 are λ4, λ5, and λ6, the required wavelengths for link 1191-5 are λ4 and λ5. Thus, if input link 1121-4 wishes to connect to output link 1191-5, it can do so without wavelength conversion. However, if input link 1121-2 wishes to connect to output link 1191-5, it must shift its wavelength channel from λ4 to λ5 to access link 1191-5 through internal link 1176-8.

If input link 1121-5, which provides two wavelength channels λ4 and λ5 carried on internal links 1156-5 and 1156-6, wishes to connect to output links 1191-1 and 1191-2, wavelength channel λ5 carried on internal link 1156-6 must be shifted to λ4.

Each of the output links 1191 can carry several wavelength channels from several parallel switching planes 1130 and thee selection of the wavelength channels illustrated in FIGS. 11A or 11B, is dictated by the requirement that an output link carry non-overlapping wavelength channels.

Alternatively, wavelength converters may be provided at the output of a switching plane. In FIGS. 11B, the elements retain the reference numerals of FIG. 11A. However, the function provided by the input wavelength converters 1140 in FIG. 11A is, instead, provided by output wavelength converters 1150 one each in the internal output links 1176 in FIG. 11B. As in the case of the input wavelength converters 1140, the output wavelength converters 1150 convert to wavelengths based on switching instructions provided to the switching plane 1130.

Practically, it is preferable to deploy identical switching planes in a given optical core node. In an optical core node having N>1 optical switching planes, each having P1 input ports and P2 output ports, with the optical core node supporting input links of different wavelength channel counts and output links of different wavelength channel counts, the degrees of the N switching planes may be equal but the coverage indices of the N switching planes may differ significantly depending on the distribution of the number of channels in the input links and the output links.

Figure 12:
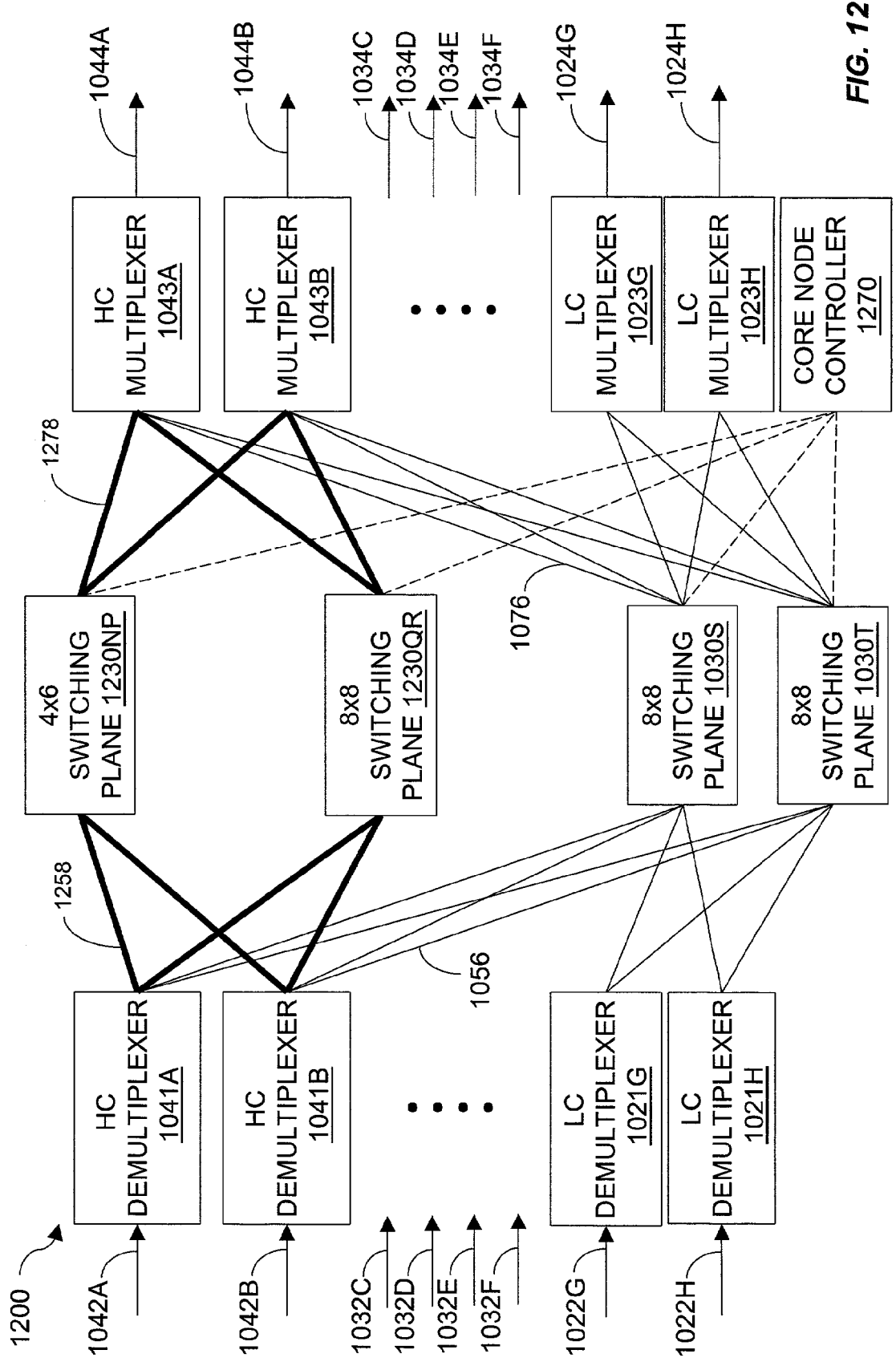
FIG. 12 illustrates an alternative arrangement for the non-uniform optical core node of FIG. 10 according to an embodiment of the present invention.

FIG. 12 illustrates an alternative arrangement for the non-uniform optical core node 1000 of FIG. 10. In a non-uniform optical core node 1200 presented in FIG. 12, those switching planes 1030N, 1030P, 1030Q, 1030R of FIG. 10 having partial coverage and each carrying the same wavelength-set may be replaced with replacement switching planes 1230NP, 1230QR (referred to herein collectively or individually as 1230) with the same total number of ports. The input-output connectivity of the replacement switching planes 1230 would resemble that of switching plane 1130 of FIG. 11A or FIG. 11B. A core node controller 1270 oversees the operation of the switching planes 1230, 1030. Furthermore, the non-uniform optical core node 1200 retains the multiplexers 1021, 1041 and demultiplexers 1023, 1043 of the non-uniform optical core node 1000 of FIG. 10. Controller 1270 exchanges control data with the edge nodes through either dedicated control channels (not illustrated) when channel-switching is used or through time slots in a TDM frame when TDM switching is used. The basic difference between the original switching planes 1030 and the replacement switching planes 1230 is that each switching plane 1030 has single wavelength channel connections to subtending demultiplexers while a switching plane 1230 may connect to a subtending demultiplexer by more than one wavelength channel.

Selected wavelength channels from high capacity source nodes, included in the input links 1042, are grouped on the replacement switching planes 1230. For example, the 2×2 switching plane 1030N and the 2×4 switching 1030P are replaced with a single 4×6 switching plane 1230NP. Two wavelength channels from the high capacity input link 1042A are grouped on the 4×4 switching plane 1230NP. In this arrangement, high capacity demultiplexer 1041 may have two or more wavelength channels connecting to a replacement switching plane 1230. Without wavelength converters at selected input ports or output ports of the replacement switching planes 1230, switching from input to output is restricted to channels of the same wavelength. Consequently, although the number of ports per switching plane on the replacement switching planes 1230 is higher than on the replaced switching planes 1030, the coverage of the replacement switching plane 1230 and the total coverage of the replaced switching planes 1030 are the same.

If wavelength converters are employed, at the output ports, for example, of the replacement switching planes 1230, then an upstream channel of any wavelength can switch to a downstream channel of any wavelength. This flexibility increases the probability of matching a free upstream channel of an input link 1022, 1032, 1042 to a free downstream channel of an output link 1024, 1034, 1044, due to the removal of the same-wavelength restriction. The probability of mismatch blocking is therefore reduced.

In review, the input and output sides of the non-uniform optical core node 1200 of FIG. 12 are identical to the corresponding sides in the non-uniform optical core node 1000 of FIG. 10. The non-uniform optical core node 1200, however, has fewer optical switching planes 1030/1230, and, consequently, a high capacity input link 1042 must connect to at least one of the optical switching planes 1230 through two or more single-channel internal links 1056. Likewise, a high capacity output link may connect to an optical switching plane 1230 through two or more single-channel internal links 1076. An internal input link 1258 and an internal output link 1278 are illustrated, in FIG. 12, by thick lines to represent internal links including two or more single-channel internal links 1056, 1076. The connectivity in the configuration of the non-uniform optical core node 1200 of FIG. 12 is preferably devised in a manner that maximizes the number of full-coverage switching planes.

Figure 13:
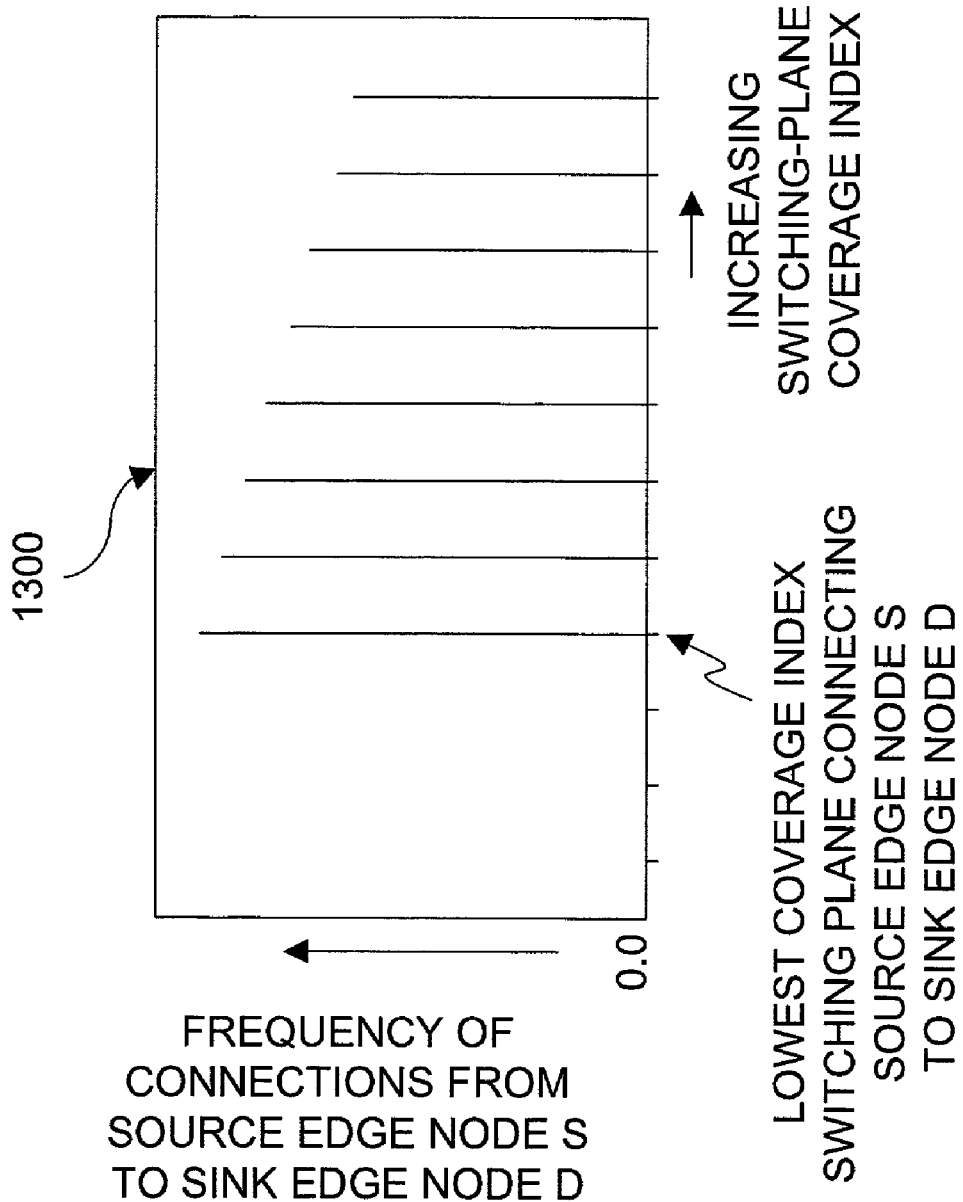
FIG. 13 is a plot showing a desirable frequency distribution of connections between source edge nodes and sink edge nodes among the multiple switching planes of an exemplary optical core node.

FIG. 13 is a plot 1300 showing a desirable frequency distribution of connections among the multiple switching planes of an exemplary optical core node. The switching planes are sorted logically by increasing coverage index along the horizontal axis. It is indeed desirable that a source node S and a sink edge node D try to connect on the switching plane with the lowest coverage index that has an available path, leaving ports on high coverage index switching planes free for the edge nodes that are not connected to low coverage index switching planes. A path selection method, for use within a core node to achieve the desired distribution of FIG. 13, is described below in conjunction with FIGS. 22 to 28.

Figure 14:
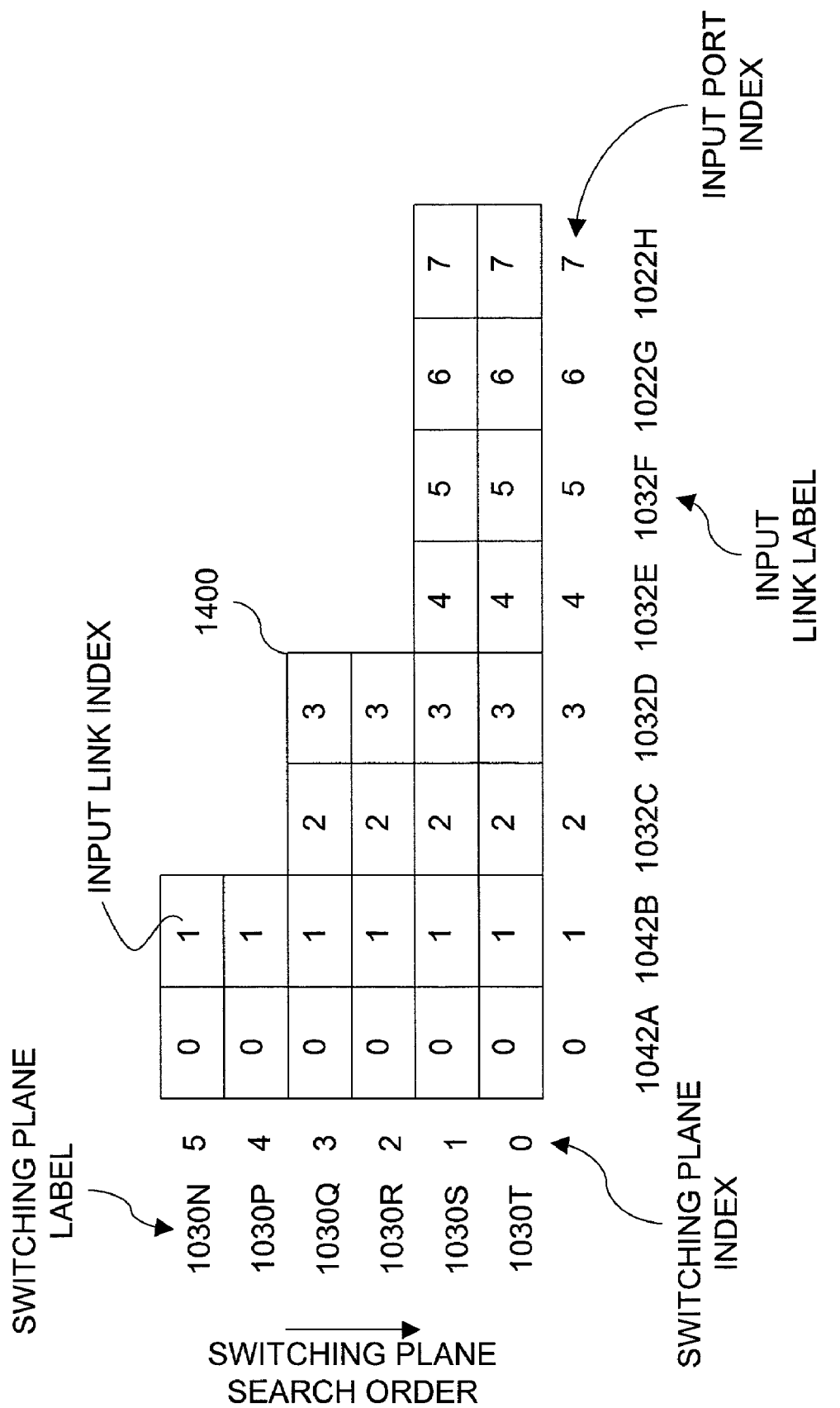
FIG. 14 illustrates an exemplary input side connectivity matrix for representing input side vacancy of the non-uniform optical core node of FIG. 10 according to an embodiment of the present invention.

FIG. 14 illustrates an exemplary input-side vacancy data structure 1400 for representing input-side vacancy of the optical core node 1000, to be used for connection setup in the optical core node 1000. Such an input-side vacancy data structure 1400 may be maintained at each optical core node. An element of the input-side vacancy data structure 1400 is denoted $u(q,j)$, where q is a switching plane index and j is an input-port index and. Each entry in data structure 1400 has a value of 0 or 1 (not illustrated) to indicate whether a corresponding input port is free or already assigned to a channel from an input link. The entries shown indicate the input link indices and are provided in the figure for illustration only. It is noted also that the structure 1400 can be used only for optical core nodes of the type of the non-uniform optical core node 1000 of FIG. 10, wherein each switching plane 1030 receives only one channel from any input link. A data structure that can be used for either the optical core node 1000 of FIG. 10 or the optical core node 1200 of FIG. 12 is described below with reference to FIGS. 20 and 21.

The exemplary input-side vacancy data structure 1400 relates to the non-uniform optical core node 1000 of FIG. 10, which comprises six parallel switching planes 1030. In FIG. 14, the six parallel switching planes 1030 are sorted logically by coverage index and indexed on the vertical axis. The optical core node 1000 receives data from eight source edge nodes through input links 1022, 1032, 1042 of various capacities. The input ports of the six parallel switching planes 1030 are indexed from 0 to 7 on the horizontal axis. It is assumed, in this example, that each channel in a given input link 1022, 1032, 1042 connects to the same source edge node and that a distinct source edge node connects to each input link. It is possible, however, to have several input links connecting to the same source edge node. On the input side of the optical core node 1000, the 2×2 switching plane 1030N and the 2×4 switching plane 1030P are connected to the two high capacity input links 1042, the two 4×4 switching planes 1030Q, 1030R are connected to four input links 1042, 1032 and the two 8×8 switching planes 1030S, 1030T are connected to eight input links 1022, 1032, 1042.

Each entry in the input-side vacancy data structure 1400 corresponds to an input port on a switching plane 1030. The value of the entry indicates whether the port is used for a connection. For instance, the value of an entry may be 1 if the port is vacant and 0 if the port is occupied. Each row in the input side vacancy data structure 1400 contains information about the connections to the switching plane 1030 having the switching-plane index associated with that row. Likewise, each column in the input side vacancy data structure 1400 contains information about the input link 1022, 1032, 1042 having the input-port index associated with that column.

Figure 15:
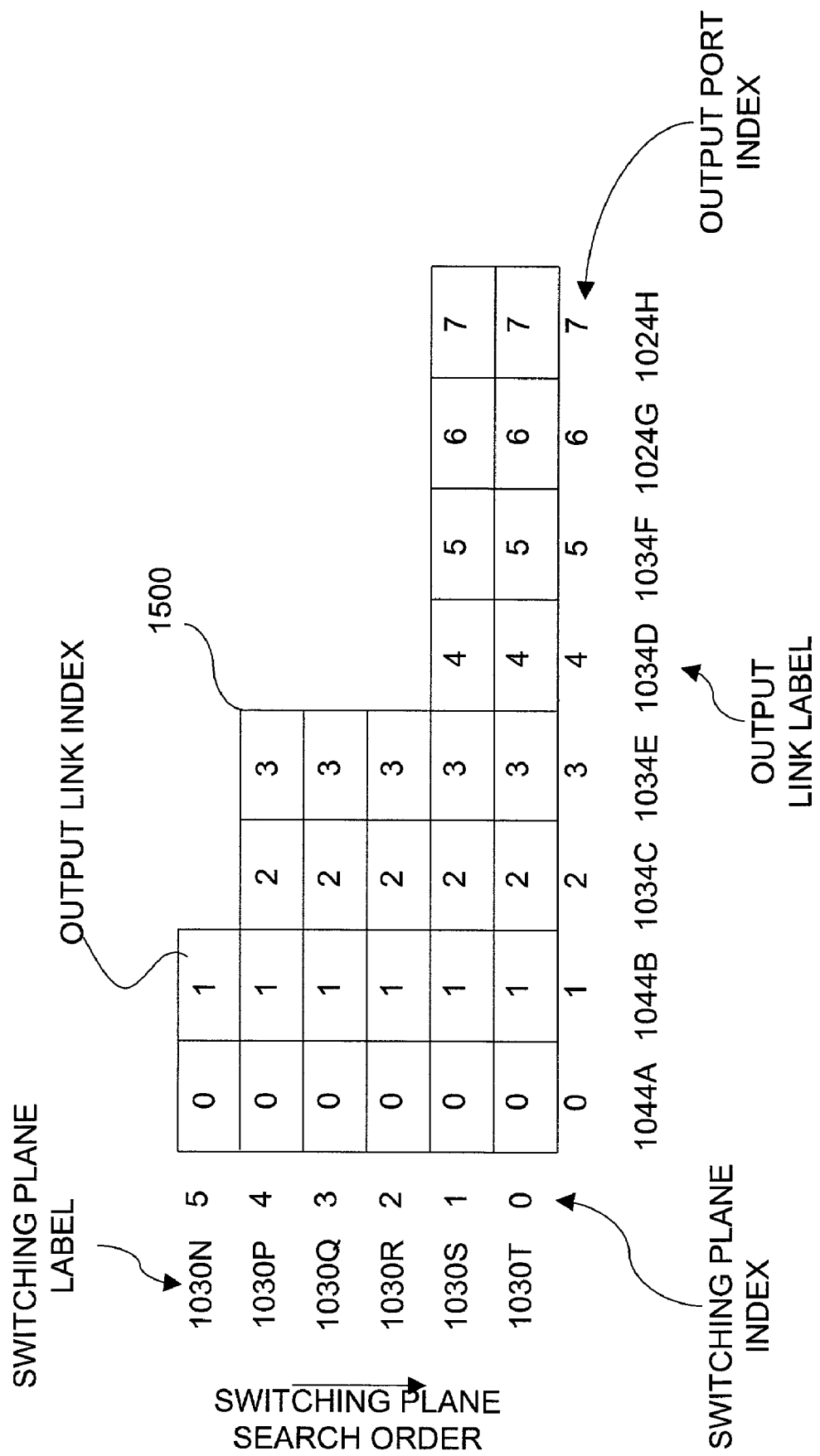
FIG. 15 illustrates an exemplary output side connectivity matrix for representing output side vacancy of the non-uniform optical core node of FIG. 10 according to an embodiment of the present invention.

FIG. 15 illustrates an exemplary output-side vacancy data structure 1500 for representing the output side vacancy of the non-uniform optical core node 1000 whose input-side vacancy is represented in FIG. 14. The output-side vacancy data structure 1500 may be used for connection setup in the non-uniform optical core node 1000. Such an output-side vacancy data structure 1500 may be maintained at each optical core node. An element in output side vacancy data structure 1500 is denoted $v(q,k)$, where q is a switching plane index and k is an output-port index.

On the output side of the optical core node, the 2×2 switching plane 1030N is connected to the two high capacity output links 1044, the 2×4 switching 1030P and the two 4×4 switching planes 1030Q, 1030R are connected to four output links 1044, 1034 and the two 8×8 switching planes 1030S, 1030T are connected to eight output links 1024, 1034, 1044.

An input port is identified by its switching-plane index, and input-port index within its switching plane. Likewise, an output port is identified by its switching-plane index, and output-port index within its switching plane.

Figure 16:
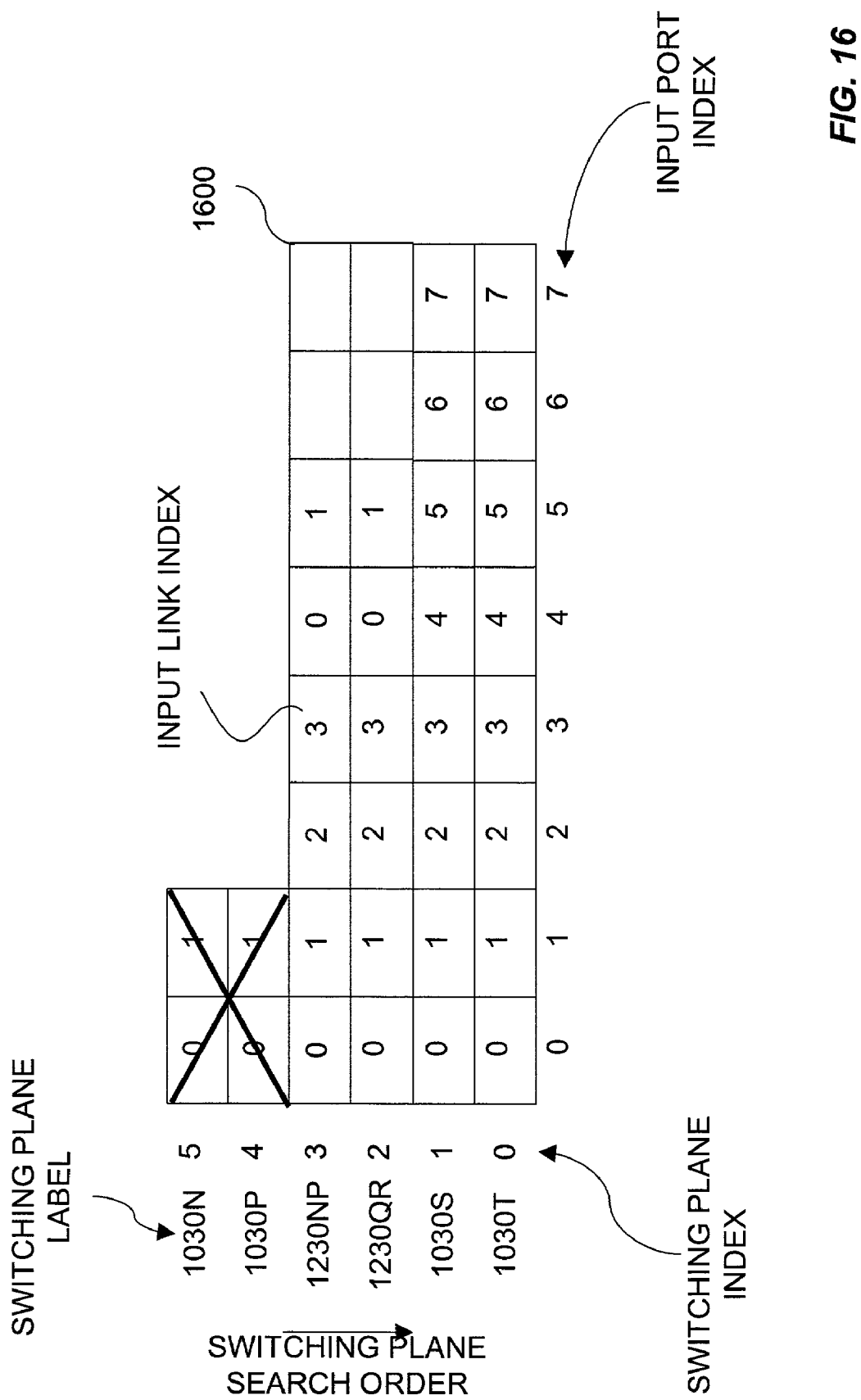
FIG. 16 illustrates an exemplary input side vacancy data structure for representing input side vacancy of the non-uniform optical core node of FIG. 12 according to an embodiment of the present invention.

FIG. 16 illustrates an alternative connectivity where the input-side connectivity of the configuration of the optical core node 1000 of FIG. 10 is replaced by the input-side connectivity of the configuration of the optical core node 1200 of FIG. 12. FIG. 16 is derived from FIG. 14 by replacing the connections to input ports (4, 0), (5, 0), (4, 1) and (5, 1) with connections to input ports (3, 4), (2, 4), (3, 5), and (2, 5) respectively.

Figure 17:
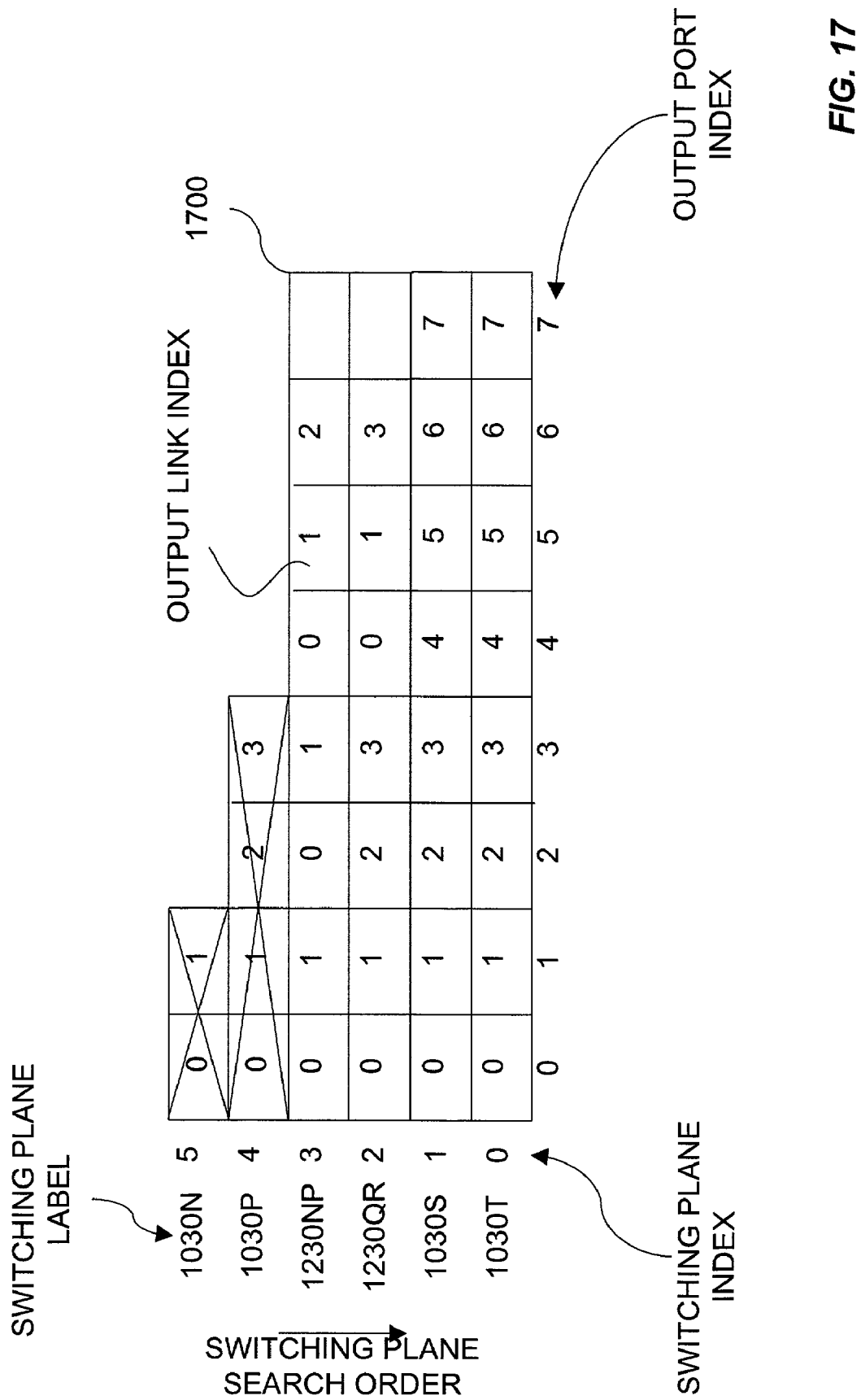
FIG. 17 illustrates an exemplary output side vacancy data structure for representing output side vacancy of the non-uniform optical core node of FIG. 12 according to an embodiment of the present invention.

FIG. 17 illustrates an alternative connectivity where the output-side connectivity of configuration 1000 is replaced by the output-side connectivity of configuration 1200. FIG. 17 is derived from FIG. 15 by replacing the connections to output ports (4, 0), (5, 0), (4,1), (5,1), (4, 2), and (4, 3) with connections to output ports (3, 4), (2, 4), (3, 5), (2, 5), (3, 6) and (2, 6), respectively.

Figure 18:
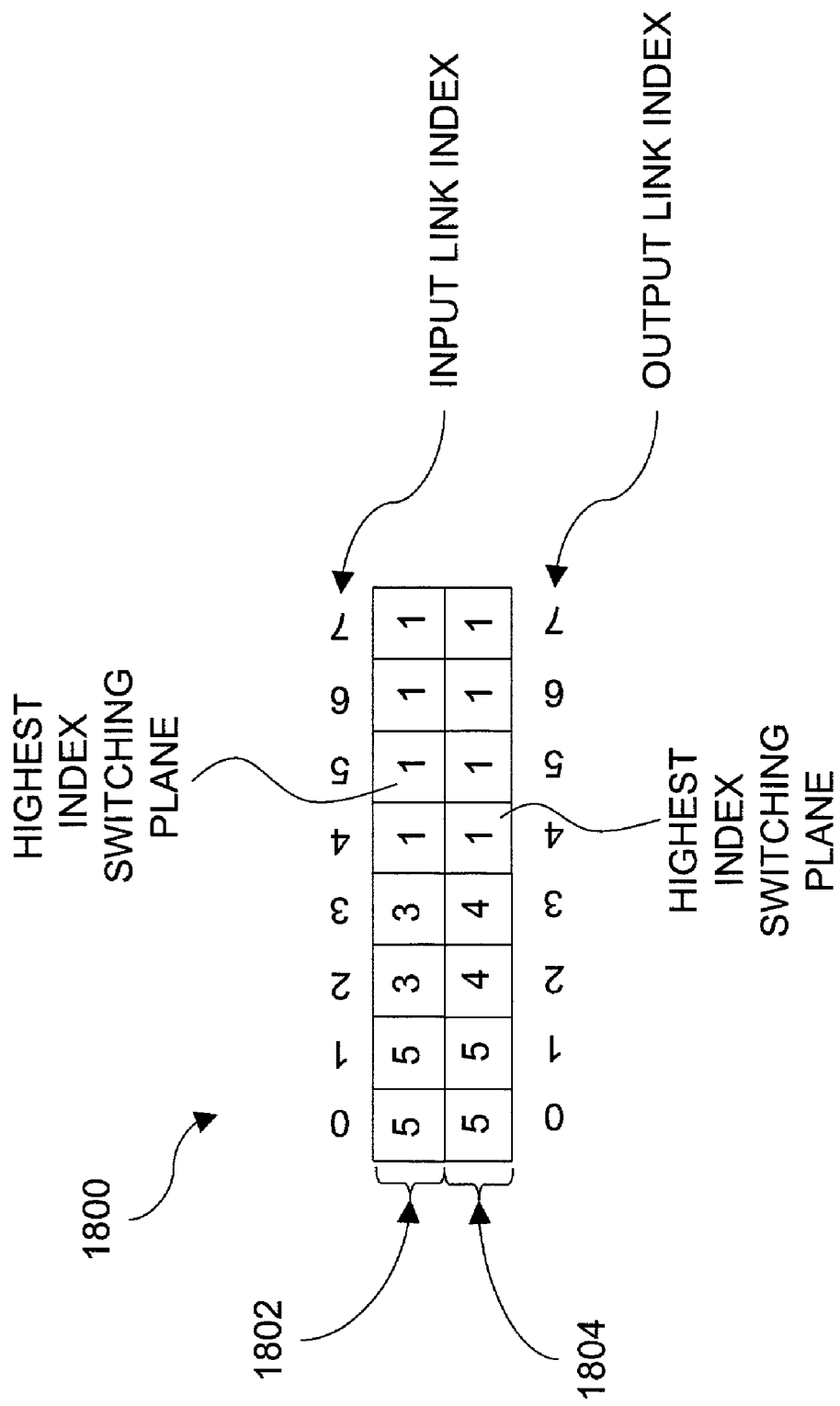
FIG. 18 illustrates a highest-index-plane data structure to be used for connection setup in the non-uniform optical core node of FIG. 10 according to an embodiment of the present invention.

FIG. 18 illustrates a highest-index-plane data structure 1800 to be used for connection setup in the non-uniform optical core node 1000 of FIG. 10. Such a highest-index-plane data structure 1800 may be maintained at each optical core node. The highest-index-plane data structure 1800 contains information about the presence of input links to the switching planes 1030. Each column indicates the index of the highest-index switching plane 1030 to which an input link 1022, 1032, 1042 or an output link 1024, 1034, 1044 connects. The switching plane index is the index associated with the switching planes in FIG. 14 and FIG. 15. Input links 1022, 1032, 1042 and output links 1024, 1034, 1044 are indexed from 0 to 7 on the horizontal axis. The highest-index plane of each input link 1022, 1032, 1042 is listed in a top row 1802 of the highest-index-plane data structure 1800 while the highest-index-plane of each output link 1024, 1034, 1044 is listed in a bottom row 1804 of the highest-index-plane data structure 1800. An element in the top row 1802 of the highest-index-plane data structure 1800 is denoted P(j), where j is an input link index. An element in the bottom row 1804 of the highest-index-plane data structure 1800 is denoted Q(k), where k is a sink node index.

With reference to FIG. 10, input link G 1022G (input port index=6) connects to the 8×8 switching planes 1030S, 1030T. With reference to FIG. 14, one 8×8 switching plane 1030S has a switching-plane index of 1 and while the other 8×8 switching plane 1030T has a switching-plane index of 0. Therefore, the highest-index switching plane to which input link G 1022G connects is the switching plane 1030S having index of 1. This result can be read directly from FIG. 14. The highest-index switching plane 1030 connecting from the source node G 1022G (which has an input port index of 6) has a switching-plane index of 1, so P(6)=1. Similarly, the highest-index switching plane 1030 connecting to output link 1044B (output port index=1) has a switching-plane index of 5, so Q(1)=5.

Figure 19:
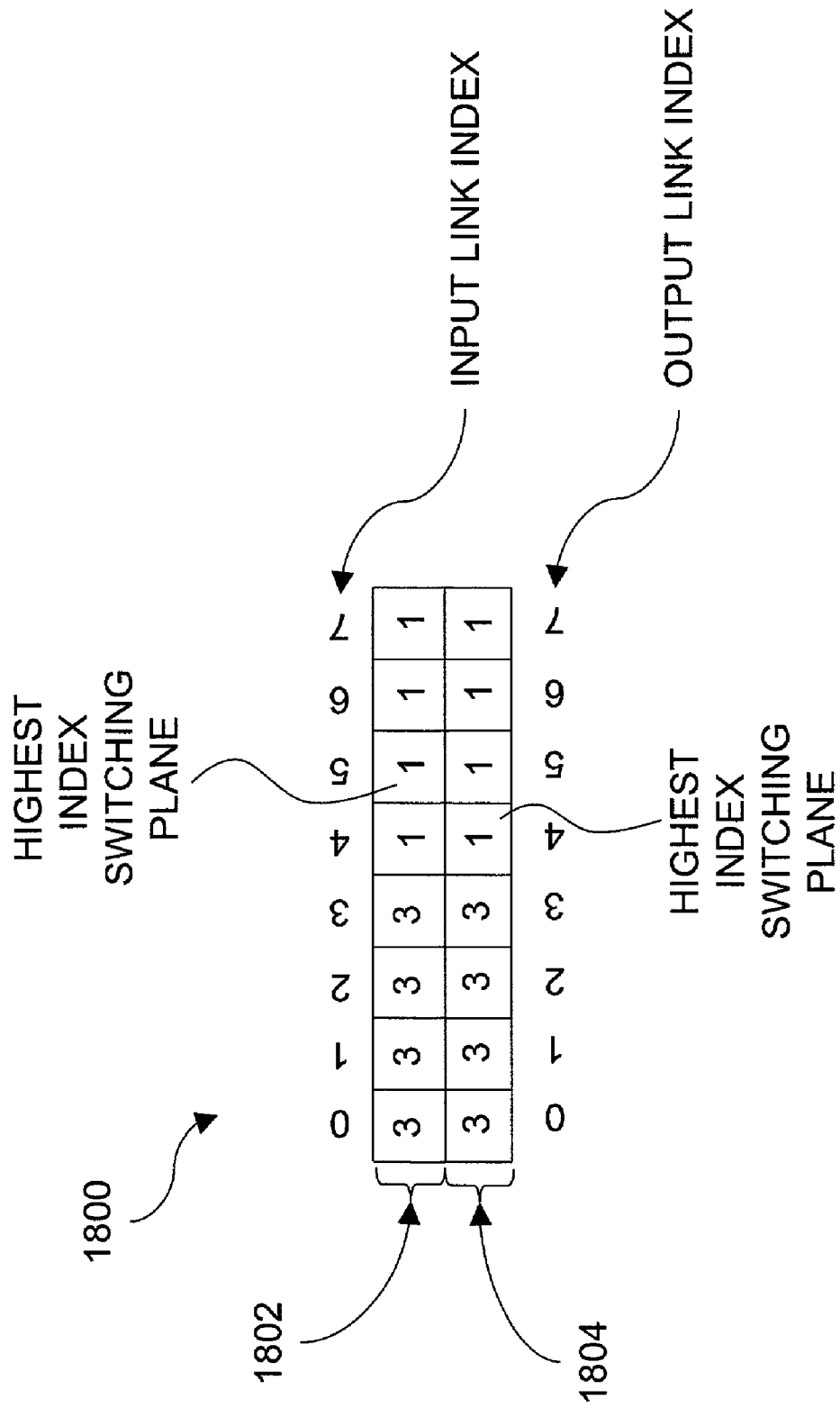
FIG. 19 illustrates a highest-index-plane data structure to be used for connection setup in the non-uniform optical core node of FIG. 12 according to an embodiment of the present invention.

FIG. 19 illustrates a highest-index-plane data structure 1900, similar to that of structure 1800, to be used for connection setup in the non-uniform optical core node 1200 of FIG. 12.

Figure 20:
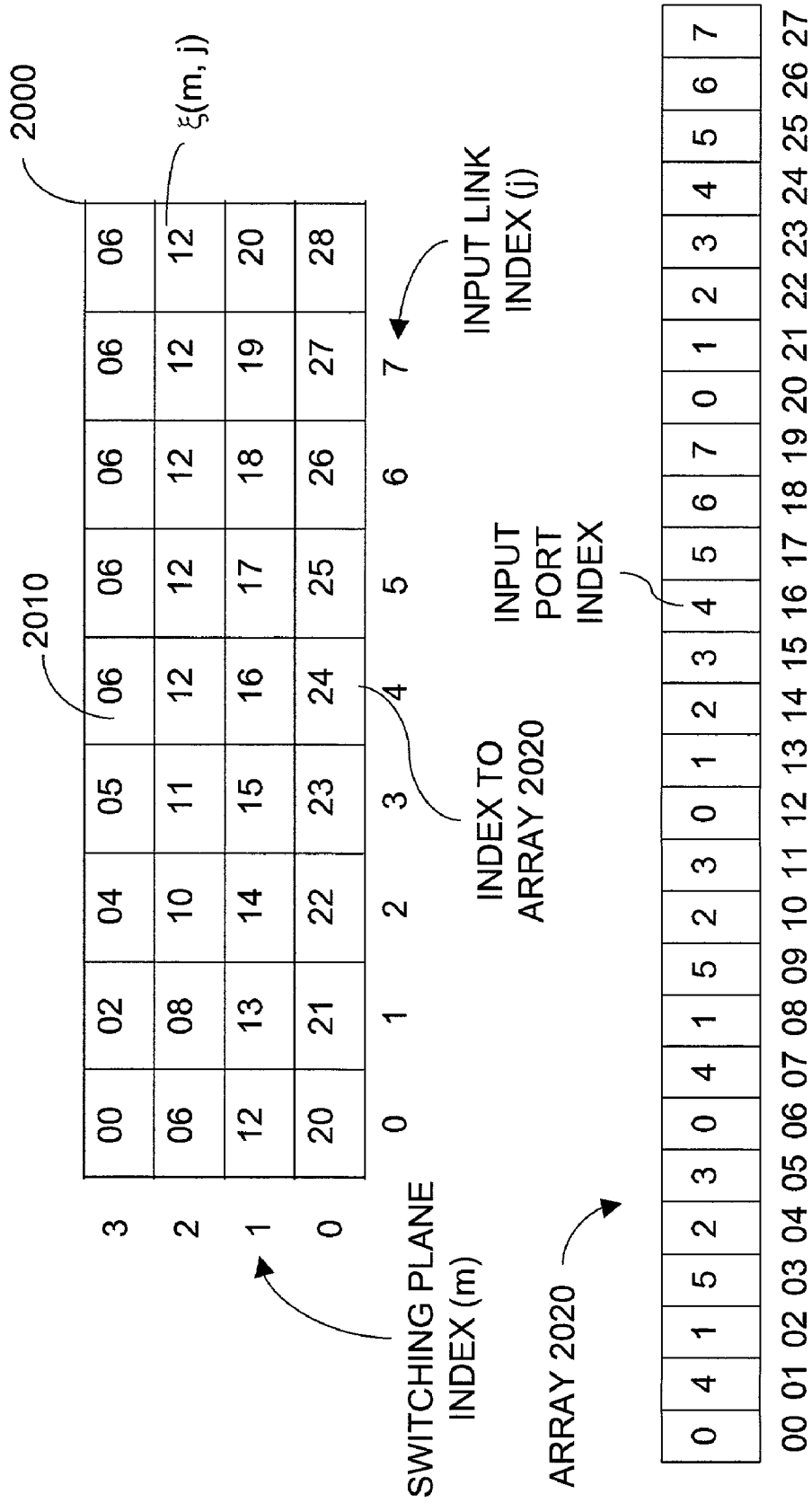
FIG. 20 illustrates an array of input link connectivity in the optical node of FIG. 12 and an indexing table to the array according to an embodiment of the present invention.

FIG. 20 illustrates an input-side connectivity description. A connectivity matrix 2000 has N rows, each corresponding to a switching plane and (J+1) columns, J being the number of input links. An array 2020 contains identifiers of the P1 input ports. An input-port identifier is preferably an input-port number, 0 to P1−1. An entry $\xi(m, j)$ of input-side connectivity matrix 2000 points to the identifier, in the array 2020, of the first input-port in switching plane m to which input link j connects. The number of input ports in a switching plane connecting to channels of an input link j is determined as n1=$\xi(m, j+1)-\xi(m, j)$, $0 \leq j < J$, and the identifiers of the n1 input ports, when n1 is greater than zero, are found in the array 2020 at indices $\xi(m, j)$ to $\xi(m, j+1)-1$.

For example, input link 1, which has six channels, has one channel connected to switching plane 0, one channel connected to switching plane 1, two channels connecting to switching plane 2 and two channels connecting to switching-plane 3 as indicated in FIG. 17. These can be determined from the connectivity matrix 2000 by noting that, for switching plane 0, $\xi(0, 1)=21$, $\xi(0, 2)=22$ and 22−21=1. Additionally, for switching plane 1, $\xi(1, 1)=13$, $\xi(1, 2)=14$ and 14−13=1. For switching plane 2, $\xi(2, 1)=8$, $\xi(2, 2)=10$ and 10−8=2. For switching plane 3, $\xi(3, 1)=2$, $\xi(3, 2)=4$ and 4−2=2. The connecting input port for switching plane 0 is identified in the array 2020 at index $\xi(0, 1)=21$ as 1. The connecting input port for switching plane 1 is identified in the array 2020 at $\xi(1, 1)=13$ as 1. The two connecting input ports for switching plane 2 are identified in the array 2020 starting at $\xi(2, 1)=8$ as 1 and 5. The two connecting input ports for switching plane 3 are identified in the array 2020 starting at $\xi(3, 1)=2$ as 1 and 5. These can be verified from FIG. 16.

Figure 21:
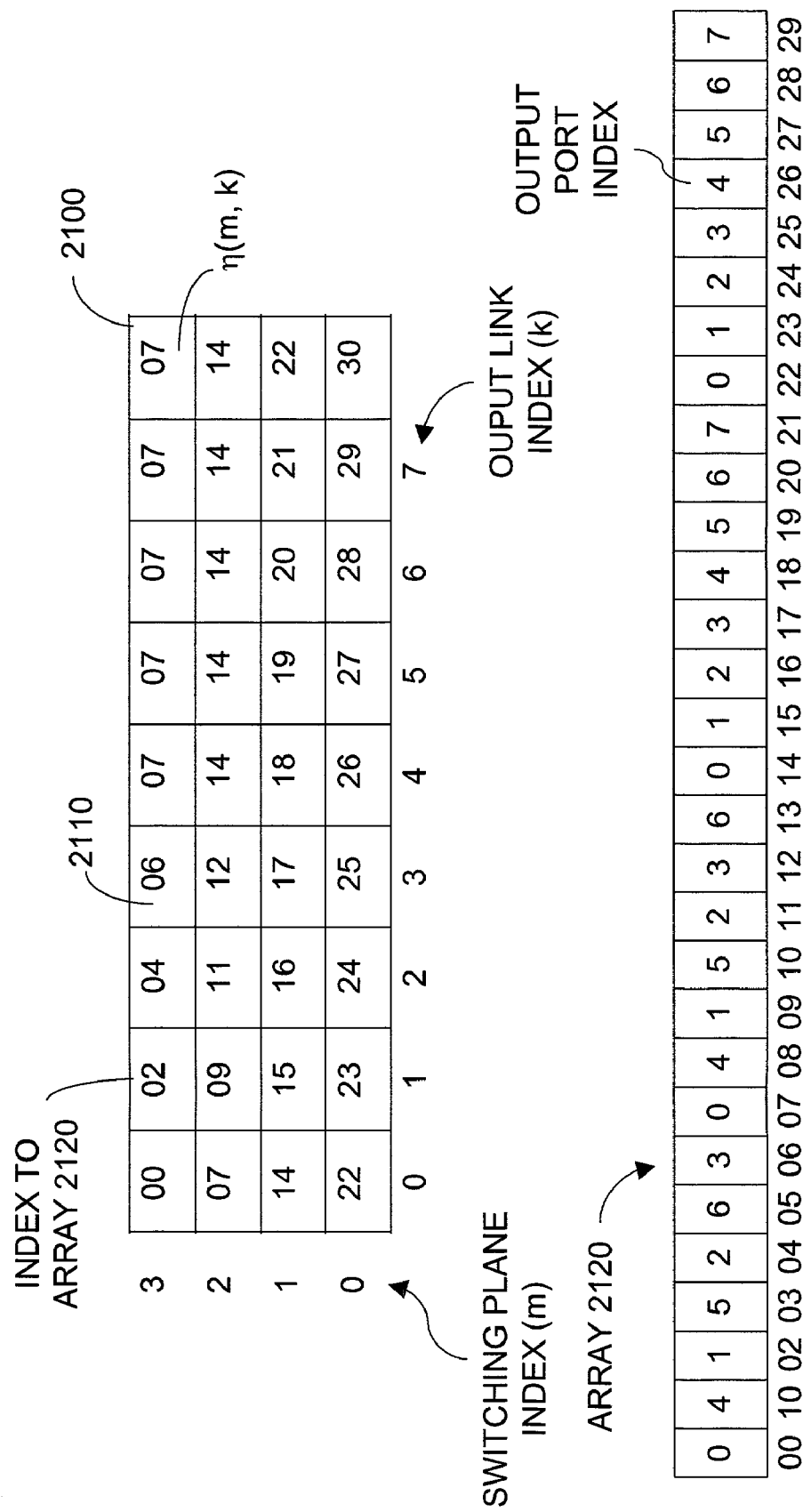
FIG. 21 illustrates an array of output link connectivity in the optical node of FIG. 12 and an indexing table to the array according to an embodiment of the present invention.

FIG. 21 illustrates an output-side connectivity description. A connectivity matrix 2100 has N rows, each corresponding to a switching plane and (K+1) columns, K being the number of output links. An array 2120 contains identifiers of the P2 output ports. An output-port identifier is preferably an output-port number, 0 to P2−1. An entry $\eta(m, k)$ of output-side connectivity matrix 2100 points to the identifier, in the array 2120, of the first output port in switching plane m connecting to output link k. The number of output ports in a switching plane connecting to channels of an output link k is determined as n2=$\eta(m, k+1)-\eta(m, k)$, $0 \leq k < K$, and the identifiers of the n2 input ports, when n2 is greater than zero, are found in array 2120 at indices $\eta(m, k)$ to $\eta(m, k+1)-1$.

For example, where output link 2, which has five channels, has one channel connecting to output port 2 of switching plane 0, one channel connecting to output port 2 of switching plane 1, one channel connecting to output port 2 of switching plane 2, and two channels connecting to output ports 2 and 6 of switching plane 3. This connectivity can be determined directly from the matrix 2100 and the array 2120 of FIG. 21. For example, $\eta(3, 2)=4$, $\eta(3, 3)=6$, indicating that output link 2 connects to two (6−4=2) output ports identified in entries 4 and 5 in array 2120. Entries 4 and 5 indicate that the output-port identifiers are 2 and 6. This result can be read from matrix 1700 of FIG. 17.

The connectivity of each input link and each output link are clearly illustrated in the data structures of FIG. 16 and FIG. 17, respectively. However, for hardware or software mechanization, the structures of FIG. 20 and FIG. 21 may be used. Within a switching plane m, $0 \leq m < N$, a connection from input link j to output link k, $0 \leq j < J$, and $0 \leq k < K$, may be established from any of the n1 input ports indexed in array 2020 from $\xi(m, j)$ to $\xi(m, j+1)-1$ to any of the n2 output ports indexed in array 2120 from $\eta(m, k)$ to $\eta(m, k+1)-1$.

Figure 22:
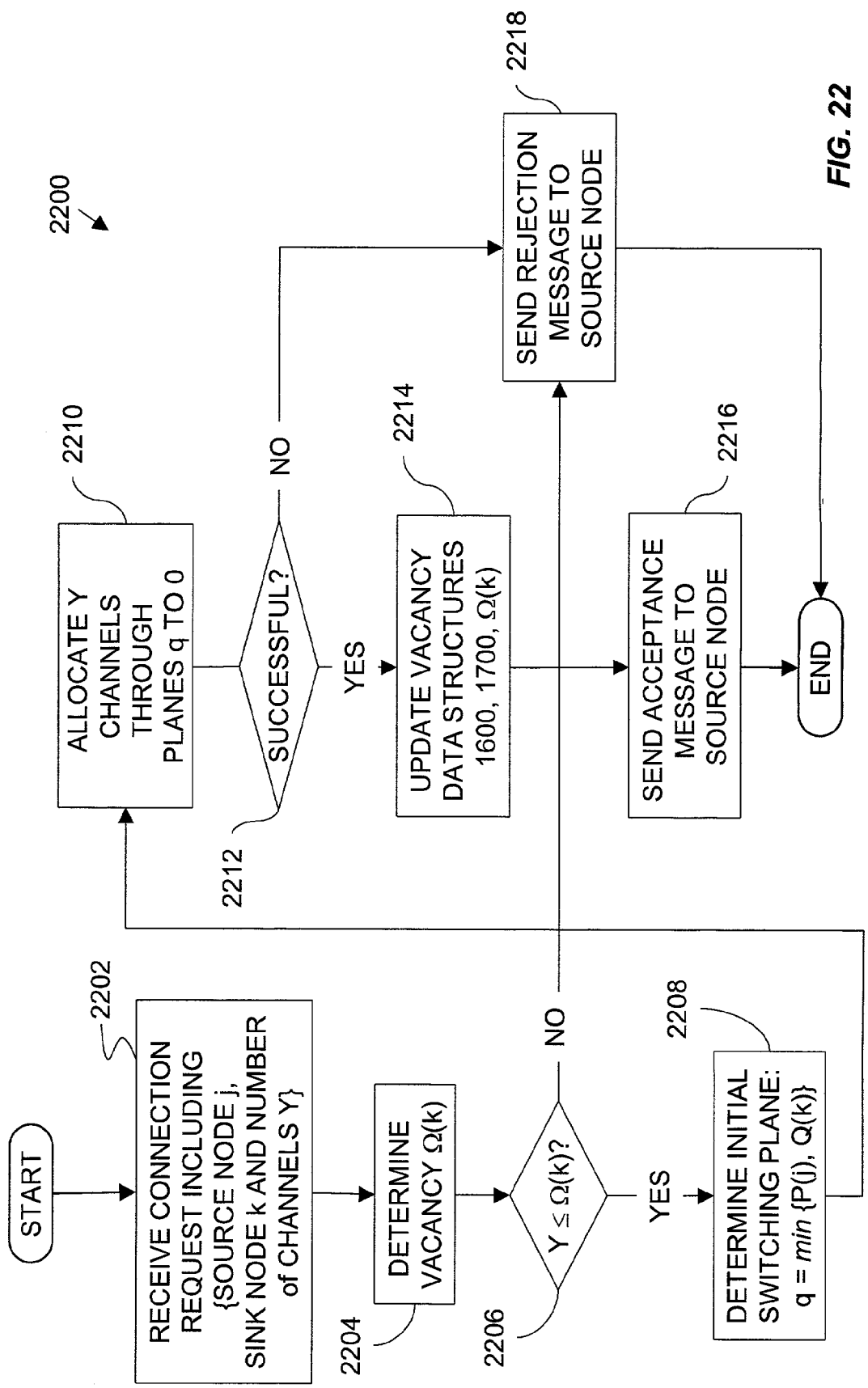
FIG. 22 illustrates steps in a connection-setup procedure in the non-uniform optical core node of FIG. 12 according to an embodiment of the present invention.

FIG. 22 is a flow chart of the connection setup procedure 2200 in the non-uniform optical core node 1200 of FIG. 12. The method illustrated in FIG. 22 may be executed by the core node controller 1270 of the non-uniform optical core node 1200 and makes use of the data structures of FIGS. 16 to 21. The procedure is activated upon reception of a connection request from a source edge node (step 2202) through an input link 1022, 1032, 1042 of index j. The index, k, of the output link 1024, 1034, 1044 and an indication, Y, of a requested number of channels for the requested connection are determined from the information provided in the connection request. The connection request may specify, for example, a bit rate for the connection rather than the number of channels. The bit rate is then converted into a number, Y, of channels.

The vacancy, i.e., available capacity in terms of the number of unassigned channels, of the output link 1024, 1034, 1044, to a sink edge node may be maintained in an array (not shown) in the core node controller 1270 and an element of the array is denoted $\Omega(k)$. In step 2204, this array is consulted to determine the vacancy of the output link(s) 1024, 1034, 1044 to the sink edge node specified in the connection request. It is then determined whether the vacancy, $\Omega(k)$, of the output links 1024, 1034, 1044 to the specified sink edge node equals or exceeds the requested capacity, Y (step 2206). A rejection message is produced (step 2218) and sent to the requesting source edge node when it is determined that the requested capacity exceeds the vacancy of the output link 1024, 1034, 1044 (step 2206).

If the vacancy equals or exceeds the requested capacity, an initial value for a switching plane index, q, may then be determined as the lower of P(j) and Q(k) (step 2208), given the received j and k. Recall that P(j) is read from array 1802 of FIG. 19 and Q(k) is read from array 1804 of FIG. 19, and that an entry u(., .) or v(., .) in vacancy data structures 1600 or 1700 (and an entry in data structure 2400) contains either a '0' or a '1' to indicate whether a corresponding input port or output port is free or occupied. The switching plane having index q may be called a "candidate" switching plane. Specifically, values u(q, j) and v(q, k) are retrieved, where u(q, j) is the entry in the input side vacancy data structure 1600 corresponding to the input port, of the candidate switching plane, that is connected to the output link 1022, 1034, 1042 having index j and v(q, k) is the entry in the output side vacancy data structure 1700 corresponding to the output port, of the candidate switching plane, that is connected to the output link 1024, 1034, 1044 having index k.

Subsequently, in step 2210, a procedure for allocating Y channels through switching planes indexed from q to 0 is executed. The procedure determines a number of allocable channels not exceeding the requested number Y. If it is determined (step 2212) that the procedure of step 2210 has successfully found Y allocable channels for the requested connection, then the corresponding element Ω(k) and elements u(m, j), v(m, j), over the selected switching planes, m, are updated (step 2214). A message is then sent to the requesting source node (step 2216) indicating that the connection request is accepted and indicating the allocable channels corresponding to the selected switching planes. If the procedure of step 2210 fails to allocate the required Y channels, it is determined that a route is not available and a rejection message is produced (step 2218) and sent to the source edge node. Upon connection termination, respective elements u(,), v(,), and Ω( ), must be reset to indicate vacancy states.

Figure 23:
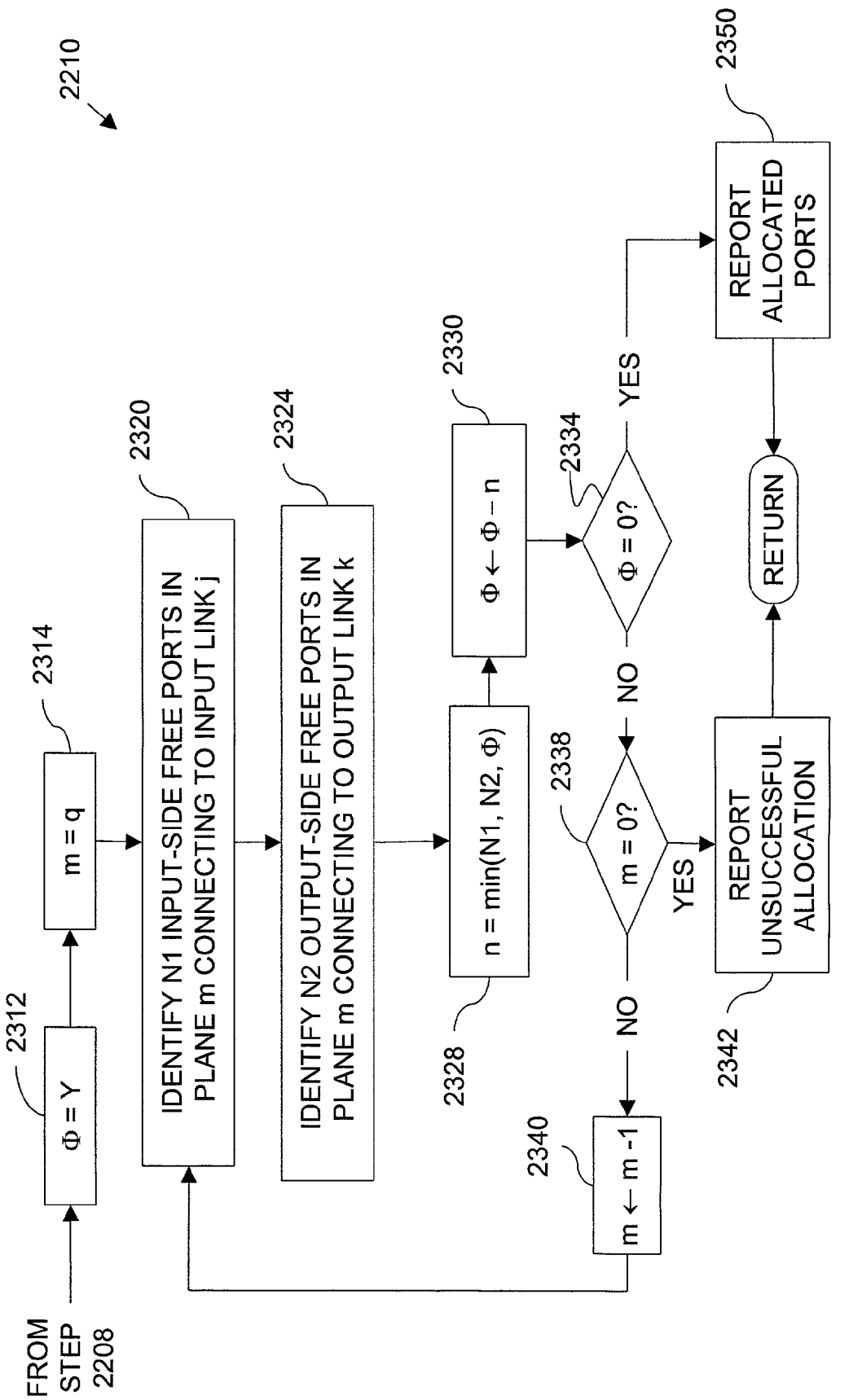
FIG. 23 illustrates details of a channel-allocation step in the connection-setup procedure of FIG. 22.

FIG. 23 details the channel-allocation process of step 2210 of FIG. 22. The number of requested channels for the connection request is denoted Y. A variable Φ denoting the remaining number of channels to be allocated is initialized in step 2312 to be equal to Y. In step 2314, the switching plane of index q, determined in step 2208 is selected, by setting an intermediate switching-plane index m to be equal to q. In step 2320, the number, N1, of input-side free ports in switching plane m is determined and the N1 free input ports are identified using the data structure of FIG. 20. Likewise, in step 2324, the number, N2, of output-side free ports in switching plane m is determined and the N2 free input ports are identified using the data structure of FIG. 21. In step 2328, the least of N1, N2, and Φ is determined. The resulting number of allocable channels is denoted n. In step 2330, the remaining number of channels, Φ, is reduced by the value of n. In step 2334, if the value of Φ is zero, the channel-assignment process is successful and the identities of the allocated input ports and output ports are reported for the benefit of step 2214 (FIG. 22). Process control is then returned to the process of FIG. 22.

If the value of Φ is greater than zero, the switching-plane index m is examined. If the index, m, is determined (step 2338) to be greater than zero, the index is reduced by one so that the next switching plane may be selected and the procedure starting with step 2320 may be repeated. Where the index, m, which is the index of the last switching plane considered, is determined to be zero (step 2338), it is determined that there is insufficient vacancy in all the switching planes 0 to q. Subsequent to the consideration that there is insufficient vacancy, the channel-allocation process is reported as unsuccessful (step 2342) and process control is returned to the process of FIG. 22.

In an alternative procedure, the cumulative number of available free channels in all the considered switching planes is determined first before actually identifying the respective input ports and output ports. However, in a properly provisioned network, the probability of connection-request rejection would be minute and it would be more expedient to actually allocate ports while they are counted.

It is noted that, even when step 2206 indicates the availability of a sufficient number of free channels in respective output link, connection blocking can still occur due to spatial mismatch of the channels between the input side and the output side. The availability of a sufficient number of free channels in the respective input link is ascertained by the requesting source edge node before a connection request is made. When step 2218 is reached, entries in Ω(.), u(.,.), and v(.,.) corresponding to a blocked connection attempt must be reset to their vacancy states.

In the non-uniform optical core node 1200 of FIG. 12, the smallest connection-capacity that can be established between two edge nodes is an entire channel. Where an input link 1022, 1032, 1042 to the non-uniform optical core node 1200 is an optical fiber link, a channel could be, for example, a single wavelength modulated at 10 Gb/s. With spatial traffic imbalance, some connections may require a capacity of more than one channel while others would require a capacity that is a small fraction of the capacity of a channel. Thus, a connection setup between a given input link 1022, 1032, 1042 and a given output link 1024, 1034, 1044 where the connection requires significantly less than the capacity of an entire channel would either be allocated a full channel or sent to an intermediate edge node where it would be aggregated with other connections towards the desired sink edge node. It is desirable to allow a finer allocation of capacity through the non-uniform optical core node 1200. Such a finer allocation of capacity may increase the reach of source edge nodes, permitting connections of minute capacity to some sink edge nodes and connections of large capacity to other sink edge nodes simultaneously. This finer allocation of bandwidth can be achieved with Time Division Multiplexing (TDM).

If low switching-latency can be realized in the switching fabric, a time-sharing scheme, such as TDM can be used, and control signals sent by subtending edge nodes can be carried "in-band", occupying pre-assigned time slots in a TDM frame. In-band signaling in a network deploying fast optical switches in the core is described in Copending U.S. patent application Ser. No. 10/054,509, referenced hereinbefore.

In Time Division Multiplexing, a TDM frame having a fixed duration is divided into a number of time slots. For example, a TDM frame having one millisecond duration may be divided into 256 time slots of 4 microseconds duration each. Connections in a switching plane 1030/1230 can be re-arranged in every time slot in a TDM frame according to a schedule. For example, an input port in a switching plane that receives from a source node "A" may be connected to an output port in the switching plane that sends to a sink node "B" for the duration of one time slot and may be connected to an output port in the switching plane that sends to a sink node "E" in the next sequential time slot in the TDM frame. The schedule may be modified to increase or decrease the number of time slots allocated to a connection between a source node and a sink node to reflect a requested capacity. Each source node can then reach thousands of sink nodes with vastly different capacity allocations. If a link has 32 wavelength channels, for example, with each channel divided into 256 time slots, then the total number of time slots is 8,192. These time slots can be routed independently to an arbitrary number of sink nodes.

The duration of a time slot in a TDM frame is constrained by the switching latency of the optical switch. Low switching latency permits a short time-slot duration. The number of time slots per TDM frame is constrained by an upper bound of the period of the TDM frame. A large period, of 10 milliseconds for example, may result in an unacceptable waiting time at a source edge node. A reasonable frame period would be one millisecond.

The use of TDM in a network having bufferless optical core nodes requires precise time coordination between the edge nodes and the optical core nodes. TDM frames must be aligned in time, within a certain degree of accuracy, at the optical core node so that data in specific time slots in upstream channels can be switched appropriately to intended time slots in downstream channels. This alignment can easily be achieved between electronic nodes having buffers. However, it is impractical to time align a succession of adjacent bufferless optical nodes. Where the non-uniform network 500 of FIG. 5 is adapted for use of TDM, edge-to-edge connections only encounter a single intermediate optical core node between two electronic nodes. The use of single intermediate optical node makes time locking, and therefore TDM in a bufferless path, feasible. TDM also requires fast-switching optical core nodes. A fast-switching optical core node can allocate time slots that are sufficiently short to enable the use of a TDM frame of a relatively short period and avoid undue delay at the source nodes. A switching latency of 100 nanoseconds, for example, permits the use of time slots of one microsecond duration each and a TDM frame of one millisecond would contain 1,000 time slots.

It should be noted that, where at least one of the 8×8 switching planes 1030S, 1030T operates in TDM switching mode, the TDM-operated switching plane may handle signaling and control messages exchanged between edge nodes and the core node controller 1270 in addition to switching payload data from input ports to output ports.

Figure 24:
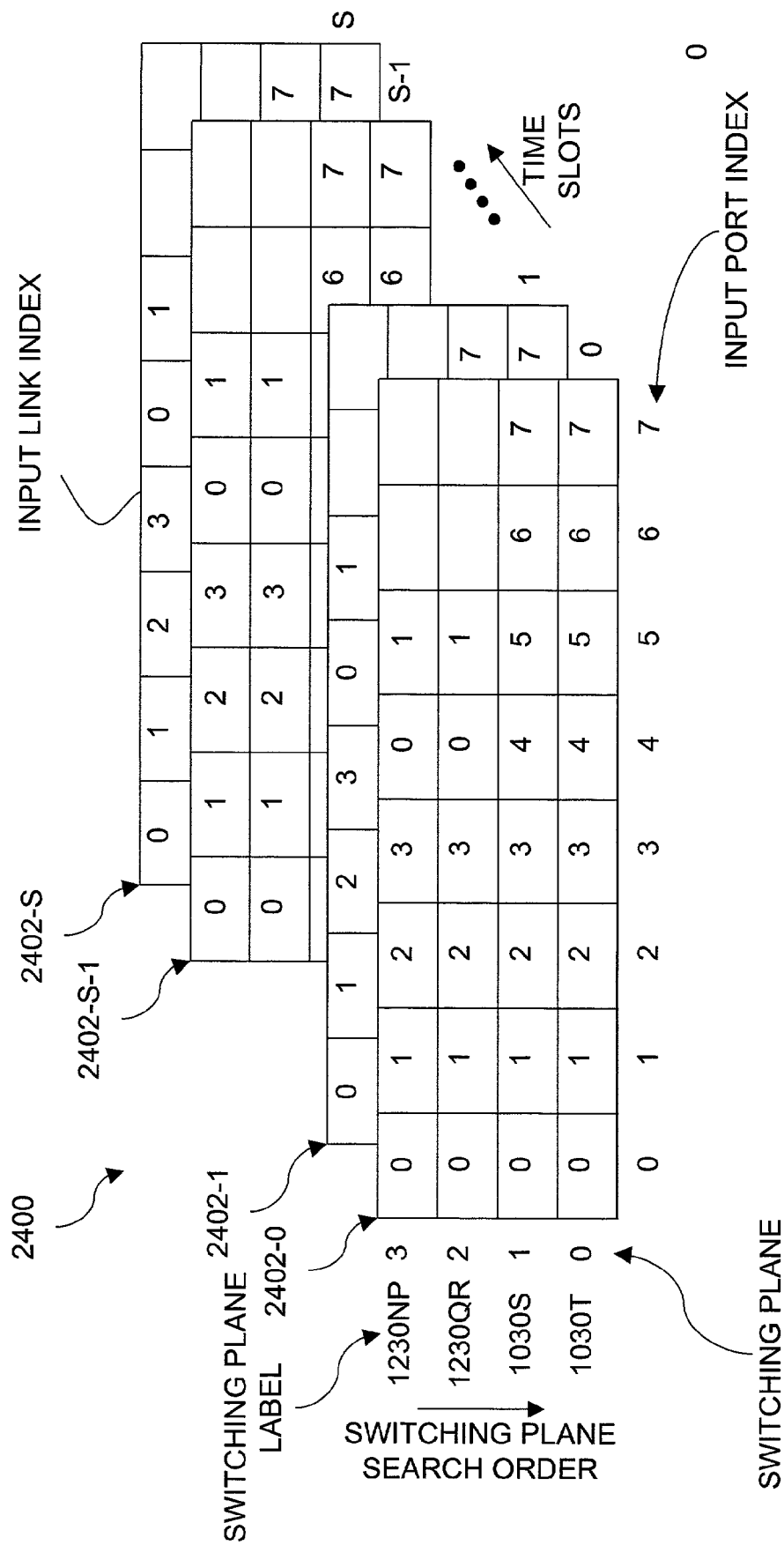
FIG. 24 illustrates a set of vacancy data structures for use with a route selection method adapted from the method presented in FIG. 22 according to an embodiment of the present invention.

FIG. 24 illustrates a set 2400 of S vacancy data structures 2402-0, 2402-1, . . . , 2402-S–1, 2402-(S–1) for use with a route selection method adapted from the method presented in FIG. 22. It should be understood that sets of input side vacancy data structures and sets of output side vacancy data structures will have a similar logical representation. The sets may, however, be asymmetrical when the switching planes are asymmetrical. Each vacancy data structure 2402 of the set 2400 corresponds to a single time slot in a TDM frame. The route selection method of FIG. 22 and FIG. 23 may be adapted to be applied to successive time slots. This approach realizes a method of route selection that packs connections both in time and in space. Specifically, connections are packed in time by attempting to first allocate available time slots early in the TDM frame. Connections can be packed in space by considering switching planes in a given order. In a non-uniform core node 1200, switching planes of low coverage index for available connections before switching planes of high coverage index, as discussed hereinbefore.

It is noted that the two-dimensional packing process, in time and space, is beneficial for both uniform and non-uniform parallel-plane core nodes. Two-dimensional packing, however, is more crucial in non-uniform core nodes where switching planes of low coverage index are considered first. The throughput and performance of non-uniform networks are sensitive to temporal and spatial traffic variations and, therefore, benefit more from the packing procedure of FIG. 23. In a uniform parallel-plane core node, spatial packing is realized simply by considering, in a connection setup, the switching planes in a prescribed order.

Figure 25:
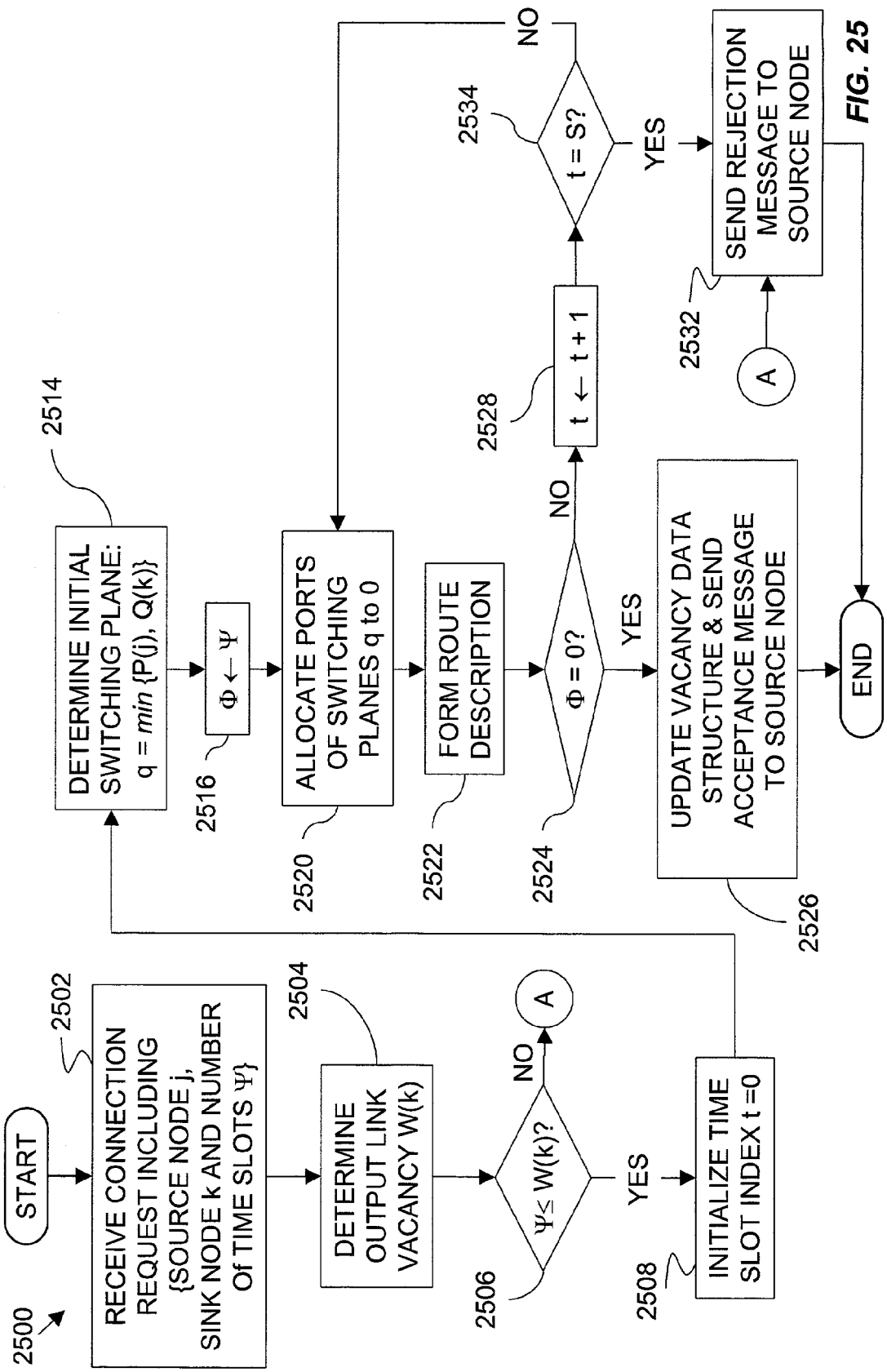
FIG. 25 illustrates steps in a connection-setup procedure in the non-uniform optical core node of FIG. 12 according to an embodiment of the present invention that uses Time Division Multiplexing and considers packing connections in time then in space.

FIG. 25 is a flow chart of the connection setup procedure 2500 where the non-uniform optical core node 1200 uses TDM and it is decided to pack connections in time then in space. The method illustrated in FIG. 25 may be executed by the core node controller 1270 at the non-uniform optical core node 1200 and makes use of the data structures corresponding to the data structures of FIGS. 16 and 17 but having the format illustrated in FIG. 24. Data structure 2400 of FIG. 24 is derived from data structure 1600 of FIG. 16 which applies to the input side of a core node 1200. The same structure 2400 is applied to the output side of the core node 1200 by using an output-side vacancy table 1700 for each time slot in a TDM frame. Notably, the data structures of FIGS. 18 to 21 are unchanged with the use of TDM. The procedure is activated upon reception of a connection request from a source edge node (step 2502) through an input link 1022, 1032, 1042. The index, j, of the of the input link 1022, 1032, 1042 is noted and an index, k, of an output link 1024, 1034, 1044 leading to the desired sink edge node is also noted. An indication of a requested capacity for the requested connection is used to determine the number, $\Psi$, of requested time slots per TDM frame.

The available capacity, i.e., vacancy, of an output link 1024, 1034, 1044 to a sink edge node may be maintained in a data structure in the memory of the core node controller 1270. An element of the data structure is denoted W(k). In step 2504, the element W(k) is retrieved to determine the vacancy of the output link 1024, 1034, 1044 to the sink edge node specified in the connection request. It is then determined whether the vacancy, W(k), equals or exceeds the requested capacity, $\Psi$ (step 2506), where $\Psi$ is expressed as a number of time slots per TDM frame. Where vacancy equals or exceeds the requested capacity, a time slot index, t, is initialized (step 2508). An initial value for the switching plane index, q, may then be determined as the lower of P(j) and Q(k) (step 2514), given the received j and k. P(j) is the highest-index switching plane for input link j and Q(k) is the highest index switching plane for output link k as determined from arrays 1802 and 1804 of FIG. 29. The switching plane having index q is the first candidate switching plane.

A variable $\Phi$ denoting the remaining number of time slots to be allocated is initialized to be equal to $\Psi$ (step 2516). Ports in the switching planes q to 0 that are available for the time slot, t, under consideration, are then allocated (step 2520). Step 2520 determines a number of allocable paths during a given time slot in the TDM frame and is detailed in FIG. 26. The ports allocated in step 2520 are then used to form route descriptions (step 2522) for the time slot, t, under consideration. Where the remaining number, $\Phi$ of time slots to be allocated is determined to be zero (step 2524), an acceptance message is sent to the source edge node (step 2526). Such an acceptance message identifies time slots and wavelength channels, of the input links, corresponding to the input ports allocated to satisfy the connection request.

Where the remaining number, $\Phi$, of time slots to be allocated is determined to be greater than zero (step 2524), the index t of the time slot under consideration is increased (step 2528) and, in step 2534, if t=S, where S is the number of time slots per TDM frame (the time slots of a TDM frame are numbered 0 to S–1), it is determined that there are no more time slots to consider and a rejection message may be produced and sent (step 2532) to the source edge node.

A rejection message is produced and sent (step 2532) to the source edge node when it is determined that the output link to sink edge node does not have the capacity to meet the request (step 2506) or, later on, if it is determined that fewer matching time slots than the requested number of time slots are available for allocation (step 2520) after all time slots have been considered (step 2534). If all time slots have not been considered, the port allocation procedure of step 2520 is repeated for the next time slot. When step 2532 is reached, any allocated ports are released by updating the vacancy structure 2400.

Figure 26:
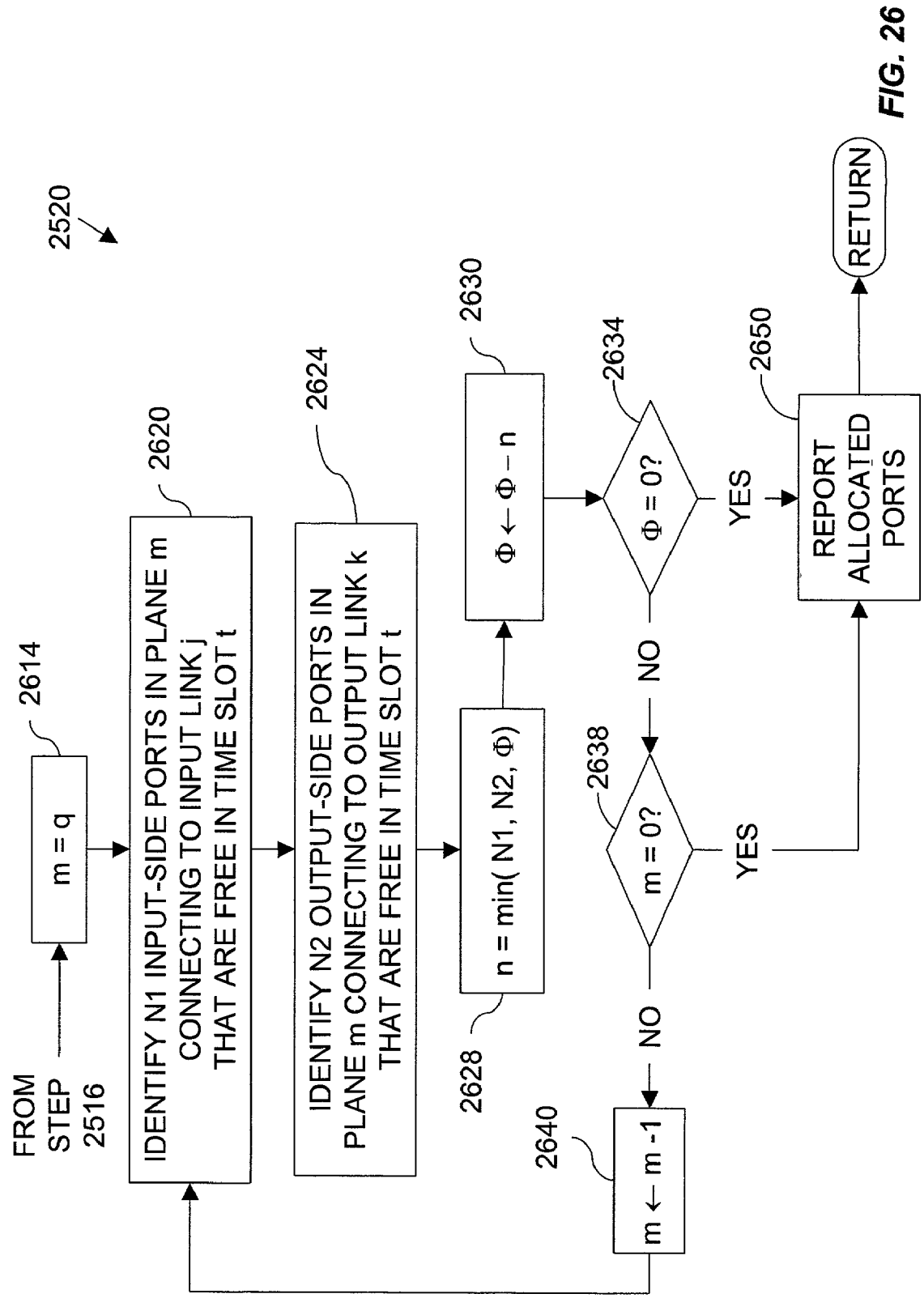
FIG. 26 illustrates details of a time-slot-allocation step in the connection-setup procedure of FIG. 25.

FIG. 26 details the time-slot assignment process of step 2520. The procedure is quite similar to that of FIG. 23. The main difference is that the requested capacity is expressed as a number of time slots per TDM frame and, because it cannot be determined whether a requested number $\Psi$ of time slots can be accommodated before repeating procedure 2520 of FIG. 26 for all the time slots of a TDM frame, an acceptance, or otherwise, of a connection requested is determined in step 2534 in the parent procedure 2500.

The integer variable $\Phi$, used to denote the number of time slots still to be allocated, is an input to procedure 2520 of FIG. 26. In step 2516, this number is initialized to equal the required number $\Psi$ of time slots per TDM frame. In step 2614, the switching plane q is selected, by setting the index m equal to q. In steps 2620 and 2624, the N1 input-side ports and N2 output-side ports are identified (these are analogous to steps 2320 and 2324). In step 2628, the minimum (n) of N1, N2 and $\Phi$ is determined as the number of allocable paths within a current switching plane m and in step 2630, the integer variable $\Phi$ is reduced by the result, n. In step 2634, the procedure is terminated successfully if $\Phi$=0, indicating that the requested number of time slots for the requested connection has been found. If the remaining number of time slots to be allocated, $\Phi$, is determined to be greater than zero (step 2634), it is then determined whether the last switching plane considered was the last switching plane available for consideration, i.e., whether m=0 (step 2638). If there remain switching planes to consider, the switching plane index, m, is reduced by one (step 2640) and the procedure starting with step 2620 is repeated.

The identities of ports allocated to the connection request, if any, are reported (step 2650) whether the reporting step is reached when port allocation has completed successfully (step 2634) or unsuccessfully (from step 2638). Note that the parent procedure 2500 is aware of the index of the time slot for which procedure 2520 is executed.

It is noted that, even when step 2506 indicates the availability of a sufficient number of free time slots per TDM frame in the channels of the respective output link, connection blocking can still occur due to spatial and temporal mismatch of the available time slots between the input side and the output side of the non-uniform optical core node 1200 (FIG. 12). The availability of a sufficient number of free time slots in the respective input link is of course ascertained by the requesting source edge node before a connection request is made.

Figure 27:
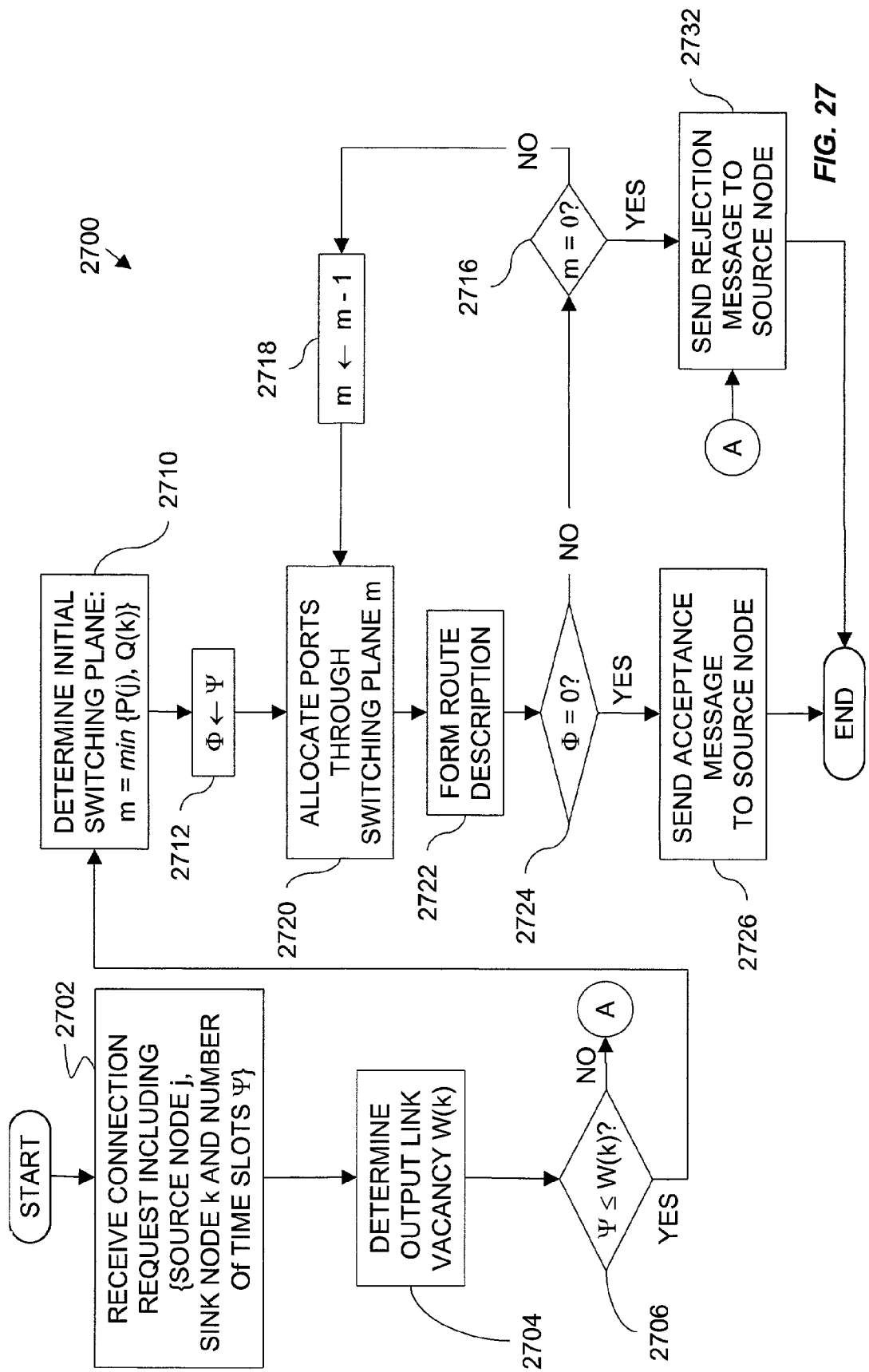
FIG. 27 illustrates steps in a connection setup procedure in the non-uniform optical core node of FIG. 12 according to an embodiment of the present invention that uses Time Division Multiplexing and considers packing connections in space then in time.

FIG. 27 is a flow chart of the connection setup procedure 2700 where the non-uniform optical core node 1200 uses TDM and it is decided to pack connections in space then in time, in contrast to packing connections in time then in space as illustrated in FIG. 25. The procedure is activated upon reception of a connection request from a source edge node through an input link 1022, 1032, 1042 (step 2702). The index, j, of the input link 1022, 1032, 1042, and an index, k, of an output link 1024, 1034, 1044 are associated with the request. A required number, $\Psi$, of time slots per TDM frame is deduced from an indication of required capacity for the requested connection.

The vacancy of the output links 1024, 1034, 1044 to sink node specified in the connection request is then determined (step 2704). It is then determined whether the vacancy, W(k), of the specified output link 1024, 1034, 1044 equals or exceeds the requested capacity, $\Psi$ (step 2706). If the vacancy is lower than the required number of time slots $\Psi$, a rejection message is sent to the source edge node (step 2732) and the procedure 2700 is complete.

It is noted that, even when step 2706 indicates the availability of a sufficient number of free time slots per TDM frame in the channels of the respective output link, connection blocking can still occur due to spatial and temporal mismatch of the free time slots between the input side and the output side. The availability of a sufficient number of free time slots in the respective input link is of course ascertained by the requesting source edge node before a connection request is made.

If the vacancy of the requested output link is greater than the required number of time slots $\Psi$, an initial value for the switching plane index, q, may then be determined as the lower of P(j) and Q(k) (step 2710), given the received input-link index j and output-link index k. The switching plane having index q is the first candidate switching plane. An integer variable, $\Phi$, is used to denote the number of time slots still to be assigned for the requested connection. In step 2712, this integer variable $\Phi$ is initialized to equal $\Psi$. Step 2720 is detailed in the procedure of FIG. 28, which is executed to find a number of allocable ports (hence allocable paths), in the switching plan under consideration. The procedure 2720 of FIG. 28 returns to step 2722 the identities of allocated ports in particular time slots, if any, in switching plane m and the remaining number, $\Phi$, of time slots to be allocated. If it is determined that there are no more time slots to be allocated (step 2724), an acceptance message is sent to the source edge node (step 2726). The acceptance message may include identities for the assigned time slots and the wavelength channels associated with respective allocated input and output ports.

If it is determined that there are more time slots to be allocated (from step 2724), i.e., if $\Phi$ is not yet zero, then it is determined whether the most recent switching plane considered was the switching plane with the least index (step 2716). If all the switching planes are exhausted without accumulating the required number of time slots for the requested connection, i.e., m=0 (step 2716), a rejection message is sent to the source edge node (step 2732) and the procedure 2700 is complete. However, if there are switching planes left to consider, the switching plane index is reduced by one (step 2718) and the port allocation procedure (step 2720) is repeated for the switching plane of the new index. Step 2732 also includes a process of updating vacancy arrays 2400 if any ports have been allocated.

Figure 28:
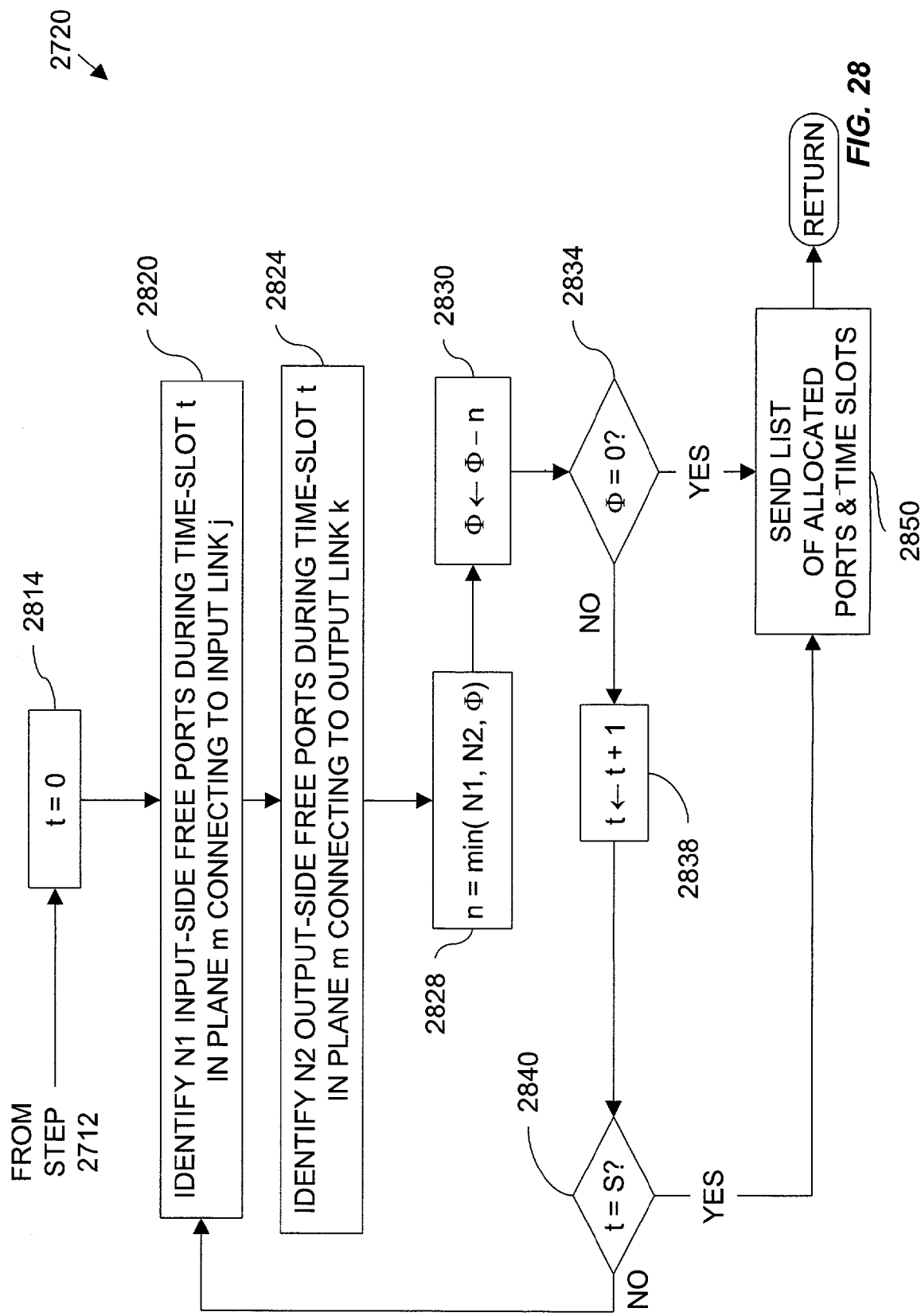
FIG. 28 illustrates details of a time-slot-allocation step in the connection-setup procedure of FIG. 27.

In FIG. 28, the port allocation procedure begins with the initialization of a time slot index, t, to zero (step 2814). The input ports of the switching plane under consideration are determined for the time slot, t (step 2820). Additionally, the output ports of the switching plane under consideration are determined for the time slot, t (step 2824). In step 2828, the minimum (n) of N1, N2 and $\Phi$ is determined as the number of allocable paths during a current time slot 't' of the TDM frame. The remaining number of time slots, $\Phi$, is then reduced by this minimum (step 2830). It is then determined whether the remaining number of time slots, $\Phi$, has been reduced to zero (2834). If $\Phi$ has been reduced to zero, the allocated ports and time slots are reported (step 2850) and process control returns to the procedure of FIG. 27. If $\Phi$ is greater than zero, the time slot index is increased (step 2838). If, in step 2840, it is determined that the new time-slot index t is less than S, port allocation is considered for this time slot (step 2820), otherwise, the allocated ports and time slots are reported (step 2850) and process control returns to the procedure of FIG. 27.

In review, the method represented by FIG. 25 is used when it is considered more desirable to pack connections in time then in space. The same time slot is tested for availability in successive switching planes before considering the next time slot. In contrast, the method represented by FIG. 27 is used when it is considered more desirable to pack connections in space then in time. Successive time slots in the same switching plane are tested for availability before considering the next switching plane.

Input-side and Output-side Connectivity

Figure 29:
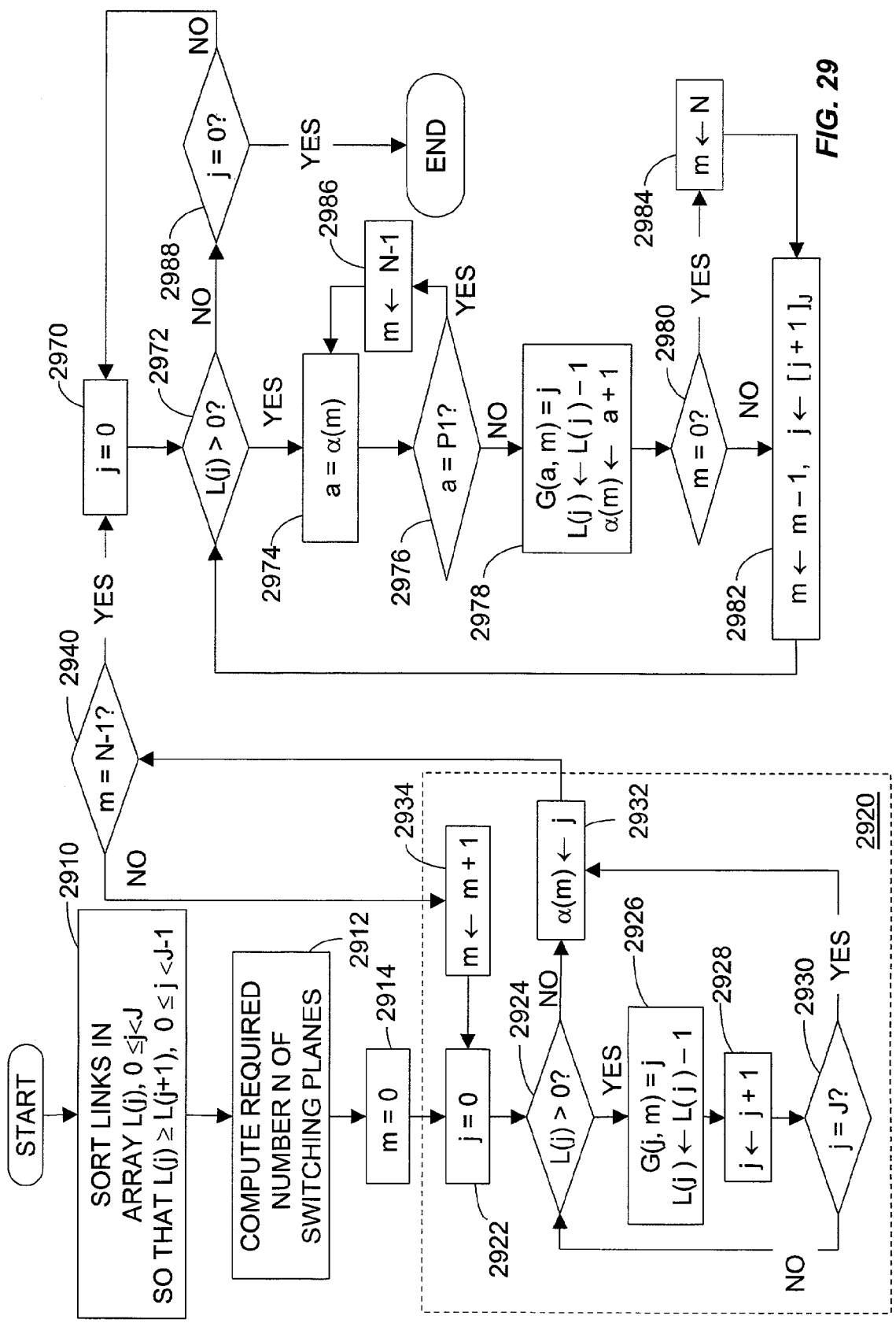
FIG. 29 is a flow chart detailing the steps of a method for assigning channels of input links (or output links) of different sizes to input (or output) ports of a core node having a plurality of switching planes according to an embodiment of the present invention.

FIG. 29 is a flow chart of a procedure for assigning the channels of input links to the input ports of an optical core node having parallel switching planes. The same procedure can be applied for assigning the channels of output links to the output ports of the parallel switching planes.

In its general form, the method of assignment of channels to ports, in accordance with the present invention, applies to the assignment of channels arranged in M>1 channel groups to ports arranged into N>1 rows, where each row has a specified number of ports and each port is assigned only one channel.

In a node comprising parallel switching planes, the N rows can represent N switching planes. The ports of a given switching plane can be further divided into input ports and output ports, and the number of input ports may differ from the number of output ports. Each of the M channel groups can be separated into J input groups and (M−J) output groups, where 0<J<M. Each of the J input groups can represent an input link comprising a number of channels, and each of the (M−J) output groups can represent an output link comprising a number of channels. A link is preferably a fiber-optic link carrying wavelength channels.

For ease of presentation, the switching planes are considered to be identical, each having P1 input ports and P2 output ports. The number of input links is denoted J and the number of output links is denoted K. The number of channels in input link j, $0 \leq j < J$, is denoted L(j), and the number of channels in output link k, $0 \leq k < K$, is denoted $\Lambda(k)$.

In step 2910, the input links are sorted, in a descending order, according to the number of channels per input link, so that $L(j) \geq L(j+1)$, $0 \leq j < J$. The input links are, therefore, numbered accordingly. In step 2912, the required number of switching plane is determined. The number, N1, of switching planes required to accommodate the input links is determined as the sum of L(j), $0 \leq j < J$, divided by the number P1 of input ports per switching plane. The number, N2, of switching planes required to accommodate the output links is determined as the sum of $\Lambda(k)$, $0 \leq k < K$, divided by the number P2 of output ports per switching plane. Thus:

$$N1 = \frac{1}{P1}\sum_{j=0}^{J-1} L(j), \text{ and } N2 = \frac{1}{P2}\sum_{k=0}^{K-1} \Lambda(k),$$

where L(j), $0 \leq j < J$ is the number of channels in an input link j, and $\Lambda(k)$, $0 \leq k < K$ is the number of channels in an output link k.

The number, N, of switching planes to be used is determined (step 2912) to be an integer at least equal to the larger of N1 and N2. The N switching planes are numbered 0 to (N−1). A switching plane index, m, is then initialized to zero (step 2914).

An allocation matrix G is used to maintain a record of allocations of channels of input links to input ports. An element g(p, m), of matrix G, $0 \leq p < P1$, $0 \leq m < N$, contains an identifier of an input link that has a channel connected to input port p of switching plane m in a core node having N switching planes with each plane having P1 input ports.

An allocation matrix $\Gamma$ is used to keep a record of allocations of channels of output links to output ports. An element $\gamma(\pi, m)$, of matrix $\Gamma$, $0 \leq \pi < P2$, $0 \leq m < N$, contains an identifier of an input link that has a channel connected to input port $\pi$ of switching plane m in a core node having N switching planes with each plane having P2 output ports. Both allocation matrices, G and $\Gamma$, are initialized by assigning a null entry to each element.

The steps collectively referenced as 2920, including steps 2922 to 2934, are used to assign upstream channels to any selected switching plane. An array L(.), initially indicates the number of channels for each of the J input links. The array L(.) is gradually updated to indicate the number of unassigned channels for each of the input links. In step 2922, the link index, j, is initialized to zero so that the first of the J sorted input links may be considered. In step 2924, it is determined whether there are unassigned channels in input link j. If L(j) is greater than zero, a channel from input link j is allocated to the input port number p=j of switching plane m (step 2926).

Thus, when a channel from input link j is allocated to an input port of switching plane m, the corresponding element of Matrix G, i.e., element g(p, m), p=j, is set equal to j and L(j) is reduced by one. Note that the P1 input ports of any switching plane are numbered 0 to (P1−1).

In step 2928, the link index, j, is increased. In step 2930, it is determined whether increasing the link index has caused j to equal the value J, indicating that all input links have been considered regarding channel-assignment to switching plane m. If j=J, then step 2932 is selected. Where it is determined that j is not equal to J, it is determined whether the input link corresponding to the new link index has channels left to allocate to input ports (step 2924).

An array $\alpha(m)$, $0 \leq m < N$, points to the lowest index input port in switching plane m that is not yet assigned. Thus, initially $\alpha(m)$ is set equal to zero for $0 \leq m < N$.

If, in step 2924, it is determined that no more channels are left to be allocated for the input link j, i.e., L(j) is not greater than zero, or, in step 2930, it is determined that there are no more input links to consider, i.e., j is equal to J, then $\alpha(m)$ is set equal to the last known value of j, which is one more than the last used value of j (step 2932). The maximum value of $\alpha(m)$ is, therefore, P1, because the number, J, of input links is limited to be less than or equal P1. Thus, $\alpha(m)$ points to the lowest index input port in switching plane m that is not yet assigned.

In step 2940, the index, m, of the last considered switching plane is examined. If it is determined that m corresponds to the last switching plane, N−1, the initial assignment process of collective step 2920 is determined to be complete and a subsequent assignment process is initiated. Where the initial assignment process of collective step 2920 is determined to be incomplete, i.e., m is less than N−1, the switching plane index is increased (step 2934) and the initial assignment process is repeated for a new switching plane.

In the subsequent assignment process, the unassigned channels in a subset of the input links are distributed among the switching planes, starting with switching plane (N−1), in a manner that attempts to increase connectivity. Since the unassigned channels are to be found in a subset of input links having consecutive numbers starting with j=0, the link index, j, is re-initialized to zero (step 2970). In step 2972, the number of unassigned channels in input link j, L(j), is considered. If the number of unassigned channels in input link j is positive, the value of a variable 'a' is set to the value of $\alpha(m)$ (step 2974). It is then determined whether the variable 'a' is equal to the number of input ports, P1 (step 2976). If all the input ports switching plane m are assigned, i.e., a=$\alpha(m)$=P1, the switching plane index is set equal to the highest switching-plane index (N−1) (step 2986) and the value of the variable 'a' is set to the value of α(m) (step 2974) for the new switching plane m. If some of the input ports of switching plane m are unassigned, i.e., a=α(m)<P1, the entry g(a, m) is updated (step 2978), replacing a null entry with the input link index, j, the number of unassigned channels L(j) is reduced by one and the input port pointer α(m) is increased by one. If the last processed switching plane is determined to be the bottom switching plane (m=0) (step 2980), then the switching plane index is set to the number of switching planes, N (step 2984). In step 2982, the switching plane index is reduced by one and the link index is increased by one, modulo J. Subsequently, the number of unassigned channels in the new input link j, L(j), is considered (step 2972). Step 2982 may also be reached when it is determined that the last processed switching plane is other than the bottom switching plane (step 2980).

In step 2988, if it is found that the input link that has all its channels assigned is not input link number 0 (j=0), then the link index is re-initialized (step 2970). Where the input link that has all its channels assigned is the input link number 0, the channel-assignment procedure is considered to be complete because input link number 0 has the highest number of channels and the assignment process described above ensured that input link number 0 is the last input link to be exhausted.

The procedure of FIG. 29 is described herein as the assignment of wavelength channels in input links to input ports of switching planes. The procedure for the assignment of wavelength channels in output links to output ports of switching planes is identical, with array L(.) replaced by array Λ(.), and the number of input ports P1 replaced by the number of output ports P2.

FIG. 30 illustrates an input-side connectivity matrix G 3000 for an exemplary parallel-plane core node with P1=16, J=16, L(0)=L(1)=8, L(2)=L(3)=7, L(4)=L(5)=L(6)=L(7)=6, L(8)=L(9)=L(10)=L(11)=4, and L(12)=L(13)=L(14)=L(15)=2. The required number N1 of switching planes to accommodate the input links is determined as $$N1 = \frac{1}{16}\sum_{j=0}^{15} L(j) = 4.875.$$

The required number N2 of switching planes required to accommodate the output links is determined likewise, and the number N of switching planes is selected to be an integer at least equal to the higher of N1 and N2. The example of FIG. 30 is based N=5. The matrix 3000 of FIG. 30 is largely the result of the initial assignment process of collective step 2920 in FIG. 29 if the number, N, of switching planes is selected to be equal to the largest number of channels per link, leading to the configuration of FIG. 10. At step 2972 in FIG. 29 it would have been found that the input link 0 has all its channels assigned, thus terminating the subsequent assignment process. Link indices 3020 are shown as elements of the matrix 3000.

Figure 31:
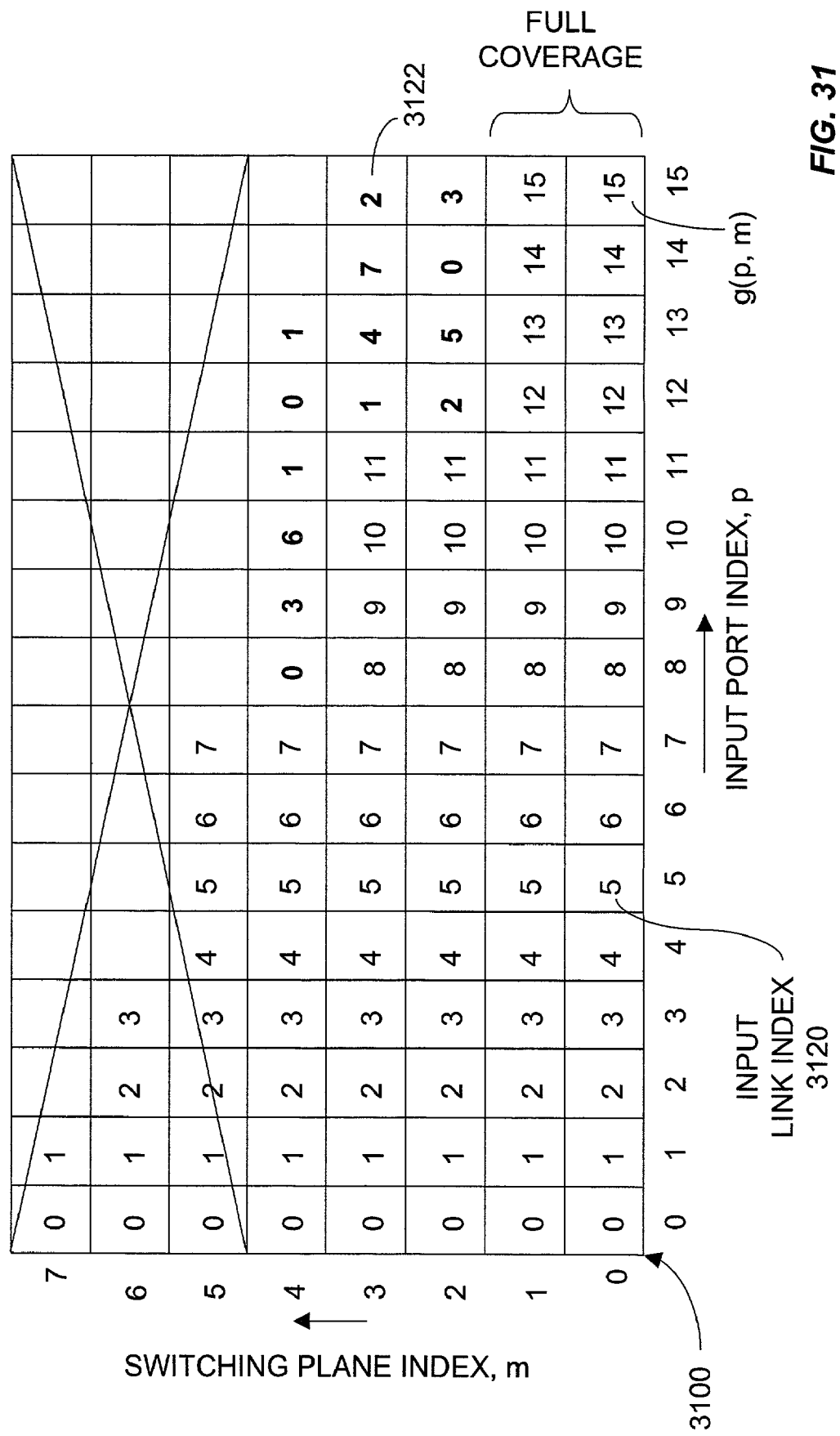
FIG. 31 illustrates an alternative input-side connectivity matrix for an exemplary parallel-plane core node according to an embodiment of the present invention.

FIG. 31 illustrates the input-side connectivity matrix 3100 for the exemplary parallel-plane core node used in the example of FIG. 30. The main difference is that the number, N, of switching planes is determined as the larger of N1 and N2 as described earlier with reference to FIG. 29, step 2912. In contrast to the exemplary eight parallel-plane core node related to the matrix 3000 of FIG. 30, the exemplary five parallel-plane core node related to the matrix of 3100 of FIG. 31 has three fewer switching planes. As such, at the end of the initial assignment process of collective step 2920 in FIG. 29, there are still 14 more wavelength channels in eight input links to be assigned. The values of array α(m), 0≤m<5, after the initial assignment process would be α(0)=α(1)=16, α(2)=α(3)=12, and α(4)=8, and the number unassigned channels in the 16 input links are L(0)=L(1)=3, L(2)=L(3)=2, L(4)=L(5)=L(6)=L(7)=1, and L(8)=L(9)=L(10)=L(11)=L(12)=L(13)=L(14)=L(15)=0.

As in the matrix 3000 of FIG. 30, link indices 3120 are shown as elements of the matrix 3100 (i.e., matrix G) of FIG. 31. For emphasis, particular link indices, an exemplary one of which is indicated as link index 3122, whose assignment was a result of the subsequent assignment process, are shown in bold face type.

Figure 32:
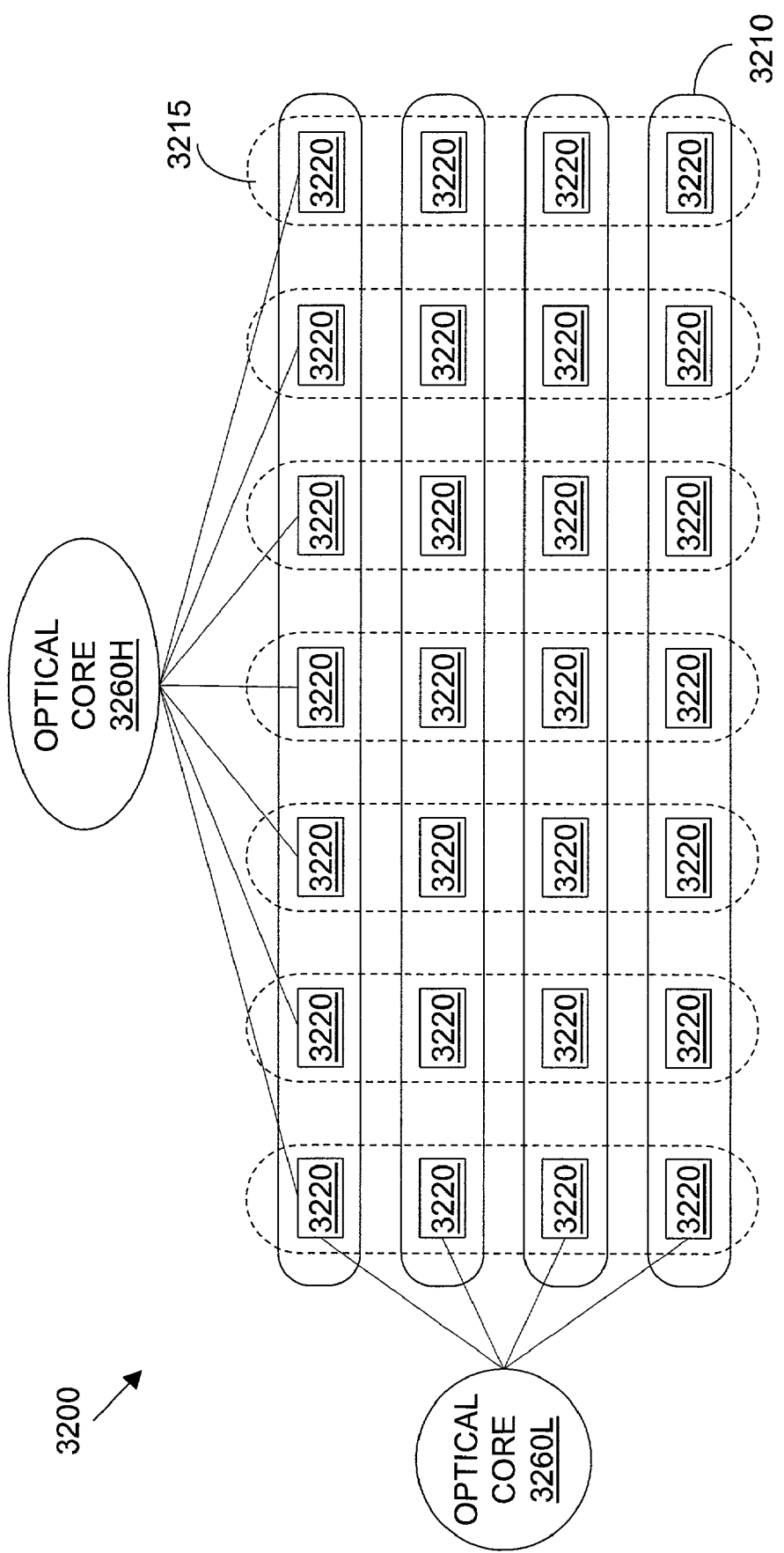
FIG. 32 illustrates a prior-art two-dimensional, uniform, composite-star network.

FIG. 32 illustrates an exemplary two-dimensional uniform composite-star network 3200 that includes 28 edge nodes 3220. The exemplary two-dimensional uniform composite-star network 3200 is logically arranged into a plurality of "horizontal" composite-star networks 3210, each having seven edge nodes 3220 interconnected by a respective horizontal optical core 3260H. As there are four horizontal composite-star networks 3210, there are four horizontal optical cores 3260H, only one of which is illustrated. Each of the horizontal composite-star networks 3210 is of the type of composite-star network as described earlier with reference to FIG. 2.

Sets of four edge nodes 3220, each belonging to a different horizontal composite-star network 3210, are formed and the edge nodes 3220 of each set are interconnected through a respective optical core 3260L to form seven "lateral" composite-star networks 3215. As there are seven lateral composite-star networks 3215, there are seven lateral optical cores 3260L, only one of which is illustrated.

Thus, each edge node 3220 is a member of two composite-star networks 3210, 3215. The selection of edge nodes 3220 to be associated with a composite-star network 3210, 3215 can be based on expected mutual traffic among the edge nodes. The exemplary two-dimensional uniform composite-star network 3200 is described as a two-dimensional network because each edge node 3220 is a member of two composite-star networks 3210, 3215. This requires that each edge node 3220 have a sufficient number of links. Each edge node 3220 has outer links, which connect to traffic sources and traffic sinks, and inner links, which connect to optical core nodes included in the horizontal optical core 3260H and the lateral optical core 3260L.

The logical structure of the exemplary two-dimensional uniform composite-star network 3200 greatly simplifies the routing function and other control functions. In addition, this structure ensures that the vast majority of connections from a source edge node 3220 to a sink edge node 3220 will traverse at most one cross-point (intermediate) edge node 3220. This, however, requires that all edge nodes 3220 be of the same, or comparable, capacities and that each composite-star network 3210, 3215 be uniform, hence complete. In order to permit the use of edge nodes of widely-varying capacities, and core nodes of widely-varying capacities, incomplete composite-star networks, such as the network 900 of FIG. 9, may be deployed.

Figure 33:
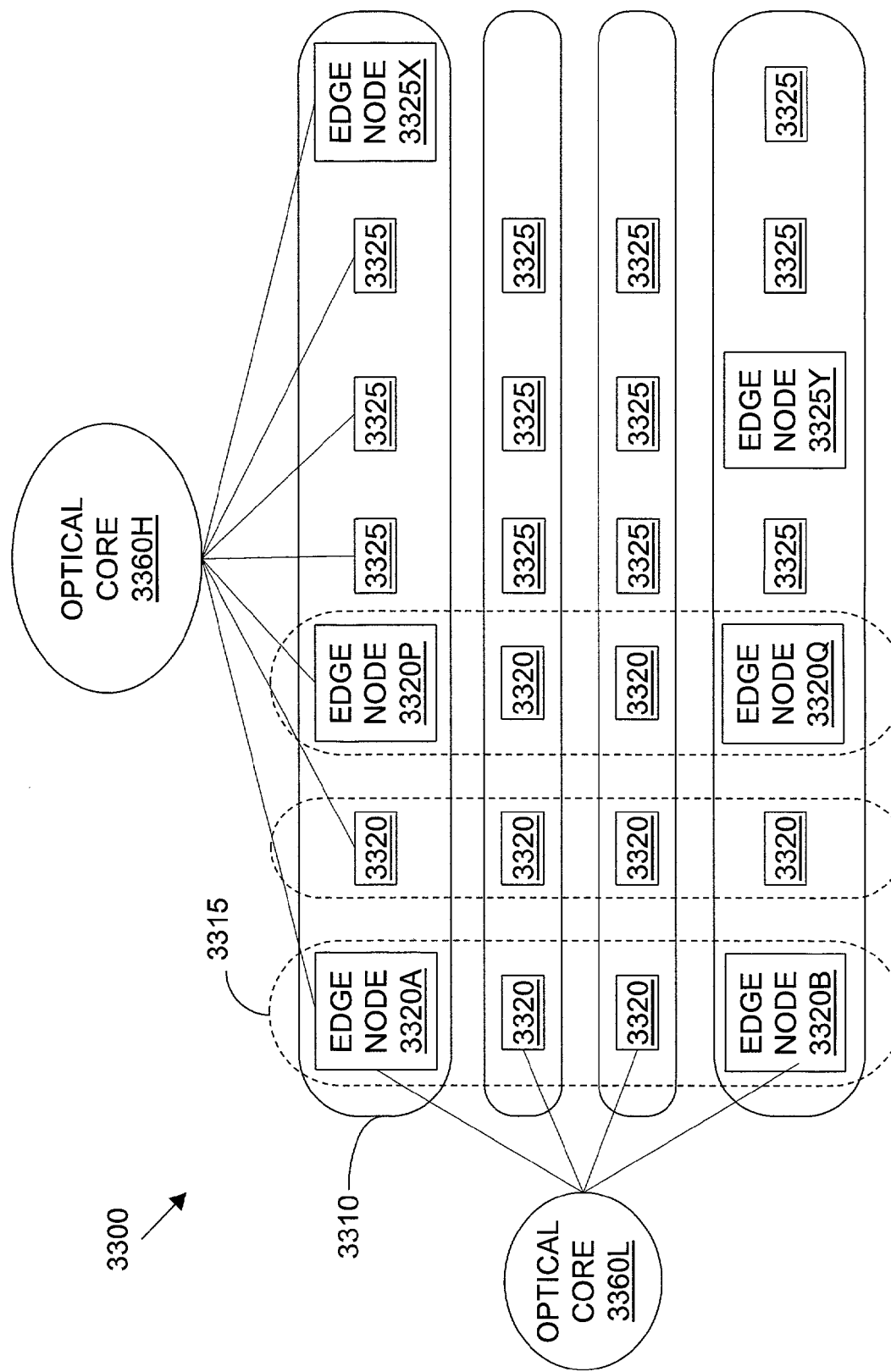
FIG. 33 illustrates a two-dimensional non-uniform, composite-star network according to an embodiment of the present invention.

FIG. 33 illustrates an exemplary two-dimensional irregular (non-uniform) composite star network 3300. The exemplary two-dimensional irregular composite star network 3300 includes high capacity edge nodes 3320 and low capacity edge nodes 3325. The edge nodes 3320, 3325 are logically arranged in four non-uniform horizontal composite-star networks 3310, similar to network 900 of FIG. 9, each having several edge nodes 3320, 3325 interconnected by an optical core 3360H, only one of which is illustrated. Three sets of high capacity edge nodes 3320 are formed and the high capacity edge nodes 3320 of each set are then interconnected through a lateral optical core 3360L, thus forming three lateral composite-star networks 3315. Each of the illustrated edge nodes has one of two distinctly-different capacities, with an edge node referenced as 3320 having a relatively high capacity, hence a sufficient number of links to enable interconnection with two optical cores 3360H, 3360L. If the edge nodes 3320 of a set are of equal, or comparable, capacity, then the formed lateral composite-star networks 3315 can be uniform, hence complete, networks. The illustrated lateral composite star networks 3315 are uniform.

In the exemplary two-dimensional irregular composite star network 3300, each high capacity edge node 3320 is a member of two composite-star networks 3310, 3315. As in the network of FIG. 32, the selection of edge nodes to be associated with a composite-star network 3310, 3315 can be based on expected mutual traffic among the edge nodes.

Each low capacity edge node 3325 belongs only to one of the horizontal non-uniform composite-star networks 3310 and has links to and from one of the horizontal optical cores 3360H. A high capacity edge node 3320 belongs to both one of the horizontal non-uniform composite-star networks 3310 and one of the lateral uniform composite-star networks 3315 and has links to and from one of the horizontal optical cores 3360H and one of the lateral optical cores 3360L. Each composite-star network 3310, 3315 may be viewed as an autonomous network. The lattice structure interconnecting the plurality of horizontal non-uniform composite-star networks 3210 enables a higher-scalability than the use of a traditional full mesh to interconnect autonomous networks.

Consider a non-uniform composite-star network similar to the network 900 of FIG. 9 but having 120 symmetrical edge nodes where 16 edge nodes have nine dual links each, a dual link comprising an uplink and a downlink, with each uplink and each downlink having 32 wavelength channels, each channel carrying an optical signal modulated at 10 GB/s. Each of the remaining 104 edge nodes has seven dual links, with each uplink and each downlink having eight channels of 10 Gb/s capacity each.

The 16 edge nodes serve as high capacity edge nodes. Allocating four dual links per high-capacity edge node (i.e., 128 source ports and 128 sink ports) to traffic sources and sinks and five dual links to connect to the non-uniform optical core 3360H allows an internal expansion (5:4) that virtually eliminates internal blocking. Internal blocking, by definition, is the unavailability of a path between a free source port in any edge node and a free sink port in any other edge node. With respect to the 104 lower capacity edge nodes, allocating three dual links per lower-capacity edge node (i.e., 24 source ports and 24 sink ports) to traffic sources and sinks and four dual links to connect to the non-uniform optical core allows an internal expansion (4:3).

The core nodes in the non-uniform core can have different reach indices. A core node in which at least one input link originates from each edge node and at least one output link terminates in each edge node is a full-reach core node, as described earlier. To avoid, or significantly reduce, tandem switching through a cross-point edge node within a non-uniform composite-star network 3310, at least one of the core nodes in the network 3310 under consideration must be a full-reach core node. Consequently, a full-reach core node must have at least one switching plane of 120×120 connectivity. As described earlier with reference to FIG. 29, the required number of switching planes is determined as: (16×32+104×8)/120=11.2, which must be rounded up to 12. Thus, 12 switch planes, of which eight switching planes are full-coverage planes and four switching planes are partial coverage planes, may be used. The assignment of channels from input links to the input ports of the switching planes, and the assignment of output ports of the switching planes to channels of output links can be determined according to the algorithm described hereinbefore with reference to FIG. 29.

The number of core nodes may be limited to four, and the fourth core node would connect to two dual links from each of the 16 high capacity edge nodes. The number of switching planes would then be: (2×16×32+104×8)/120=15.47, which must be rounded up to 16 switching planes, each having a connectivity of 120×120.

Alternatively, five core nodes may be used, of which three are full-reach core nodes, each having 12 switching planes as described above. The 104 low-capacity edge nodes are divided into two groups of 52 edge nodes each. Each of the remaining two core nodes is a partial-reach core node having a 32-channel input link from each of the 16 high capacity edge nodes, a 32-channel output link to each of the 16 high capacity edge nodes, an eight-channel input link from each of 52 low-capacity edge nodes, and an eight-channel output link to each of 52 low-capacity edge nodes. The number of ports per partial-reach switching plane is then 68 (16 ports receiving channels from the 16 high-capacity edge nodes and 52 ports receiving channels from 52 low-capacity edge nodes). The number of switching planes per partial-reach core node is determined as: (16×32+52×8)/68=13.64, which must be rounded up to 14 switching planes. An advantage of using a larger number of core nodes is a reduced fiber-distance to and from the edge nodes. A disadvantage of using a larger number of core nodes is that it can necessitate the use of partial-reach core nodes and, hence, reduced core-node connectivity. This may force a proportion of traffic to resort to tandem switching where an intermediate edge node may be used for a connection.

Where the structure of the exemplary two-dimensional irregular composite star network 3300 is applied to the parameters described above, each high capacity edge node connects to a horizontal non-uniform core and to a lateral uniform core of a lateral composite-star network. With a high-capacity edge node having 9 uplinks and 9 downlinks, each link having 32 channels, a suitable arrangement would lead to allocating 96 source ports, 96 sink ports to connect to traffic sources and traffic sinks, four uplinks and four downlinks of 32 channels each to connect to the horizontal non-uniform core and two uplinks and two downlinks of 32 channels each to connect to the lateral uniform core of a respective lateral network. The 104 lower capacity edge nodes per non-uniform network 3310 connect only to a non-uniform optical core 3360H and, as described above, three dual links per lower-capacity edge node (i.e., 24 source ports and 24 sink ports) are allocated to traffic sources and sinks and four dual links connect to the non-uniform optical core 3360H.

The horizontal non-uniform core may now have four identical optical core nodes, each having 12 switching planes of connectivity 120×120 (input ports× output ports). Each of the four identical optical core nodes is arranged to support 16 input links of 32 channels each, 104 input links of eight channels each, 16 output links of 32 channels each and 104 output links of eight channels each. Although the four optical core nodes are identical, the optical core is still termed non-uniform because at least two of the switching planes of each of the optical core nodes have a different coverage index.

A two-dimensional network having 64 non-uniform composite-star networks, with the parameters above (16 edge nodes with 96 source/sink ports each and 104 edge nodes with 24 source/sink ports each), would have a total number of source/sink ports of 258,048, and with each source or sink port operating at 10 Gb/s, the total access capacity is about 2.58 petabits per second.

The selection of geographic locations for the edge nodes, and the grouping of high capacity edge nodes to form lateral networks are inter-related. This is a combinatorial-optimization problem that may be solved using heuristics.

Routing

It is common practice to facilitate routing of data from a source edge node to a sink edge node through a given network by providing, at the source edge node, a routing table. Such a routing table preferably includes a route set associated with each sink edge node reachable by the source edge node through the given network. The route set is a listing of selected routes from the source edge node to the sink edge node. A source edge node and a sink edge node define a "node-pair" and a route set is associated with each node pair.

In a single-dimensional, non-uniform, composite-star network, the number of direct routes in a route set associated with a particular source edge node and a particular sink edge node is equal to the number of optical core nodes in the optical core to which the source edge node and the sink node connect. Additional, indirect routes, through tandem edge nodes, may also be included in the route set. Where the number of optical core nodes is relatively small, the number of routes per route set may be manageable. However, in a two-dimensional, non-uniform, composite-star network, the routing table at a source edge node may contain routes to sink edge nodes that are not connected to the source edge node directly through an optical core. The number of routes for a node-pair can be very large and, therefore, it may not be beneficial to list all the possible routes, between the edge nodes forming the node-pair, in the routing table. The derivation of route sets in a two-dimensional non-uniform, composite-star network is described below with reference to FIGS. 34 to 40.

For a given node-pair, a subset of selected routes may be listed in the associated route set in the routing table at the source edge node of the node-pair. The subset can be calculated according to certain route metrics. Route metrics can be based on factors such as administration constraints, link capacity, distance, cost and reliability. In a network having a relatively small number of edge nodes, route sets can be calculated by a network controller and distributed to controllers of the edge nodes. In a wide-coverage network having a large number of edge nodes, route set derivation may be a concerted effort of edge node controllers. Route sets need not be calculated frequently, for instance, only when the topology of the network is modified, i.e., when links and nodes are added or removed. Routes in each route set may be ordered according to a composite metric based on the aforementioned factors. A routing procedure at a particular source edge node can be used to select routes based on the ordered list of routes.

Route Set Formation

In review, in order to facilitate the process of finding a route having a sufficient free capacity to accommodate a connection request, a route set for each edge-node pair is created and sorted according to a prescribed criterion. The derivation of the route set is an "off-line" process that need only be executed whenever relevant topological changes take place. The routes in a route set are sorted according to some route merit index.

In the non-uniform composite-star network 900 of FIG. 9, a direct route is defined by a core node and the preferred route merit index is a function of the reach of the core node and the propagation delay along the route from the source edge node to the sink edge node for which the route set is created. A simple function to determine route merit index would be the product of reach and propagation delay. Thus, a first route having a reach of eight and a propagation delay of ten milliseconds and a second route having a reach of 32 and a propagation delay of 2.5 milliseconds, would have the same route merit index of 80. When two or more routes have equal route merit indices, each may be selected at random or according to a cyclic discipline.

Figure 34:
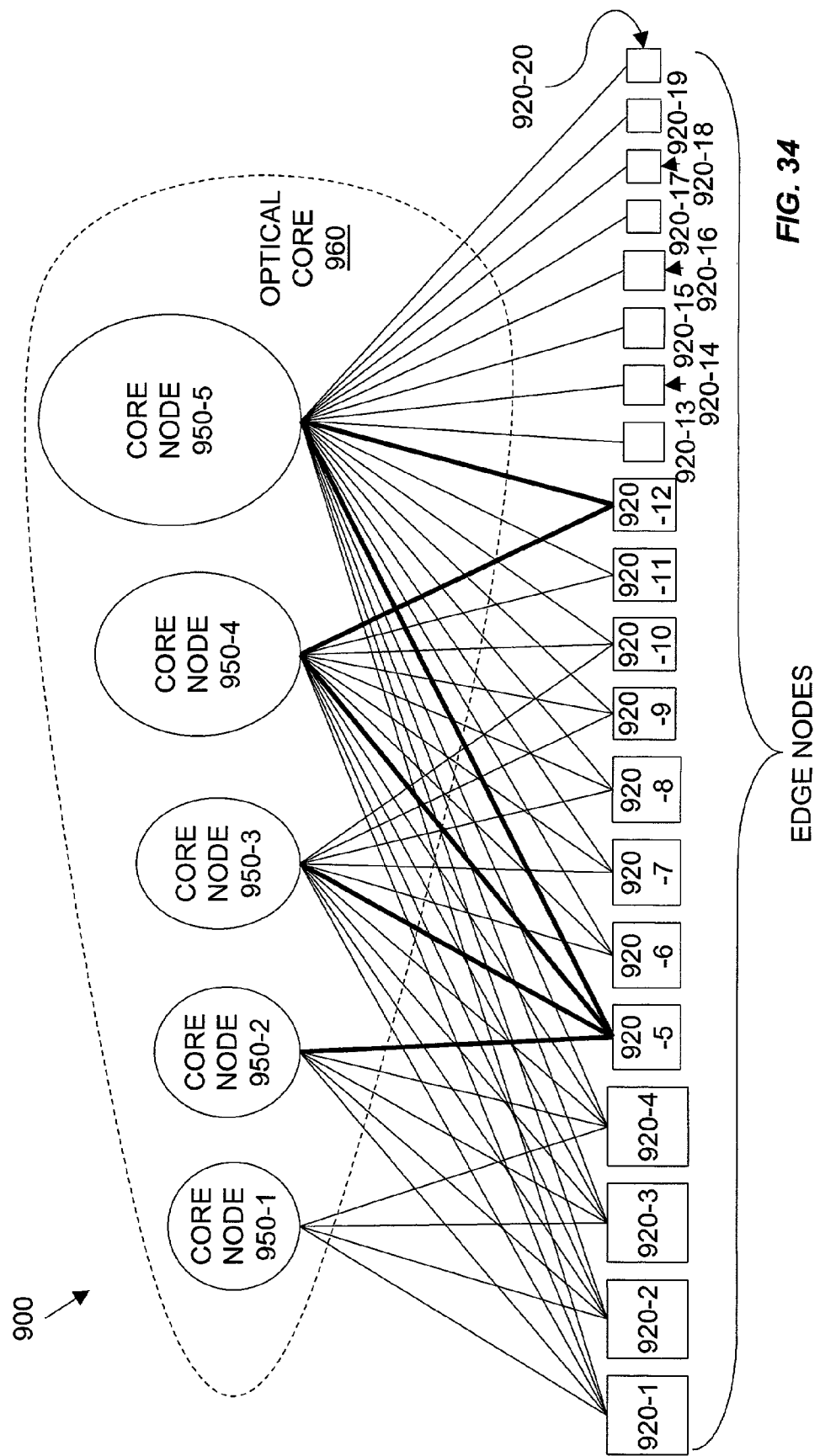
FIG. 34 illustrates connectivity of two edge nodes in the network of FIG. 9.

FIG. 34 illustrates the connectivity of two edge nodes in the network 900 of FIG. 9. In particular, the connectivity is shown for a source edge node 920-5 and a sink edge node 920-12. The source edge node 920-5 can reach four core nodes 950-2, 950-3, 950-4, 950-5 while the sink edge node 920-12 can be reached only from two core nodes, namely, the fourth core node 950-4 and the fifth core node 950-5. Consequently, the route set contains only two routes, one through each of the core nodes 950-4, 950-5 that connect to both the source edge node 920-5 and the sink edge node 920-12. The fourth core node 950-4 can reach 12 edge nodes, as indicated in FIG. 34, while the fifth core node 950-5 can reach 20 edge nodes. Thus the reach indices of the two core nodes 950-4, 950-5 are 12 and 20, respectively. Where a route through the fourth core node 950-4 has a propagation delay of five milliseconds and a route through the fifth core node 950-5 has a propagation delay of 3.5 milliseconds, the route merit indices of the routes are 60 and 70, respectively (12 times 5 and 20 times 3.5). The route through the fourth core node 950-4 is therefore preferable, as the route has a lower route merit index, and would be selected if the route can accommodate the capacity specified in a connection request. In the network 900 of FIG. 34, a route set is defined by a subset of core nodes 950. A route set from a first edge node to a second edge node is not necessarily defined by the same core nodes defining the route set from the second edge node to the first edge node.

In the exemplary two-dimensional irregular composite star network 3300 of FIG. 33, the routes from an edge node 3320, 3325 within a non-uniform composite-star network 3310 to another edge node 3320, 3325 within the same non-uniform composite-star network 3310, are preferably confined to that non-uniform composite-star network. A route from a source high capacity edge node 3320 in a first non-uniform composite-star network 3310 to a sink high capacity edge node 3320 in a second non-uniform composite-star network 3310 is either direct, through the uniform core 3360L, or has two hops, either one hop through the first non-uniform composite-star network 3310 and another hop through a lateral composite-star network 3315 or one hop through the lateral composite-star network 3315 to which the source high capacity edge node 3320 belongs and another hop through the second non-uniform composite-star network 3310.

Figure 35:
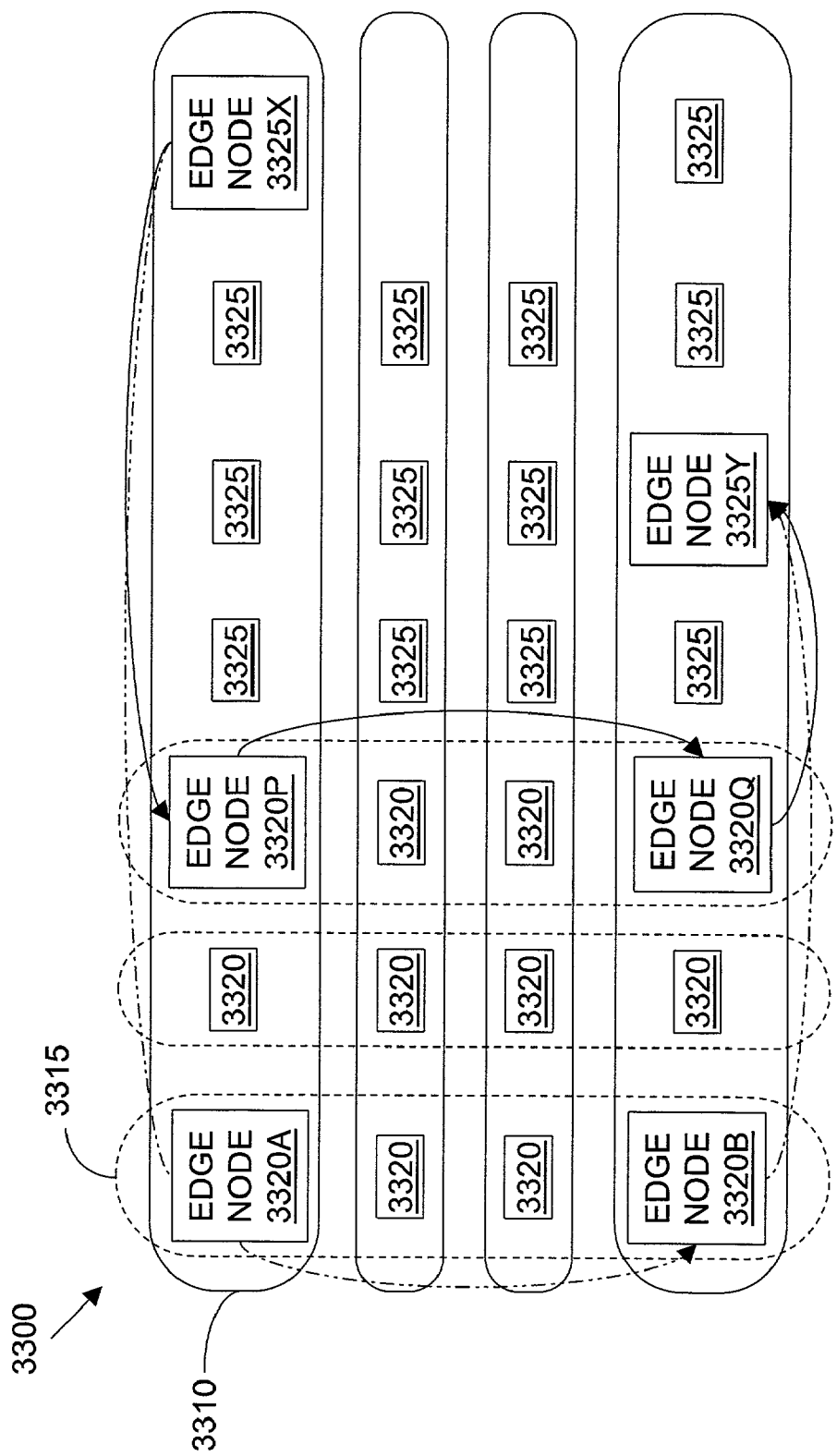
FIG. 35 illustrates alternate trails through the network of FIG. 33.

A route from a low capacity edge node 3325 in a first non-uniform composite-star network 3310 to a low capacity edge node 3325 in a second non-uniform composite-star network 3310 includes three hops. Two alternative three-hop routes are indicated in FIG. 35 for a connection between a source low capacity edge node 3325X and a sink low capacity edge node 3325Y. The first of the alternative routes begins with a hop through the first non-uniform composite-star network 3310 to a first cross-point high capacity edge node 3320P, continues with a hop through a lateral composite-star network 3315 to a second cross-point high capacity edge node 3320Q and finishes with a hop through the second non-uniform composite-star network 3310 to the sink low capacity edge node 3325Y. The second of the alternative routes begins with a hop through the first non-uniform composite-star network 3310 to a third cross-point high capacity edge node 3320A, continues with a hop through a lateral composite-star network 3315 to a fourth cross-point high capacity edge node 3320B and finishes with a hop through the second non-uniform composite-star network 3310 to the sink low capacity edge node 3325Y.

A core node in a given composite-star network has a controller which is aware of the originating edge node of each input link of the core node and the terminating edge node of each output link of the core node. The core node controller can, therefore, determine the edge-node pairs that can exchange signals through the core node. The core node controller may then inform a controller of each edge node of the other edge nodes that can be reached through the core node.

A composite-star network has a plurality of core nodes, with each core node controller providing to a controller of each edge node information about the other edge nodes that can be reached through said each core node. Each edge node controller can then construct a route set from the edge node to each other edge node in the composite-star network.

Each edge node can also estimate the one-way propagation delay along each route in each of its route sets. If a route from an edge node X to an edge node Y and a route from edge node Y to edge node X follow the same physical path, the propagation delays in the opposite directions would have a negligible difference. The one-way propagation delay is then conveniently determined by measuring a round-trip propagation delay and dividing the measurement by two. If the physical paths in the opposite directions have significantly different lengths, then other means for determining the one-way propagation delay would be needed. Techniques for measurement of propagation delay are, known in the art and are not discussed herein.

In summary, within each composite-star network, a controller of each edge node can determine a route set to each other edge node, with each route set including a plurality of routes, each route being defined by a core node. The controller of each edge node also has an estimate of the propagation delay along each route in each route set. A descriptor of each route in a route set from a first edge node to a second edge node within the same composite-star network would include five fields: an identifier of a first edge node, an identifier of a core node, an identifier of a second edge node, a core-node reach index and an estimate of the propagation delay along the route from the first edge node to the second edge node through the core node.

Route Set in a Two-dimensional Network

The exemplary two-dimensional irregular composite star network 3300 of FIG. 33 has n>1 independent non-uniform composite-star networks 3310 and m≧1 lateral composite-star networks 3315. Each non-uniform composite-star network 3310 includes both high capacity edge nodes 3320 and low capacity edge nodes 3325 and each lateral composite-star network 3315 includes only high capacity edge nodes 3320, each of which also belongs to an independent non-uniform composite-star network 3310. A route set from one edge node 3320, 3325 to each other edge node 3320, 3325 within a non-uniform composite-star network 3310 is hereinafter called a principal route set and a route set from a high capacity edge node 3320 to each other high capacity edge node 3320 within a lateral composite-star network 3315 is hereinafter called a lateral route set. A controller of a low capacity edge node 3325 stores principal route sets of the low capacity edge node 3325 within the non-uniform composite-star network 3310 to which it belongs. In addition to principal route sets, the controller of a high capacity edge node 3320, which is the intersection point of two composite-star networks 3310, 3315 stores lateral route sets for the high capacity edge node 3320 within the lateral composite-star network 3315 to which it belongs.

In order to enable each edge node to compute a route-description list (see list 4000 of FIG. 40), each high capacity edge node 3320 at the intersection of a non-uniform composite-star network 3310 and a lateral composite-star network 3315 communicates a description of all the principal route sets within the non-uniform composite-star network 3310 to each other high capacity edge node 3320 in the lateral composite-star network 3315. Thus each high capacity edge node 3320 in a lateral composite-star network 3315 has knowledge of each principal route set from each other high capacity edge node 3320 in the lateral composite-star network 3315.

Routing in a Non-uniform Two-dimensional Network

The methods of route selection in the exemplary two-dimensional irregular composite star network 3300 of FIG. 33, in accordance with the present invention, include: coarse route selection, fine route selection and adaptive coarse route selection.

Coarse Route Selection

A trail is defined herein by a source edge node, a sink edge node and traversed cross-point edge nodes, if any. A coarse route set for any edge-node pair comprises at least one trail. A trail comprises one or more segments and each segment comprises parallel routes between two edge nodes through optical core nodes. A track from a source edge node to a sink edge node is a concatenation of routes, one from each segment. The trails in a coarse route set can be sorted according to a merit criterion that combines propagation delay along the shortest route between successive edge nodes and the reach index of each traversed edge node, where the reach index of a given edge node is the number of core nodes to which the given edge node connects. The sorted routes are examined sequentially with each connection request. The process of route selection based on trails and the tracks within a trail will be further illustrated with reference to FIG. 36.

Fine Route Selection

In this method, the route set includes all the tracks corresponding to each trail. The tracks are sorted according to a merit criterion that combines the propagation delay along each track and the reach index of cross-point edge nodes traversed. The routes are examined sequentially. This method requires storage of a relatively-large route-description data and can be time-consuming, resulting in a reduced connection-request processing rate. It is noted that routes in consecutive entries in the table of sorted routes may belong to different trails.

Adaptive Coarse Route Selection

This method is adapted from a selective routing method described in U.S. Pat. No. 5,629,930, issued to Beshai et al. and titled "Call routing in an ATM switching network". In the adaptive coarse route selection method, the trails in a coarse route set are presorted according to a merit criterion. To select a route, the trails are examined sequentially, until a track having a sufficient unassigned capacity is found, for connection requests specifying a capacity requirement not exceeding a prescribed threshold, 10 megabits per second, for example. For capacity requirements exceeding the threshold, two trails, selected according to a merit criterion, are examined simultaneously. A routing message is sent along each of the selected two trails, and each edge node indicates, in a respective field in the message, the propagation delay along the selected paths. The routing message is returned to the source node by the destination node. If only one of the trails can accommodate the connection, that one trail is selected. If the two trails can accommodate the connection request, the source edge node may then select the trail offering a track of lower propagation delay. The selection may be made on the basis of more elaborate criteria, such as a function of propagation delay and reach-indices of traversed core nodes. If neither of the trails can accommodate the connection, a subsequent trail is attempted.

An edge node 3320, 3325 in the non-uniform composite-star network 3310 views each other non-uniform composite-star network 3310 as a foreign network.

Selection of Route Set Generation Method

As described earlier, there are two approaches to defining a route set. The first is based on specifying trails, thus a route set reduces to a "trail set" and the second is based on specifying tracks, thus a route set becomes a "track set". The decision to adopt a routing discipline based on trail sets or a routing discipline based on track sets is heavily dependent on the number of nodes in the network. The routing discipline based on track sets requires storing a detailed data record for each track, as illustrated in FIG. 40, and may not be suitable for a network having a very large number of nodes, exceeding 10,000 for example, due to both the storage requirement and the signaling overhead. A threshold number of nodes, below which the use of the routing discipline based on track sets is preferred, is a design choice. Further details on the derivation of trail sets and track sets are given below.

The Trail Set Method

A first edge node has a single trail to a second edge node if the first edge node and the second edge node belong to the same non-uniform composite-star network 3310 (see FIG. 33) or the same lateral composite-star network 3315. This single trail includes only one segment. As defined earlier, a segment comprises parallel paths between two edge nodes through optical core nodes.

If the second edge node belongs to a foreign non-uniform network, a trail from the first edge node to the second edge node may be fully defined by a single high capacity edge node. The trails in a trail set are determined as follows:

(a) In a local non-uniform network 3310 having $m \geq 1$ high capacity edge nodes, a low capacity edge node 3325 has a trail set describing m trails, each trail having three segments. The low capacity edge node 3325 need only include, in its trail set to each low capacity edge node belonging to a foreign network, m identifiers, one identifier corresponding to each of the m high capacity edge nodes in the local non-uniform network 3310. Although the trails from edge nodes in the local non-uniform network to each of the edge nodes in a foreign non-uniform network have the same m identifiers, each of the trails can have a different trail merit index, which is included in the description of respective trail sets. The trail merit indices can be different because each trail has three segments and any two trails intersect in at most two segments.

(b) The above low capacity edge node has one trail, which comprises two segments, to each high capacity edge node in the foreign non-uniform network. The low capacity edge node need only include, in its trail set to each high capacity edge node in the foreign non-uniform network, a single identifier. The identifier identifies a high capacity edge node that is in the local non-uniform network and in a lateral network through which the high capacity edge node that is in the local non-uniform network connects to the high capacity edge node that is in the foreign non-uniform network. As defined earlier, the high capacity edge node in the local non-uniform network is called the "cross-point edge node" of the local non-uniform network and the lateral network.

(c) A high capacity edge node belonging to a local non-uniform network and a lateral network has one trail, which comprises two segments, to each edge node in a foreign non-uniform network that does not belong to the lateral network.

The Track Set Method

Consider a two-dimensional non-uniform composite star network having H>1 non-uniform networks, each non-uniform network having $m \geq 1$ high capacity edge nodes, resulting in m lateral networks. The $j^{th}$ non-uniform network, $1 \leq j \leq H$, has $\chi(j)$ low capacity edge nodes 3325, m high capacity edge nodes and a(j) optical core nodes. The $k^{th}$ lateral network, $1 \leq k \leq m$, has b(k) optical core nodes. A track may be identified by a data record. A track set is determined as follows:

(a) Only one trail is allocated from a given low capacity edge node in the $h^{th}$ non-uniform network to another (high capacity or low capacity) edge node in the $h^{th}$ non-uniform network. The trail includes a(h) tracks, each defined by one of the a(h) optical core nodes in the $h^{th}$ non-uniform network. There are $(\chi(h)-1+m)$ other edge nodes in the $h^{th}$ non-uniform network. The corresponding number of data records to be stored at the given low capacity edge node is then:

$$a(h) \times (\chi(h)-1+m) \qquad (1)$$

(b) There are m high capacity edge nodes in each of the H non-uniform networks. A given low capacity edge node in the $h^{th}$ non-uniform network can reach a given high capacity edge node in a $j^{th}$ foreign a (j≠h) non-uniform network through m trails, with the $k^{th}$ trail, $1 \leq k \leq m$, having a number of permuted tracks equal to: a(h)×b(k). It is noted, however, that although there may be numerous permuted tracks available, the number of tracks that can be used simultaneously is the lesser of a(h) and b(k). The corresponding number of data records to be stored at the given low capacity edge node to cover all high capacity edge nodes in foreign non-uniform networks is then:

$$(H-1) \times a(h) \times \sum_{k=1}^{m} b(k) \qquad (2)$$

(c) There are m trails from a given low capacity edge node in the $h^{th}$ non-uniform network to each low capacity edge node in the $j^{th}$ foreign non-uniform network (j≠h). Each of the m trails is defined by one of the m lateral networks. The $k^{th}$ trail through the $k^{th}$ lateral network, $1 \leq k \leq m$, comprises three segments the first segment having a(h) paths, the second segment having b(k)

paths and the third segment having a(j) paths. Thus, the number of permuted tracks in the $k^{th}$ trail is: a(h)×b(k)×a(j). The total number of data records to be stored at the given low capacity edge node to cover all low capacity edge nodes in the (H−1) foreign non-uniform networks is then:

$$a(h) \times \sum_{k=1}^{m} b(k) \times \sum_{j=1, j \neq h}^{H} a(j)\chi(j). \quad (3)$$

(d) The total number of tracks from given low capacity edge node in the $h^{th}$ non-uniform network is then determined from the expression:

$$a(h)\left[\chi(h) + m - 1 + \left\{\sum_{k=1}^{m} b(k)\right\} \times \left[H - 1 + \sum_{j=1, j \neq h}^{H} a(j)\chi(j)\right]\right] \quad (4)$$

Consider a two-dimensional non-uniform composite star network having 16 non-uniform networks and four lateral networks, where each non-uniform network has four core nodes, four high capacity edge nodes and 28 low capacity edge nodes and each lateral network has three core nodes. The number of tracks from a given low capacity edge node to the remaining edge nodes in the two-dimensional non-uniform composite star network can be determined from expression (4) as 81,484 (with H=16, m=4, χ(j)=28, a(j)=4, 1≤j≤H and b(k)=3, 1≤k≤m).

The total number of single-hop paths can then be determined as 243,484. With a nominal record length per single-hop path of 16 bytes, the total storage requirement at the given low capacity edge node is 3.896 megabytes.

In a network with H=64, m=8, χ(j)=120, a(j)=4, 1≤j≤H, and b(k)=3, 1≤k≤m, the number of tracks may be determined to be 2,909,596 and the number of single-hop paths to be 8,721,724. With a nominal record length of 16 bytes per single-hop path, the storage requirement at the given low capacity edge node would be about 139.5 megabytes.

Figure 36:
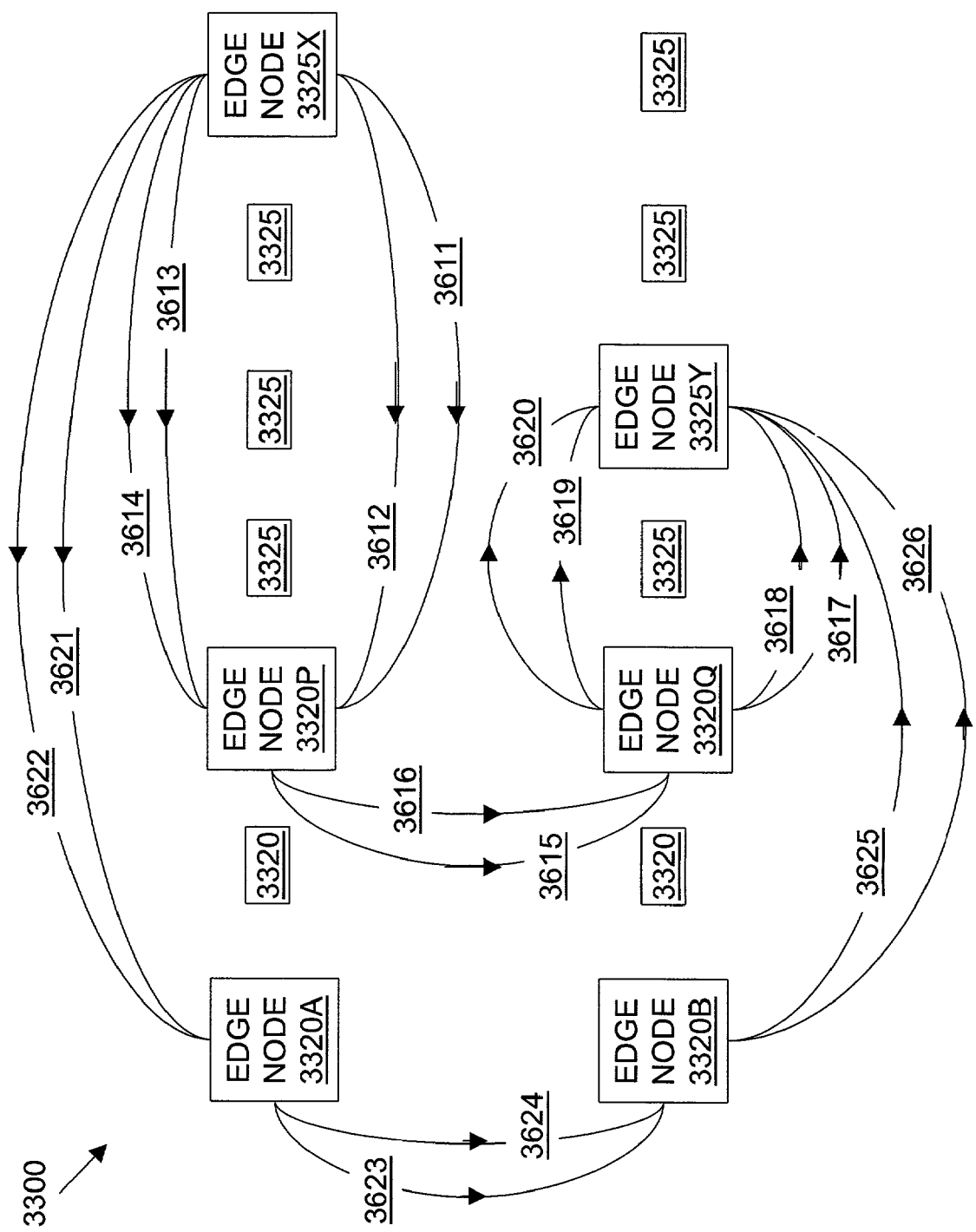
FIG. 36 illustrates possible tracks in the alternate trails of FIG. 35 indicating the multiplicity of routes available for each trail segment.

FIG. 36 illustrates routes from a source edge node 3325X to a sink edge node 3325Y in the exemplary two-dimensional irregular composite star network 3300 of FIG. 33, which includes low capacity edge nodes 3325, each connecting only to a non-uniform core 3360H and high capacity edge nodes 3320, each connecting to a non-uniform core 3360H as well as a uniform core 3360L. FIG. 36 illustrates that there are two trails from the source edge node 3325X to the sink edge node 3325Y, where each trail is defined by a sequence of edge nodes including the source edge node 3325X, the sink edge node 3325Y and two cross-point edge nodes. Each trail comprises a chain of segments, where a segment is defined by two edge nodes 3320, 3325 connecting through an optical core which may comprise several core nodes. A segment may have two or more parallel paths, each path being defined by a core node. Each trail in this example comprises three segments. There are four parallel paths (3611, 3612, 3613 and 3614) in the segment between the source edge node 3325X and the first cross-point high capacity edge node 3320P, two paths (3515, 3516) in the segment between the first cross-point high capacity edge node 3320P and the second cross-point high capacity edge node 3320Q, and four paths (3617, 3618, 3619, 3620) in the segment between the second cross-point high capacity edge node 3320Q and the sink edge node 3325Y. The optical core nodes defining the paths are omitted in FIG. 36 for clarity.

In review, a route description can be coarse, indicating only the edge nodes traversed, or fine, indicating the specific paths used. In a coarse route description, only the traversed edge nodes are indicated and, when the coarse route description is used, one of the parallel paths from a first edge node to a second edge node is selected by the edge node at the origin of each segment. Thus, to use the coarse route description is [3325X, 3320P, 3320Q, 3325Y], the source edge node 3325X may select one of paths (3611, 3612, 3613 and 3614), the first cross-point high capacity edge node 3320P may select either of paths 3615 and 3616 and the second cross-point high capacity edge node 3320Q may select one of the four paths (3617, 3618, 3619, and 3620).

A fine route description for the trail described by the coarse route description [3325X, 3320P, 3320Q, 3325Y] provides all 32 possible tracks, including [{3611, 3615, 3617}, {3611, 3615, 3618} . . . , {3614, 3616, 3620}].

Careful review of the exemplary two-dimensional irregular composite star network 3300, as illustrated in FIG. 36, should lead to the conclusion that there exist two trails from the source edge node 3325X to the sink edge node 3325Y. The two trails may be referred to by the coarse route descriptions [3325X, 3320P, 3320Q, 3325Y] and [3325X, 3320A, 3320B, 3325Y]. Furthermore, in the fine route description of the two trails there will be a total of 40 possible tracks (4×2×4+2×2×2).

In a network having 16 high capacity edge nodes per non-uniform composite-star network, with four core nodes per non-uniform composite-star network and two core nodes per lateral uniform composite-star network, the number of trails between two low capacity edge nodes belonging to different networks 3310 is 16 and the corresponding number of tracks is 16×4×2×4=512.

Each non-uniform composite-star network may be prearranged to cover a specific geographical area or represent a single administrative domain. Preferably, the high capacity edge nodes 3320 that are connected to two optical cores will be the edge nodes of higher capacity, relative to other edge nodes in the same non-uniform composite-star network.

The partition of a network into geographical areas and administrative domains is facilitated by the use of the two-dimensional, non-uniform, composite-star network architecture. A single-dimensional, non-uniform, composite-star network can cover a smaller geographical area or be under the control of a single administrative domain. For example, a horizontal single-dimensional, non-uniform, composite-star network 3310 formed by the edge nodes 3320, 3325 connected to the optical core 3360H may cover the state of California. The lateral single-dimensional, uniform, composite-star network 3315 formed by the high capacity edge nodes 3320 connected to the lateral optical core 3360L may be a transcontinental backbone of a first network provider, interconnecting single-dimensional, non-uniform, composite-star networks 3310 from various areas. It is desirable that most traffic be exchanged through direct optical connections, with a small proportion of the traffic transferred to destination sink nodes through cross-point edge nodes.

Advantageously, the use of single optical hops provided by two-dimensional, composite-star networks allows the use of TDM in the optical domain, increasing the effective reach of the edge nodes. As well, confining a single-dimensional, non-uniform composite-star network to a small geographic area keeps fiber distances short and propagation delays low.

Figure 37:
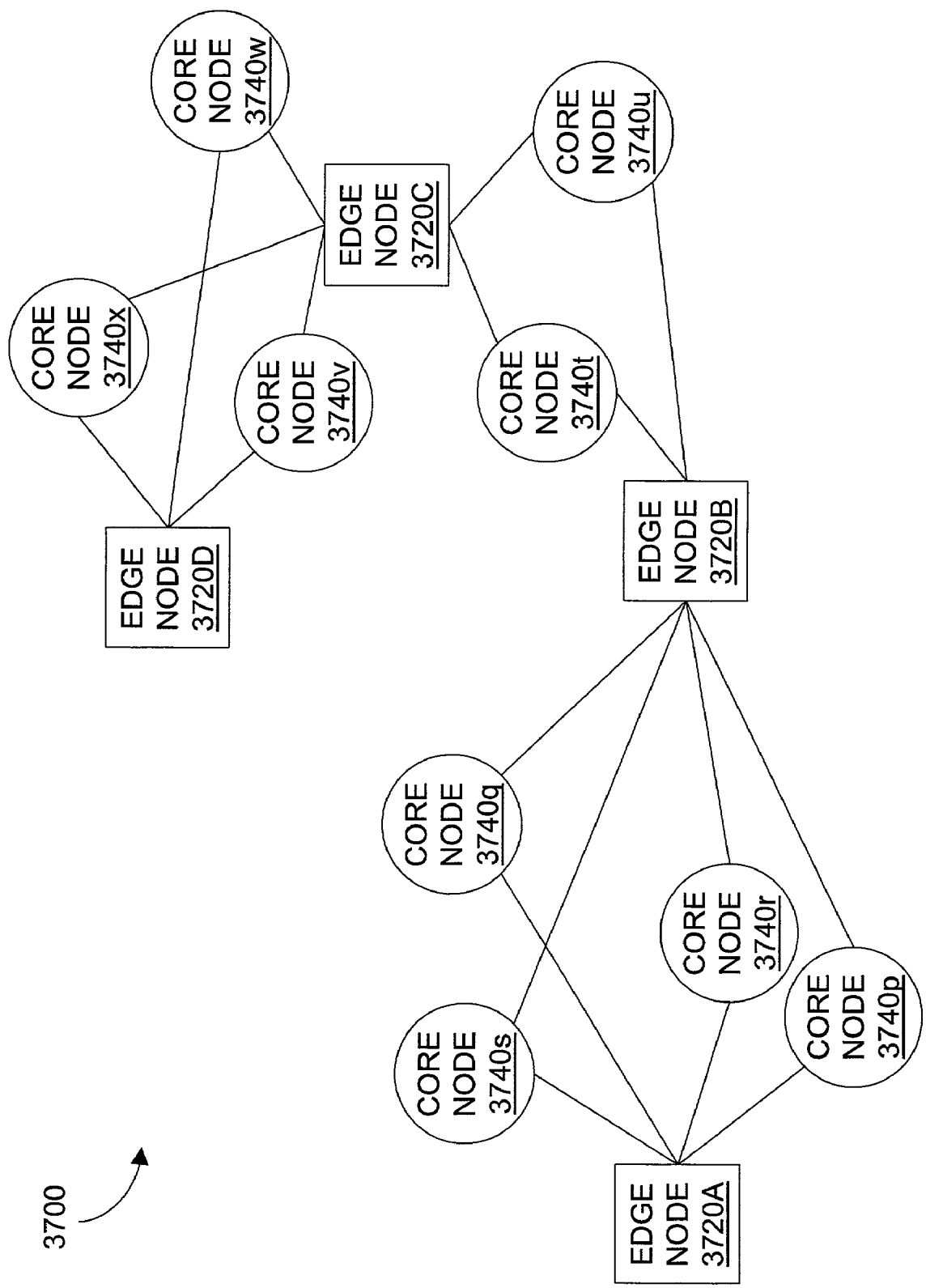
FIG. 37 illustrates a trail through a two-dimensional, non-uniform, composite-star network according to an embodiment of the present invention.

FIG. 37 illustrates a trail 3700 in a two-dimensional network, comprising three segments, from a source edge node 3720A to a sink edge node 3720D through a first cross-point edge node 3720B and a second cross-point edge node 3720C. The first segment is defined by the source edge node 3720A and the first cross-point edge node 3720B, and has four parallel paths defined by core nodes 3740p, 3740q, 3740r and 3740s. The second segment is defined by the first cross-point edge node 3720B and the second cross-point edge node 3720C and comprises two parallel paths defined by core nodes 3740t and 3740u. The third segment is defined by the second cross-point edge node 3720C and the sink edge node 3720D and has three parallel paths defined by core nodes 3740v, 3740w and 3740x.

The propagation delays along each path in FIG. 37 and the reach indices of the associated core nodes are indicated in a table 3800 in FIG. 38 which illustrates a part of a routing decision table for one trail between the source edge node 3720A and the sink edge node 3720D. Each element of a first column 3810 of table 3800 of FIG. 38 identifies a segment of the trail. Elements of a second column 3820 define the parallel paths for each segment by a core node reference letter. A third column 3830 lists the reach index of each of the optical core nodes referenced in the second column 3820. A fourth column 3840 indicates the one-way propagation delay for each route defined by the core node referenced in the second column 3820. A fifth column 3850 indicates the route merit index of each route, the route merit index being defined, in this example, as the product of a reach index of a core node defining a route and the propagation delay along the route. A sixth column 3860 is the only column to hold state-dependent information. The sixth column 3860 indicates the available free capacity along each route. This entry is only computed when needed. The capacity may be defined in terms of wavelength channels, in a channel-switching network, or may be defined in terms of available time slots per TDM frame in a TDM switching network.

A table 3900 illustrated in FIG. 39 lists the 24 possible tracks between the source edge node 3720A and the sink edge node 3720D through the single trail 3700 of FIG. 37. A first column 3910 defines each track according to all the nodes, edge or core, that the track traverses. A second column 3920 illustrates the calculation of a track merit index for each track.

A track set 4000 illustrated in FIG. 40 lists the tracks from the table 3900 of FIG. 39 sorted in an ascending order according to the track merit index. The vacancy along each track, determined by the single-hop path that has the least vacancy, is also indicated. The vacancy in this example is given as a number of unassigned time slots. If a connection request arrives at the source edge node 3720A requiring 12 time slots, a review of the first rows of the track set 4000 of FIG. 40 yields the information that neither of the first two tracks, A-q-B-t-C-v-D or A-q-B-t-C-x-D, can accommodate the connection request, as each track has only eight free time slots. The third track, having a vacancy of 34 time slots, would then be selected, by the source edge node 3720A, to accommodate the connection request.

When a master track set, made up of the contents of multiple track sets such as the track set 4000 illustrated in FIG. 40, is too large to maintain, routing decisions may be made based on a trail set. As discussed hereinbefore, the trail set includes a trail merit index associated with each trail and each trail is associated with a plurality of tracks from the source edge node to the sink edge node. The trail having the optimum trail merit index may be selected as a candidate trail to satisfy a connection request. A trail merit index for a given trail is based on the track merit indices of the plurality of tracks associated with the given trail. Once a candidate trail has been selected, a candidate track may be selected having the optimum track merit index among the tracks associated with the candidate trail. The vacancy of the candidate track is then determined and, where the vacancy equals or exceeds the required capacity specified in the connection request, an acceptance indication indicating an acceptance of the connection request may be transmitted to the origin of the connection request.

The trail merit index for a given trail may be determined in a number of different ways. For instance, the trail merit index for a given trail may be determined as an optimum track merit index among the track merit indices of the plurality of tracks associated with the given trail. Alternatively, the trail merit index for a given trail may be determined as an average of track merit indices of each of the plurality of tracks associated with the given trail. Additionally, the trail merit index for a given trail may be determined as a weighted average of track merit indices of each of the plurality of tracks associated with the given trail.

Advantageously, the use of an optical core network having diverse nodal capacities allows for the use of edge nodes of diverse nodal capacities and the deployment of a partial, non-uniform, composite-star network long before a need develops for a complete, uniform, composite-star network.

The use of network routes traversing consecutive optical core nodes leads to a rigid inefficient network. Uniform complete networks using composite-star structures provide agility, high performance and high efficiency. The structure enables the use of fine granularity of capacity allocation. However, there is further room for optimizing the overall length of optical links if the network is incomplete, utilizing edge nodes of dissimilar capacity and reach and core nodes of different capacity and reach.

Other modifications will be apparent to those skilled in the art and, therefore, the invention is defined in the claims.

We claim:

1. A non-uniform composite-star network comprising:
   at least three edge nodes; and
   an optical core including at least two optical core nodes, where said at least two optical core nodes are not connected to each other, each of said at least two optical core nodes terminating input links originating from at least one of said at least three edge nodes and each of said at least two optical core nodes originating output links terminating on at least one of said at least three edge nodes;
   wherein at least two of said optical core nodes have a different core reach index, where a core reach index of a given optical core node is a metric based on a number of edge nodes to which said given optical core node directly connects; and
   wherein a selected optical core node among said optical core nodes, terminating J input links and originating K output links, is selected to minimize a capacity-delay product given by:

$$\left( \sum_{j=0}^{J-1} L_j D_j + \sum_{k=0}^{K-1} \Lambda_k \Lambda_k \right)$$

where $L_j$ is the number of channels in input link j, $D_j$ is the propagation delay along input link j, $0 \leq j < J$, $\Lambda_k$ is the number of channels in output link k, $\Delta_k$ is the propagation delay along output link j, $0 \leq k < K$.

2. The non-uniform composite-star network of claim 1 wherein at least two of said at least three edge nodes have a different edge reach index, where the edge reach index of a given edge node is a metric based on a number of said at least two optical core nodes to which said given edge node directly connects.

3. The non-uniform composite-star network of claim 1 wherein said input links terminating on said each of said at least two optical core nodes and said output links originating from said each of said at least two optical core nodes are arranged so that a path may be established connecting any two of said at least three edge nodes, where said path traverses at most one of said at least two optical core nodes.

4. The non-uniform composite-star network of claim 2 wherein said at least three edge nodes are logically arranged according to said edge reach index, said at least two optical core nodes are logically arranged according to said core reach index, and an edge node of low edge reach index connects to optical core nodes, selected from among said at least two optical core nodes, each of high core reach index.

* * * * *